United States Patent
Hasegawa et al.

(10) Patent No.: US 7,054,115 B2
(45) Date of Patent: May 30, 2006

(54) SPIN-VALVE THIN-FILM MAGNETIC ELEMENT AND METHOD FOR MAKING THE SAME

(75) Inventors: Naoya Hasegawa, Niigata-ken (JP); Kenji Honda, Niigata-ken (JP); Yoshihiko Kakihara, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 779 days.

(21) Appl. No.: 09/774,781

(22) Filed: Jan. 30, 2001

(65) Prior Publication Data

US 2001/0012188 A1 Aug. 9, 2001

(30) Foreign Application Priority Data

Feb. 2, 2000 (JP) .................................... 2000-025659

(51) Int. Cl.
*G11B 5/127* (2006.01)

(52) U.S. Cl. ................................. 360/324.12
(58) Field of Classification Search ................ 360/324, 360/324.1, 324.11, 324.12
See application file for complete search history.

(56) References Cited

U.S. PATENT DOCUMENTS

| | | | | |
|---|---|---|---|---|
| 5,422,571 A | * | 6/1995 | Gurney et al. | ............... 324/252 |
| 5,768,067 A | | 6/1998 | Saito et al. | |
| 5,972,420 A | | 10/1999 | Saito et al. | |
| 6,301,088 B1 | | 10/2001 | Nakada | |
| 6,387,548 B1 | | 5/2002 | Hasegawa et al. | |

FOREIGN PATENT DOCUMENTS

| | | |
|---|---|---|
| JP | 10-284769 | 10/1998 |
| JP | 11-296820 | 10/1998 |
| JP | 10-294506 | 11/1998 |
| JP | 11-296823 | 10/1999 |
| JP | 2000-31562 | 1/2000 |
| JP | 2000-031562 | * 1/2000 |
| JP | 2000-348309 | 12/2000 |

OTHER PUBLICATIONS

Co–pending U.S. Appl. No. 09/586,624, filed Jun. 2, 2000, entitled "Spin–Valve Type Magnetoresistive Sensor and Method of Manufacturing the Same" (copy not attached) commonly assigned to the Assignee of the present invention.

* cited by examiner

*Primary Examiner*—George Letscher
(74) *Attorney, Agent, or Firm*—Brinks Hofer Gilson & Lione

(57) ABSTRACT

A spin-valve thin-film magnetic element includes a substrate, a composite formed thereon, and electrode layers formed on both sides of the composite. The composite includes an antiferromagnetic layer, a pinned magnetic layer, a nonmagnetic conductive layer, a free magnetic layer, a mean-free-path-extending layer, and an exchange bias layer. The mean-free-path-extending layer may be a back layer or a mirror reflective layer. The mean-free-path-extending layer extends the mean free path of spin-up conduction electrons in the spin-valve thin-film magnetic element. This spin-valve thin-film magnetic element meets trends toward a narrower track width.

26 Claims, 25 Drawing Sheets

FIG. 1
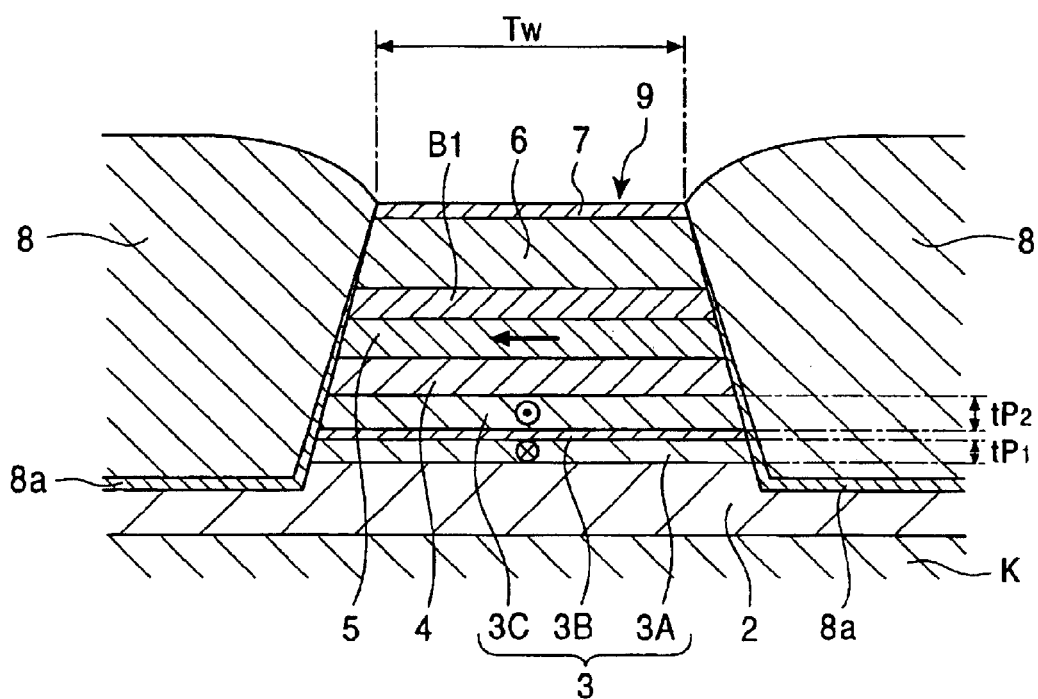
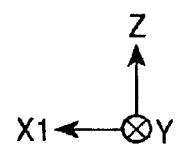

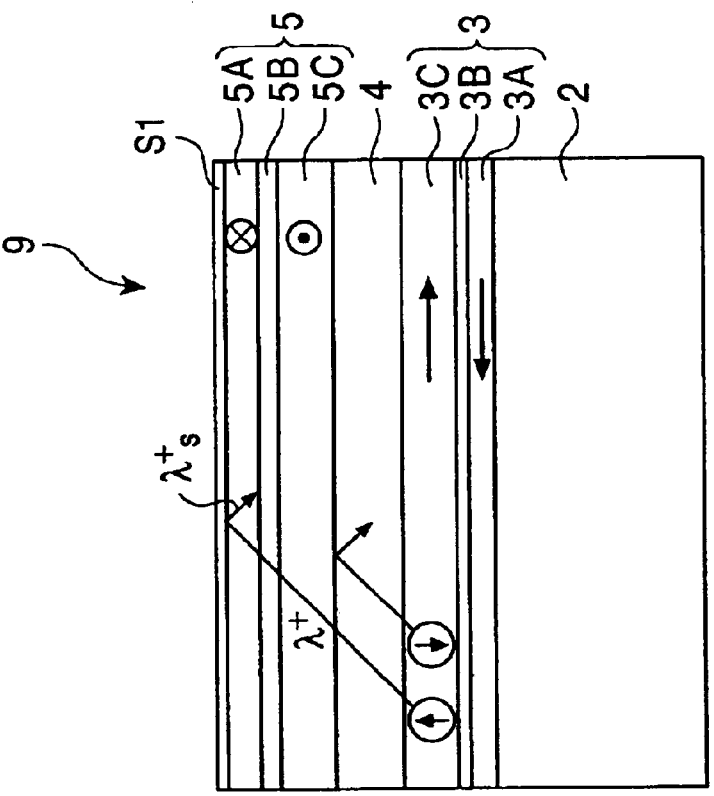
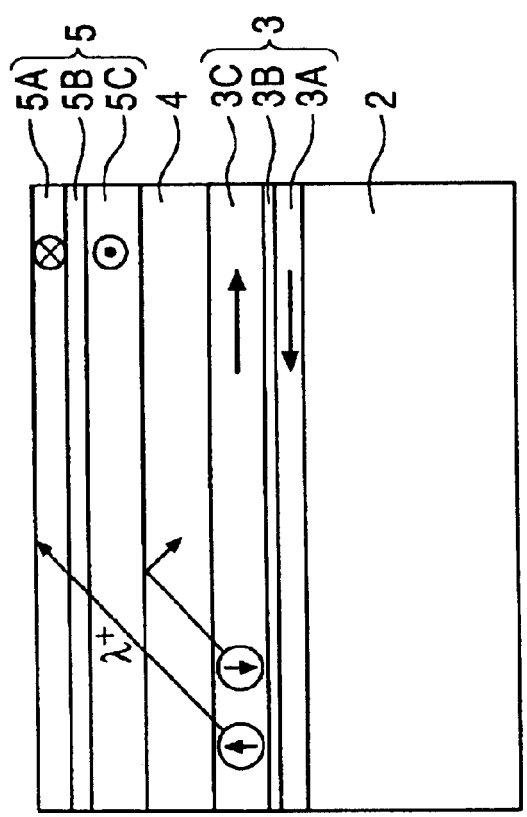

FIG. 25
PRIOR ART
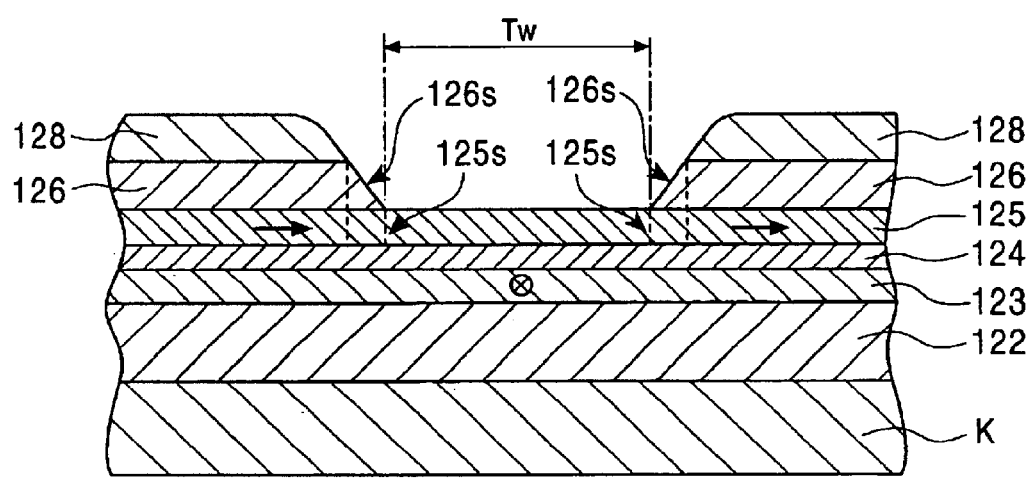
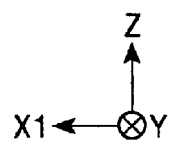

FIG. 26
PRIOR ART
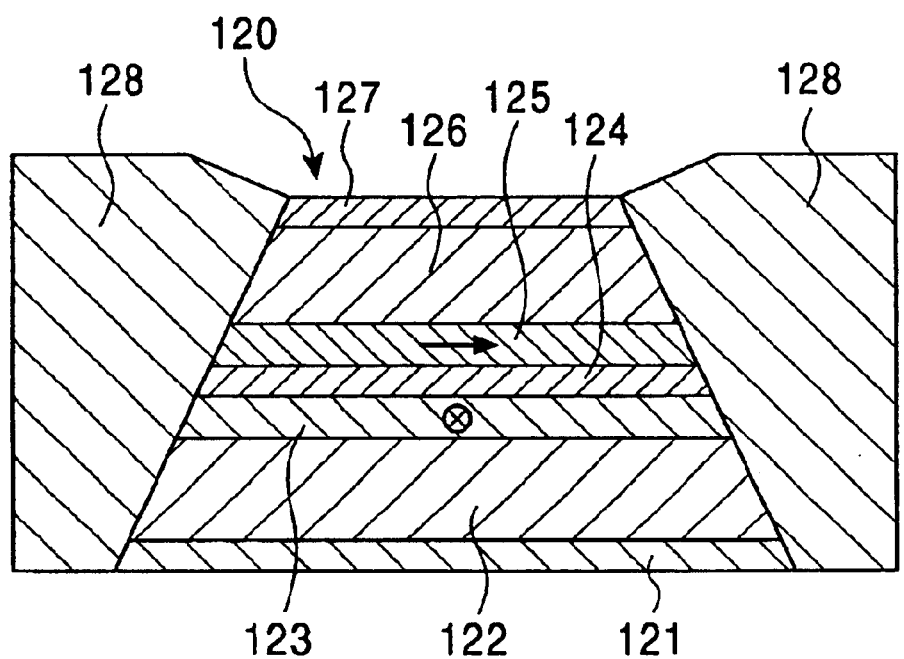
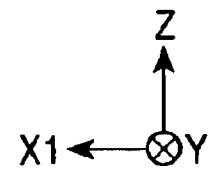

SPIN-VALVE THIN-FILM MAGNETIC ELEMENT AND METHOD FOR MAKING THE SAME

BACKGROUND OF THE INVENTION

1. Field of the Invention

The present invention relates to a spin-valve thin-film magnetic element which undergoes a change in electrical resistance in relation to the magnetization vector of a pinned magnetic layer and the magnetization vector of a free magnetic layer affected by an external magnetic field, and to a thin-film magnetic head provided with the spin-valve thin-film magnetic element. In particular, the present invention relates to a technology suitable for a spin-valve thin-film magnetic element which includes a free magnetic layer having improved soft magnetic characteristics and thus exhibits an enhanced rate of change in resistance.

2. Description of the Related Art

A spin-valve thin-film magnetic element is a type of giant magnetoresistive element (GMR) exhibiting a giant magnetoresistive effect and detects recorded magnetic fields from a recording medium such as a hard disk. Among GMRs, the spin-valve thin-film magnetic element has a relatively simple structure, and exhibits a high rate of change in resistance in response to external magnetic fields and thus a change in resistance in a weak magnetic field.

Each of FIGS. 24 to 26 is a cross-sectional view of an exemplary conventional spin-valve thin-film magnetic element when viewed from a face opposing the recording medium (air bearing surface: ABS).

A shielding layer is provided on or under the spin-valve thin-film magnetic element, separated by a gap layer, so as to constitute a GMR read head comprising the spin-valve thin-film magnetic element, the gap layer, and the shield layer. An inductive write head may be deposited on the GMR read head.

This GMR head is installed at the trailing end face of a floating slider together with the inductive head so as to constitute a thin-film magnetic head for detecting recorded magnetic fields written on a magnetic recording medium such as a hard disk.

The conventional spin-valve thin-film magnetic element shown in FIG. 24 is known as a bottom-type hard-bias single spin-valve thin-film magnetic element. The spin-valve thin-film magnetic element comprises a composite of an antiferromagnetic layer 122, a pinned magnetic layer 123, a nonmagnetic conductive layer 124, and a free magnetic layer 125. The composite is provided with a pair of hard bias layers on two sides of the composite.

In this spin-valve thin-film magnetic element, the magnetic recording medium, typically a hard disk, moves in the Z direction in the drawing and a leakage magnetic field occurs in the Y direction in the drawing.

The conventional spin-valve thin-film magnetic element shown in FIG. 24 includes: a composite 120 comprising, an underlayer 121 at the bottom, the antiferromagnetic layer 122, the pinned magnetic layer 123, the nonmagnetic conductive layer 124, the free magnetic layer 125, and a protective layer 127; a pair of hard bias layers (permanent magnet layers) 129 formed on two sides of the composite 120; and a pair of electrode layers 128 formed on the hard bias layers. Generally, the antiferromagnetic layer 122 is composed of an Fe—Mn alloy or a Ni—Mn alloy, the pinned magnetic layer 123 and the free magnetic layer 125 are composed of a Ni—Fe alloy, the nonmagnetic conductive layer 124 is composed of a Co—Pt alloy, the hard bias layers 129 are composed of a Co—Pt alloy, and the electrode layers 128 are composed of Cr or W. The underlayer 121 and the protective layer 127 are composed of Ta or the like.

The magnetic-recording track-width Tw is mainly determined by the width of the upper surface of the composite 120.

As shown in FIG. 24, the exchange anisotropic magnetic field generated by exchange coupling at the interface with the antiferromagnetic layer 122 puts the pinned magnetic layer 123 into a single-magnetic-domain state in the Y direction (the direction of the leakage magnetic field from the recording medium, i.e., the height direction). The free magnetic layer 125 is affected by a bias magnetic field from the hard bias layers 129 and orients in the direction opposite to the X1 direction.

In other words, the magnetization vector of the pinned magnetic layer 123 and that of the free magnetic layer 125 are set to be orthogonal to each other.

In this spin-valve thin-film magnetic element, the electrode layers 128 formed on the hard bias layers 129 supply a detecting current (sensing current) to the pinned magnetic layer 123, the nonmagnetic conductive layer 124, and the free magnetic layer 125. There is a leakage magnetic field vector from the magnetic recording medium. When the magnetization vector of the free magnetic layer 125 changes from the direction opposite to the X1 direction to the Y direction, the electrical resistance is changed in relation to the pinned magnetization vector of the pinned magnetic layer 123 and the change in the magnetization vector of the free magnetic layer 125 (this change is known as the "magnetoresistive (MR) effect"). As a result, the leakage magnetic field from the magnetic recording medium is detected as a change in voltage due to the change in the electrical resistance.

The spin-valve thin-film magnetic element shown in FIG. 25 is also a bottom-type element having an antiferromagnetic layer, a pinned magnetic layer, a nonmagnetic conductive layer, and a free magnetic layer, as is the spin-valve thin-film magnetic element shown in FIG. 24, but differs in that it is a side exchange bias type single spin-valve thin-film magnetic element.

In this spin-valve thin-film magnetic element, a magnetic recording medium such as a hard disk moves in the Z direction in the drawing and the vector of the leakage magnetic fields from the recording medium is in the Y direction in the drawing.

In FIG. 25, symbol K denotes a substrate. The antiferromagnetic layer 122 is formed on the substrate K. A pinned magnetic layer 123 is formed on an antiferromagnetic layer 122, a nonmagnetic conductive layer 124 is formed on the pinned magnetic layer 123, and a free magnetic layer 125 is formed on the nonmagnetic conductive layer 124. A pair of bias layers 126 are formed on the free magnetic layer 125 with a gap equal to the magnetic recording track width Tw between the bias layers 126. A pair of electrode layers 128 are formed on the bias layers 126.

The antiferromagnetic layer 122 is formed of a NiO alloy, an FeMn alloy, a NiMn alloy, or the like. The pinned magnetic layer 123 and the free magnetic layer 125 are formed of elemental Co, a NiFe alloy, or the like. The nonmagnetic conductive layer 124 is a Cu layer. The bias layers 126 are composed of an antiferromagnetic material having a disordered face-centered cubic crystalline structure such as an FeMn alloy. The electrode layers 128 are formed of Cu, Au, Cr, W, Ta, or the like.

As shown in FIG. 25, the pinned magnetic layer 123 is magnetized by the exchange anisotropic magnetic field generated by an exchange coupling at the interface with the antiferromagnetic layer 122. The magnetization vector of the pinned magnetic layer 123 is pinned in the Y direction in the drawing, i.e., the direction away from the recording medium (the height direction). The exchange anisotropic magnetic field generated by the bias layer 126 puts the free magnetic layer 125 into a single-magnetic-domain state. The magnetic vector of the free magnetic layer 125 is set in the direction opposite to the X1 direction, in other words, in the direction substantially orthogonal to the magnetization vector of the pinned magnetic layer 123.

In this spin-valve thin-film magnetic element, the electrode layers 128 supply a sensing current to the free magnetic layer 125, the nonmagnetic conductive layer 124, the pinned magnetic layer 123, and the vicinity thereof. When there is a leakage magnetic field in the Y direction in the drawing from the magnetic recording medium moving in the Z direction, the magnetization vector of the free magnetic layer 125 changes from the direction opposite to the X1 direction to the Y direction in the drawing. Such a change in the magnetization vector of the free magnetic layer 125 causes the electrical resistance to change in relation with the magnetization vector of the pinned magnetic layer 123; consequently, the leakage magnetic field from the magnetic recording medium is detected as a change in voltage due to the change in the electrical resistance.

The conventional spin-valve thin-film magnetic element shown in FIG. 26 is a bottom-type exchange bias single spin-valve thin-film magnetic element comprising a composite of a antiferromagnetic layer 122, a pinned magnetic layer 123, a nonmagnetic conductive layer 124, a free magnetic layer 125, and an exchange bias layer 126.

In this spin-valve thin-film magnetic element, a magnetic recording medium such as a hard disk moves in the Z direction in the drawing and the vector of the leakage magnetic field from the magnetic recording medium is in the Y direction.

The spin-valve thin-film magnetic element shown in FIG. 26 includes: a composite 120 comprising an underlayer 121 at the bottom, an antiferromagnetic layer 122, a pinned magnetic layer 123, a nonmagnetic conductive layer 124, a free magnetic layer 125, an exchange bias layer 126, and a protective layer 127; and a pair of electrode layers 128 formed on two sides of the deposit 120. Generally, the antiferromagnetic layer 122 is composed of a Ni—Mn alloy or the like, the pinned magnetic layer 123 and the free magnetic layer 125 are composed of a Ni—Fe alloy or the like, the nonmagnetic conductive layer 124 is composed of Cu, the bias layer 126 is composed of an Fe—Mn, and the electrode layers 128 are composed of a Cr or W. The underlayer 121 and the protective layer 127 are formed of Ta or the like.

It should be noted that the magnetic recording track width Tw is determined by the width of the upper surface of the composite 120.

As shown in FIG. 26, the exchange anisotropic magnetic field generated by the exchange coupling at the interface with the antiferromagnetic layer 122 puts the pinned magnetic layer 123 into a single magnetic domain state in the Y direction (the direction of the leakage magnetic field from the recording medium, i.e., the height direction). The magnetization vector of the free magnetic layer 125 is oriented in the direction opposite to the X1 direction due to the exchange anisotropic magnetic field generated by the exchange coupling at the interface with the exchange bias layer 126.

In other words, the magnetization vector of the pinned magnetic layer 123 and that of the free magnetic layer 125 are set to be orthogonal to each other.

In this spin-valve thin-film magnetic element, the electrode layers 128 supply a detecting current (sensing current) to the free magnetic layer 125, the nonmagnetic conductive layer 124, the pinned magnetic layer 123, and the vicinity thereof. There is a leakage magnetic field vector from the recording medium. When the magnetization vector is changed from the direction opposite to the X1 direction to the Y direction, the electrical resistance changes in relation to the pinned magnetization vector of the pinned magnetic layer 123, and the leakage magnetic field from the recording medium is detected as a change in voltage due to the change in the electrical resistance.

There is a constant demand for higher recording density in the field of recording media such as hard disks. In order to improve the recording density, the magnetic recording track width must be made narrower. There is a growing demand for a narrower track and improved detection sensitivity.

In the hard-bias spin-valve thin-film magnetic element shown in FIG. 24, the free magnetic layer 125 has, at each side, a region easily pinned by the strong magnetic field from the hard bias layers 129. In such a region, the magnetization vector is hampered from changing in response to the external magnetic field; consequently, as shown in FIG. 24, an insensitive region with degraded sensitivity is generated at each side.

Accordingly, the center region of the composite 120 excluding the insensitive regions is a sensitive region which exhibits the GMR effect and is the only region fully responsible for reading the recording medium. The width of the sensitive region is smaller than the initial magnetic recording track width Tw by a length equivalent to the total width of the insensitive regions. Since the width of the insensitive region varies, it is difficult to precisely define the effective magnetic recording track width. When the initial magnetic recording track width Tw is set smaller, the rate of change in resistance ($\Delta R/R$) in the GMR effect decreases, resulting in degradation of the detection sensitivity. With the degraded detection sensitivity, it is difficult to improve the recording density.

In the side exchange bias spin-valve thin-film magnetic element shown in FIG. 25, the magnetization vector of the free magnetic layer 125 is substantially orthogonal to the magnetization vector of the pinned magnetic layer 123 due to the exchange coupling to the bias layer 126 composed of an antiferromagnetic material.

The side exchange bias spin-valve thin-film magnetic element is more suitable for accommodating a higher recording density and a narrower magnetic recording track width Tw compared to the hard bias spin-valve thin-film magnetic element in which the effective magnetic recording track width is difficult to control due to the presence of the insensitive regions.

However, in the spin-valve thin-film magnetic element shown in FIG. 25, the thickness of the bias layer 126 decreases at sloped peripheries 126s of the track. Thus, the effect generated by the exchange coupling between the free magnetic layer 125 and the bias layer 126 is decreased at the sloped peripheries 126s of the track. Consequently, magnetic resistance in the free magnetic layer 125 undesirably changes at lateral portions 125s of the track in response to the external magnetic field even though the lateral portions 125s are insensitive regions, thus outputting undesired signals relative to the read output of the sensitive region.

This is especially problematic because, since the width and the intervals of the recording tracks on the magnetic recording medium are decreased to achieve higher recording density, the lateral portions 125s may read-out the information on the adjacent track relative to the magnetic recording track which the sensitive region should have had read. This problem of side—reading may generate noise in the output signals, causing errors.

Thus, the effective track width cannot be controlled precisely, and the detection precision is degraded. This is problematic especially in spin-valve thin-film magnetic elements designed for use with magnetic recording track width of 0.5 μm or less.

Also, when the effect of the exchange coupling between the free magnetic layer 125 and the bias layer 126 is decreased at the sloped peripheries 126s, the magnetization vector at the center portion of the sensitive region in the free magnetic layer 125 becomes significantly different from the magnetization vector in the sloped peripheries 125s. Such a difference in the free magnetic layer 125 may inhibit the free magnetic layer 125 from being in a single-magnetic-domain state as if there is a magnetic wall inside, the magnetization vectors become non-uniform, and Barkhausen noise may be generated causing instability and errors in processing the signals provided from the magnetic recording medium.

In the exchange bias spin-valve thin-film magnetic element shown in FIG. 26, unlike the side exchange bias type shown in FIG. 25, the sensitive region of the free magnetic layer 125 is directly connected to the exchange bias layer 126. In this configuration, the exchange anisotropic magnetic field generated by the exchange coupling at the interface between the free magnetic layer 125 and the exchange bias layer 126 becomes excessively strong, tightly pinning the magnetization vector of the free magnetic layer 125. Accordingly, when the external magnetic field is applied for detection, the magnetization vector of the free magnetic layer 125 cannot rotate and change, precluding a change in the resistance of the sensing current and thereby degrading the detection sensitivity.

Furthermore, when manufacturing the side exchange bias type spin-valve thin-film magnetic element shown in FIG. 25 and the exchange bias type spin-valve thin-film magnetic element shown in FIG. 26, (a) a step of annealing in a first magnetic field so as to set the magnetization vector of the antiferromagnetic layer 122 in the Y direction and (b) a step of annealing in a second magnetic field so as to set the magnetization vector of the free magnetic layer 125 in a direction opposite to the X1 direction must be successively performed. However, during the step (a), the exchange anisotropic magnetic field acting at the interface between the antiferromagnetic layer 122 and the pinned magnetic layer 123 rotates from the Y direction to the direction opposite to the X1 direction. As a result, the magnetization vector of the pinned magnetic layer 123 and that of the free magnetic layer 125 are no longer orthogonal to each other and the degree to which the output waveform is out of symmetry (asymmetry) may be increased.

Here, the asymmetry of the output depends on the relationship between the magnetization vector of the pinned magnetic layer 123 and that of the free magnetic layer 125. In the spin-valve thin-film magnetic element, the smaller the asymmetry of the output, the better. An increase in asymmetry causes degradation in the output characteristics of the spin-valve thin-film magnetic element.

It should be noted that the present inventors have disclosed a configuration regarding the exchange bias spin-valve thin-film magnetic element shown in FIG. 26 in Japanese Unexamined Patent Application Publication No. 10-294506 and a configuration regarding the side exchange bias spin-valve thin-film magnetic element shown in FIG. 25 in Japanese Patent Application No. 11-157132 prior to this application. However, these configurations also suffer from the above-described problems.

SUMMARY OF THE INVENTION

Accordingly, objects of the present invention are as follows:

(1) To meet trends toward a narrower track width;

(2) To enhance output characteristics of a spin-valve thin-film magnetic element;

(3) To reduce asymmetry;

(4) To prevent side reading;

(5) To stabilize output waveforms;

(6) To improve the detection sensitivity of the spin-valve thin-film magnetic element;

(7) To improve the rate of change in resistance ($\Delta R/R$);

(8) To provide a thin-film magnetic head provided with such a spin-valve thin-film magnetic element; and (9) To provide a method for making the spin-valve thin-film magnetic element.

According to a first aspect of the present invention, a spin-valve thin-film magnetic element comprises a substrate; an antiferromagnetic layer; a pinned magnetic layer in contact with the antiferromagnetic layer, the magnetization vector of the pinned magnetic layer being pinned by an exchange coupling magnetic field between the antiferromagnetic layer and the pinned magnetic layer; a nonmagnetic conductive layer in contact with the pinned magnetic layer; a free magnetic layer in contact with the nonmagnetic conductive layer; an exchange bias layer for magnetizing the free magnetic layer so that the magnetization vector of the free magnetic layer is substantially orthogonal to the magnetization vector of the pinned magnetic layer; a pair of electrode layers for supplying a sensing current to the pinned magnetic layer, the nonmagnetic conductive layer, and the free magnetic layer; and a mean-free-path-extending layer provided between the free magnetic layer and the exchange bias layer for controlling the magnitude of an exchange coupling magnetic field between the free magnetic layer and the exchange bias layer and for extending the mean free path of conduction electrons.

Since the mean-free-path-extending layer is provided between the free magnetic layer and the exchange bias layer for controlling the magnitude of an exchange coupling magnetic field (exchange anisotropic magnetic field) between the free magnetic layer and the exchange bias layer and for extending the mean free path of conduction electrons, the magnitude of the exchange anisotropic magnetic field generated by the exchange coupling between the free magnetic layer and the exchange bias layer can be controlled within a suitable range. Thus, the magnetization vector of the free magnetic layer can sensitively rotate in response to a weak leakage magnetic field from a magnetic recording medium. Thus, the spin-valve thin-film magnetic element exhibits adequate sensitivity and outputs exact waveforms without generating Barkhausen noise.

In addition to the mean-free-path-extending layer, the exchange bias layer is formed over the entire track portion. Thus, the exchange bias layer has a uniform thickness and thus generates a uniform exchange coupling magnetic field to the free magnetic layer, resulting in alignment of the free magnetic layer in a single-domain state, preventing side reading, and meeting trends toward a higher density recording density. Further more, the uniform exchange bias layer prevents generating Barkhausen noise and contributes to the formation of exact output waveforms in the spin-valve thin-film magnetic element.

Preferably, the mean-free-path-extending layer includes a back layer comprising a nonmagnetic conductive material.

Preferably, the back layer comprises at least one element selected from the group consisting of Au, Ag, and Cu.

The back layer extends the mean free path of spin-up conduction electrons which contribute to the magnetoresistive effect (so-called spin filter effect), and the resulting spin-valve thin-film magnetic element exhibits a large rate of change in resistance ($\Delta R/R$) which is suitable for higher-density recording.

Preferably, the back layer has a thickness in the range of 5 to 30 angstroms.

Within this thickness range, the magnetization of the free magnetic layer can be pinned in a suitable magnitude. Thus, the magnetization vector of the free magnetic layer can sensitively rotate in response to an external magnetic field. Since the shunt loss does not increase within this range, an adequate sensing current flows in the interface between the free magnetic layer and the nonmagnetic conductive layer so that and a large rate of change in resistance ($\Delta R/R$) is obtained and the magnetization of the free magnetic layer is readily controlled. Thus, the spin-valve thin-film magnetic element exactly processes signals from a magnetic recording medium without generation of Barkhausen noise.

More preferably, the back layer comprises Cu and has a thickness in the range of 15 to 25 angstroms.

Preferably, the mean-free-path-extending layer includes a mirror reflective layer comprising an insulating material.

Since the mirror reflective layer comprises an insulating material which can form an energy gap having a high probability which causes mirror reflection maintains the spin states of conduction electrons, this layer improves the rate of change in resistance due to the specular effect.

In such a case, the mirror reflective layer preferably has a thickness in the range of 5 to 500 angstroms.

Within this thickness range, the mirror reflective layer adequately exhibits the specular effect, resulting in high sensitivity and satisfactory output characteristics of the spin-valve thin-film magnetic element. Moreover, the upper limit of the thickness range prevents an undesired increase in shield gap or output gap and an undesired decrease in exchange anisotropic magnetic field between the free magnetic layer and the exchange bias layer. As a result, the spin-valve thin-film magnetic element exhibits high read resolution and exact signal processing without generating Barkhausen noise.

Alternatively, the mean-free-path-extending layer may include a mirror reflective layer comprising an insulating material disposed between the exchange bias layer and the back layer.

In this case, the total thickness of the mirror reflective layer and the back layer is preferably in the range of 5 to 500 angstroms.

The mirror reflective layer may comprise a substance which can form a high energy gap having a high probability of mirror reflection maintaining the spin state of the conduction electrons.

Before describing the reasons for the increased rate of change in resistance due to the use of the back layer or the reflective mirror layer, the principle of the giant magnetoresistive effect of the spin-valve thin-film magnetic element will be described with reference to an embodiment in which the back layer or the reflective mirror layer is arranged at a face of the free magnetic layer which is not contact with the nonmagnetic conductive layer.

When a sensing current is applied to the spin-valve thin-film magnetic element, conduction electrons primarily move in the vicinity of the nonmagnetic conductive layer having small electrical resistance. There are two types of conduction electrons, that is, spin-up conduction electrons and spin-down conduction electrons are present in the same quantity in probability. The rate of change in resistance of the spin-valve thin-film magnetic element has a positive correlation with the difference in mean free path of conduction electrons between these two types.

The spin-down conduction electrons are always scattered at the interface between the nonmagnetic conductive layer and the free magnetic layer regardless of the vector of an external magnetic field, and has a low probability of reaching the free magnetic layer, and a mean free path which is always smaller than that of spin-up conduction electrons.

In contrast, the spin-up conduction electrons has a higher probability of moving from the nonmagnetic conductive layer to the free magnetic layer and a larger mean free path when the magnetization vector of the free magnetic layer is parallel to the magnetization vector of the pinned magnetic layer by an external magnetic field. When the external magnetic field changes the magnetization vector of the free magnetic layer from the parallel arrangement, the probability of electron scattering at the interface between the nonmagnetic conductive layer and the free magnetic layer increase and thus the mean free path of the conduction electrons decreases.

As described above, the mean free path of spin-up conduction electrons considerably changes compared with the mean free path of spin-down conduction electrons due to the effect of the external magnetic field, and thus the difference in the mean free path is considerably increased. Accordingly, the rate of change in resistance ($\Delta R/R$) of the spin-valve thin-film magnetic element increases due to a change in resistivity.

When a back layer is deposited at a face, not in contact with the nonmagnetic conductive layer, of the free magnetic layer, the up-spin conduction electrons moving in the free magnetic layer reach the back layer. Thus, the mean free path of the spin-up conduction electrons is further extended. That is, the difference in mean free path between the spin-dependent conduction electrons is further increased by the so-called spin filter effect, and the rate of change in resistance ($\Delta R/R$) of the spin-valve thin-film magnetic element is further improved.

When a reflective mirror layer is deposited at a face, not in contact with the nonmagnetic conductive layer, of the free magnetic layer, the mirror reflective layer forms a potential barrier at the interface with the free magnetic layer so as to reflect the spin-up conduction electrons on the mirror surface while maintaining the spin state. As a result, the mean free path of the spin-up conduction electrons can be further extended. That is, the difference in mean free path between the spin-dependent conduction electrons is further increased by the specular effect, and the rate of change in resistance of the spin-valve thin-film magnetic element is further improved.

When a reflective mirror layer is deposited at a face, in contact with the free magnetic layer, of the back layer, the mean free path of the spin-up conduction electrons is extended due to the spin filter effect, and a potential barrier formed at the interface with the free magnetic layer reflects the spin-up conduction electrons on the mirror surface while maintaining the spin state due to the specular effect. As a result, the mean free path of the spin-up conduction electrons can be further extended. Accordingly, the rate of change in resistance of the spin-valve thin-film magnetic element is further improved.

A free magnetic layer having a relatively small thickness is effective for extending the mean free path due to the back layer and the mirror reflective layer. In addition, the magnetization of the free magnetic layer is controllable by adjusting the thicknesses of these mean-free-path-extending layers. Accordingly, the resulting spin-valve thin-film magnetic element suitable for a narrower track width exhibits both improved detection sensitivity and improved output characteristics.

The antiferromagnetic layer, the pinned magnetic layer, the nonmagnetic conductive layer, the free magnetic layer, and the exchange bias layer may be deposited in that order on the substrate (a bottom type).

Alternatively, the exchange bias layer, the free magnetic layer, the nonmagnetic conductive layer, the pinned magnetic layer, and the antiferromagnetic layer may be deposited in that order on the substrate (a top type).

In the present invention, the pair of electrode layers may lie at least on two sides in the planar direction of the free magnetic layer.

Alternatively, the pair of electrode layers lie at least on two sides in the planar direction of the free magnetic layer, the nonmagnetic conductive layer, and the pinned magnetic layer.

This configuration allows a high sensing current component in the free magnetic layer and the vicinity thereof, without shunt in the antiferromagnetic layer and the exchange bias layer having higher resistance compared with the free magnetic layer and the nonmagnetic conductive layer. Moreover, this configuration can reduce connection resistance between the composite and the electrode layers. Thus, the spin-valve thin-film magnetic element exhibits a further improved rate of change in resistance ($\Delta R/R$) in response to an external magnetic field.

Furthermore, the sensing current is directly applied from the electrode layers to the free magnetic layer while maintaining the single-domain state of the free magnetic layer, preventing side reading. Thus, the spin-valve thin-film magnetic element is suitable for trends toward a higher recording density.

In the present invention, at least one of the pinned magnetic layer and the free magnetic layer may be divided into two sublayers by a nonmagnetic interlayer, said sublayers being in a ferri-magnetic state in which the magnetization vectors thereof are antiparallel to each other.

Such a configuration enhances the exchange coupling magnetic field (exchange anisotropic magnetic field) Hex which is generated at the interface between the antiferromagnetic layer and the first pinned magnetic sublayer. Moreover, one of these pinned magnetic sublayers pins the magnetization vector of the other sublayer in a suitable direction. As a result, the pinned magnetic layer maintains a stable state.

The enhanced exchange coupling magnetic field Hex contributes to thermal stability of the pinned magnetic layer. Thus, the magnetization vector of the pinned magnetic layer can be more readily controlled by a series of annealing steps, as described below.

The pinned magnetic layer having the above double layer configuration reduces the affect of the demagnetizing field (dipole magnetic field) by the pinned magnetization of the pinned magnetic layer on the free magnetic layer, the variable magnetization vector of the free magnetic layer can be corrected to a desired direction. As a result, the spin-valve thin-film magnetic element exhibits slight asymmetry and the variable magnetization vector of the free magnetic layer can be more readily controlled.

Herein the term "asymmetry" indicates the degree of the asymmetry of the read output waveform. When the read output waveform is symmetry, the asymmetry becomes zero. When the variable magnetization vector of the free magnetic layer is orthogonal to the pinned magnetization vector of the pinned magnetic layer, the asymmetry is zero. If the asymmetry is much larger than zero, the spin-valve thin-film magnetic element cannot exactly read information on a medium. As the asymmetry approaches zero, the spin-valve thin-film magnetic element can process read output with high reliability.

The demagnetizing field (dipole magnetic field) $H_d$ due to the pinned magnetization of the pinned magnetic layer has an uneven distribution in which the field is large in the peripheries and is small in the center in the height direction. The single-domain alignment in the free magnetic layer may be inhibited in conventional configurations. In the present invention, the dipole magnetic field $H_d$ substantially is zero due to the multilayered pinned magnetic layer. Since the free magnetic layer is aligned in a single-domain state, the spin-valve thin-film magnetic element does not generate Barkhausen noise and can exactly process signals from a magnetic recording medium.

Preferably, each of the antiferromagnetic layer and the exchange bias layer comprises an alloy comprising Mn and at least one element selected from the group consisting of Pt, Pd, Ir, Rh, Ru, Os, Au, Ag, Cr, Ni, Ne, Ar, Xe, and Kr.

More preferably, the antiferromagnetic layer comprises an alloy represented by the following formula:

$$X_m Mn_{100-m}$$

wherein X is at least one element selected from the group consisting of Pt, Pd, Ir, Rh, Ru, and Os, and the subscript m is in the range of 48 atomic percent$\leq m \leq$60 atomic percent.

Alternatively, the antiferromagnetic layer may comprise an alloy represented by the following formula:

$$Pt_m Mn_{100-m-n} Z_n$$

wherein Z is at least one element selected from the group consisting of Pd, Ir, Rh, Ru, and Os, and the subscripts m and n are in the ranges of 48 atomic percent$\leq m+n \leq$60 atomic percent and 0.2 atomic percent$\leq n \leq$40 atomic percent.

Alternatively, the antiferromagnetic layer may comprise an alloy represented by the following formula:

$$Pt_q Mn_{100-q-j} L_j$$

wherein L is at least one element selected from the group consisting of Au, Ag, Cr, Ni, Ne, Ar, Xe, and Kr, and the subscripts q and j are in the ranges of 48 atomic percent$\leq q+j \leq$60 atomic percent and 0.2 atomic percent$\leq j \leq$10 atomic percent.

Preferably, the exchange bias layer comprises an alloy represented by the following formula:

$$X_m Mn_{100-m}$$

wherein X is at least one element selected from the group consisting of Pt, Pd, Ir, Rh, Ru, and Os, and the subscript m is in the range of 52 atomic percent≦m≦60 atomic percent.

Alternatively, the exchange bias layer may comprise an alloy represented by the following formula:

$$Pt_mMn_{100-m-n}Z_n$$

wherein Z is at least one element selected from the group consisting of Pd, Ir, Rh, Ru, and Os, and the subscripts m and n are in the ranges of 52 atomic percent≦m+n≦60 atomic percent and 0.2 atomic percent≦n≦40 atomic percent.

Alternatively, the exchange bias layer may comprise an alloy represented by the following formula:

$$Pt_qMn_{100-q-j}L_j$$

wherein L is at least one element selected from the group consisting of Au, Ag, Cr, Ni, Ne, Ar, Xe, and Kr, and the subscripts q and j are in the ranges of 52 atomic percent≦q+j 5 60 atomic percent and 0.2 atomic percent≦j≦10 atomic percent.

When the antiferromagnetic layer and the exchange bias layer are composed of an alloy having the same composition, the following combinations (1) to (3) are preferred:

(1) When both the antiferromagnetic layer and the exchange bias layer are composed of an $X_mMn_{100-m}$ alloy wherein X is at least one element selected from the group consisting of Pt, Pd. Ir, Rh, Ru, and Os, the subscript m representing the X content is preferably in the range of 52 atomic percent≦m≦58 atomic percent, and more preferably in the range of 52 atomic percent≦m≦56.5 atomic percent.

(2) When both antiferromagnetic layer and the exchange bias layer are composed of a $Pt_qMn_{100-q-j}L_j$ alloy, the subscripts q and j representing the Pt content and the L content, respectively, are preferably in the ranges of 52 atomic percent≦q+j≦58 atomic percent and 0.2 atomic percent≦j≦10 atomic percent and more preferably in the ranges of 52 atomic percent≦q+j≦56.5 atomic percent and 0.2 atomic percent≦j≦10 atomic percent.

(3) When both antiferromagnetic layer and the exchange bias layer are composed of the $Pt_mMn_{100-m-n}Z_n$ alloy, the subscripts m and n representing the Pt content and the Z content, respectively, are preferably in the ranges of 52 atomic percent≦m+n≦58 atomic percent and 0.2 atomic percent≦n≦40 atomic percent and more preferably in the ranges of 52 atomic percent≦m+n≦56.5 atomic percent and 0.2 atomic percent≦n≦40 atomic percent.

When the antiferromagnetic layer and the exchange bias layer are composed of different alloys having different compositions, the following combinations (4) to (6) are preferred:

(4) The exchange bias layer is composed of an $X_mMn_{100-m}$ alloy wherein X is at least one element selected from the group consisting of Pt, Pd, Ir, Rh, Ru, and Os and the subscript m is in the range of 52 atomic percent≦m≦60 atomic percent, and that the antiferromagnetic layer is composed of another $X_mMn_{100-m}$ alloy wherein the subscript m is in the range of 48 atomic percent≦m≦58 atomic percent. More preferably, the subscript m representing the X content in the antiferromagnetic layer is in the range of 52 atomic percent≦m≦55.2 atomic percent or 56.5 atomic percent≦m≦60 atomic percent.

(5) The exchange bias layer is composed of an $Pt_qMn_{100-q-j}L_j$ alloy wherein L is at least one element selected from the group consisting of Au, Ag, Cr, Ni, Ne, Ar, Xe, and Kr, and the subscripts q and j are in the ranges of 52 atomic percent≦q+j≦60 atomic percent and 0.2 atomic percent≦j≦10 atomic percent, and the antiferromagnetic layer is composed of another $Pt_qMn_{100-q-j}L_j$ alloy wherein L is at least one element selected from the group consisting of Au, Ag, Cr, Ni, Ne, Ar, Xe, and Kr, and the subscripts q and j are in the ranges of 48 atomic percent≦q+j 58 atomic percent and 0.2 atomic percent≦j≦10 atomic percent. More preferably, the subscripts q and j representing the Pt and L contents, respectively, in the antiferromagnetic layer is in the ranges of 52 atomic percent≦q+j≦55.2 atomic percent and 0.2 atomic percent≦j≦10 atomic percent, or in the ranges of 56.5 atomic percent≦q+j≦60 atomic percent and 0.2 atomic percent≦j≦10 atomic percent.

(3) The exchange bias layer is composed of an $Pt_mMn_{100-m-n}Z_n$ alloy wherein Z is at least one element selected from the group consisting of Pd, Ir, Rh, Ru, and Os and the subscripts m and n are in the ranges of 52 atomic percent≦m+n≦60 atomic percent and 0.2 atomic percent≦n≦40 atomic percent, and the antiferromagnetic layer is composed of another $Pt_mMn_{100-m-n}Z_n$ alloy wherein Z is at least one element selected from the group consisting of Pd, Ir, Rh, Ru, and Os and the subscripts m and n are in the ranges of 48 atomic percent≦m+n≦58 atomic percent and 0.2 atomic percent≦n≦40 atomic percent. More preferably, the subscripts m and n representing the Pt and Zn contents, respectively, in the antiferromagnetic layer is in the ranges of 52 atomic percent≦q+j≦55.2 atomic percent and 0.2 atomic percent≦j≦40 atomic percent, or in the ranges of 56.5 atomic percent≦q+j≦60 atomic percent and 0.2 atomic percent≦j≦40 atomic percent.

The above—mentioned combinations are applicable to a bottom-type single spin-valve thin-film magnetic element. When these combinations are applied to a top-type element, the relationship between the composition of the exchange bias layer and the composition of the antiferromagnetic layer are preferably reversed. For example, the composition of the exchange bias layer lying at the substrate side is set to the composition of the antiferromagnetic layer of the bottom-type element.

According to a second aspect of the present invention, a method for making a spin-valve thin-film magnetic element comprises the steps of: depositing an antiferromagnetic layer, a pinned magnetic layer, a nonmagnetic conductive layer, a free magnetic layer, a mean-free-path-extending layer, and an exchange bias layer on a substrate; annealing these layers at a first annealing temperature while applying a first magnetic field in a direction perpendicular to the track width direction to generate an exchange anisotropic magnetic field in the antiferromagnetic layer and another exchange anisotropic magnetic field in the exchange bias layer, the exchange anisotropic magnetic field of the antiferromagnetic layer being larger than the exchange anisotropic magnetic field of the exchange bias layer, so as to pin the magnetization vector of the pinned magnetic layer and the magnetization vector of the free magnetic layer in the same direction; annealing these layers at a second annealing temperature higher than the first annealing temperature while applying a second magnetic field in the track width direction, the second magnetic field being larger than the exchange anisotropic magnetic field of the exchange bias layer and smaller than the exchange anisotropic magnetic field of the antiferromagnetic layer, to impart a bias magnetic field substantially orthogonal to the magnetization vector of the pinned magnetic layer to the free magnetic layer; and forming electrode layers for applying a sensing current to the free magnetic layer.

According to a third aspect of the present invention, a method for making a spin-valve thin-film magnetic element comprises the steps of: depositing an exchange bias layer, a mean-free-path-extending layer, a free magnetic layer, a nonmagnetic conductive layer, a pinned magnetic layer, and an antiferromagnetic layer on a substrate; annealing these layers at a first annealing temperature while applying a first magnetic field in the track width direction to generate an exchange anisotropic magnetic field in the antiferromagnetic layer and another exchange anisotropic magnetic field in the exchange bias layer, the exchange anisotropic magnetic field of the exchange bias layer being larger than the exchange anisotropic magnetic field of the antiferromagnetic layer, so as to pin the magnetization vector of the pinned magnetic layer and the magnetization vector of the free magnetic layer in the same direction; annealing these layers at a second annealing temperature higher than the first annealing temperature while applying a second magnetic field in a direction perpendicular to the track width direction, the second magnetic field being larger than the exchange anisotropic magnetic field of the antiferromagnetic layer and smaller than the exchange anisotropic magnetic field of the exchange bias layer, to impart an exchange coupling magnetic field substantially orthogonal to the magnetization vector of the free magnetic layer to the pinned magnetic layer; and forming electrode layers for applying a sensing current to the free magnetic layer.

In the second and third aspects, each of the antiferromagnetic layer and the exchange bias layer preferably comprises an alloy comprising Mn and at least one element selected from the group consisting of Pt, Pd, Ir, Rh, Ru, Os, Au, Ag, Cr, Ni, Ne, Ar, Xe, and Kr.

Preferably, the first annealing temperature is in the range of 220° C. to 240° C.

Preferably, the second annealing temperature is in the range of 250° C. to 270° C.

In the method for making the spin-valve thin-film magnetic element, a heat resistant alloy, such as a PtMn alloy, is used for not only the antiferromagnetic layer but also the exchange bias layer, and an exchange anisotropic magnetic field can be generated in the exchange bias layer for aligning the magnetization vector of the free magnetic layer in a direction orthogonal to the magnetization vector of the pinned magnetic layer without adversely affecting the magnetization vector of the pinned magnetic layer. The resulting spin-valve thin-film magnetic element exhibits high heat resistance and outputs signals having highly symmetrical waveforms.

This method is applicable to both a bottom-type spin-valve thin-film magnetic element having an antiferromagnetic layer near a substrate and an exchange bias layer distant from the substrate and a top-type spin-valve thin-film magnetic element having an exchange bias layer near a substrate and an antiferromagnetic layer distant from the substrate, by mutually changing the compositions of the antiferromagnetic layer and the exchange bias layer.

BRIEF DESCRIPTION OF THE DRAWINGS

FIG. 1 is a cross-sectional view of a first embodiment of a spin-valve thin-film magnetic element in accordance with the present invention when viewed from a face opposing a recording medium;

FIGS. 9A and 9B are schematic views for illustrating the contribution of a reflective mirror layer to the specular effect in a spin-valve thin-film magnetic element;

FIG. 25 is a cross-sectional view of another conventional spin-valve thin-film magnetic element when viewed from a face opposing a recording medium; and FIG. 26 is a cross-sectional view of another conventional spin-valve thin-film magnetic element when viewed from a face opposing a recording medium.

DESCRIPTION OF THE PREFERRED EMBODIMENTS

First Embodiment

A first embodiment of the spin-valve thin-film magnetic element and a method for making the spin-valve thin-film magnetic element in accordance with the present invention will be described below with reference to the attached drawings.

Figure 2:
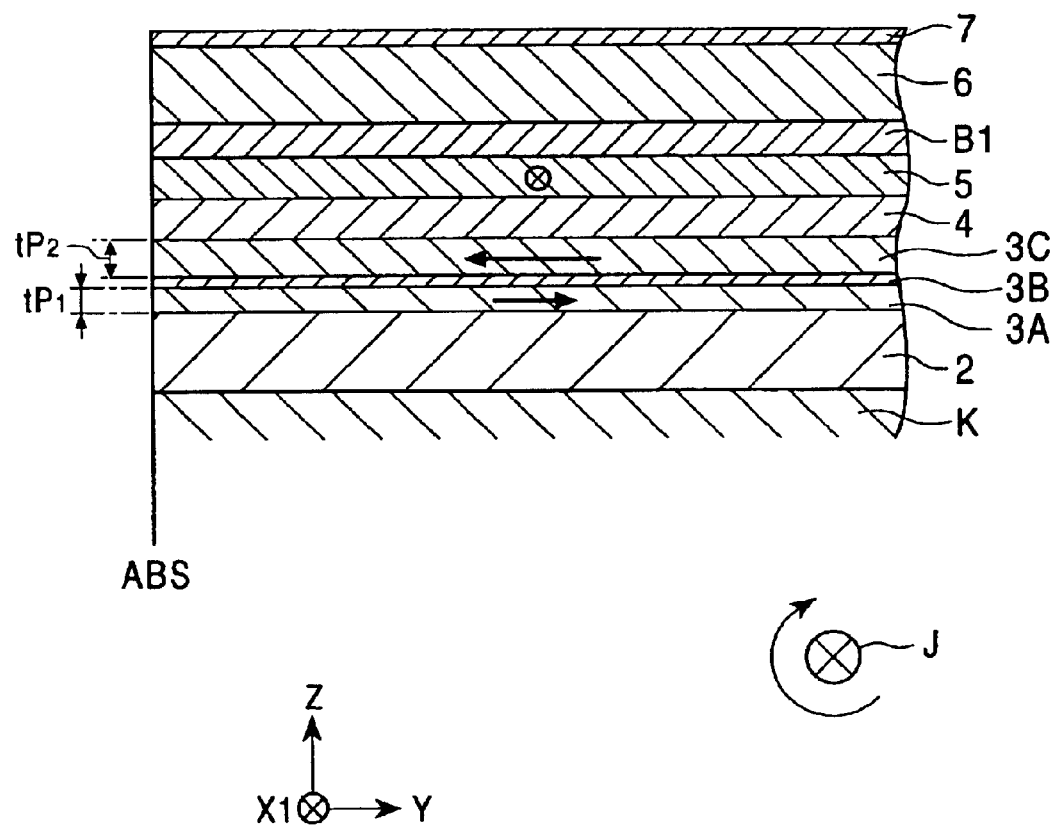
FIG. 2 is a cross-sectional view showing the structure in the height direction of the first embodiment shown in FIG. 1.

FIG. 1 is a cross-sectional view of the first embodiment of the spin-valve thin-film magnetic element in accordance with the present invention when viewed from a face opposing a recording medium. FIG. 2 is a cross-sectional view illustrating the structure of the spin-valve thin-film magnetic element in FIG. 1 in the height direction.

The spin-valve thin-film magnetic element of the present invention is of a type in which a giant magnetoresistive (GMR) element utilizes a giant magnetoresistive effect. This spin-valve thin-film magnetic element is, as will be described below, typically disposed at the trailing end face of a floating slider provided in a hard disk device so as to detect the recording magnetic field of a hard disk or the like. The magnetic recording medium, typically the hard disk, moves in the Z direction and the direction of a leakage magnetic field from the magnetic recording medium is in the Y direction.

The spin-valve thin-film magnetic element of the first embodiment is a bottom-type element having, from the substrate side, an antiferromagnetic layer, a pinned magnetic layer, a nonmagnetic conductive layer, and a free magnetic layer. The pinned magnetic layer has a first pinned magnetic sublayer and a second pinned magnetic sublayer separated by a nonmagnetic interlayer. The magnetization vector of the first pinned magnetic sublayer and that of the second pinned magnetic sublayer are antiparallel to each other so as to put the pinned magnetic layer in a synthetic-ferri magnetic state. In other words, the spin-valve thin-film magnetic element is a synthetic-ferri-pinned type single spin-valve thin-film magnetic element.

Furthermore, in the spin-valve thin-film magnetic element of this embodiment, the magnetization vector of the free magnetic layer is oriented by an exchange-bias method so as to be substantially orthogonal to the magnetization vector of the pinned magnetic layer.

The exchange-bias method is more suitable for a high-density spin-valve thin-film magnetic element having a narrower track width compared to the hard bias mode in which the effective the track width is difficult to control due to the presence of insensitive regions.

In FIGS. 1 and 2, reference numeral 2 denotes an antiferromagnetic layer provided on the substrate K. A pinned magnetic layer 3 is formed on the antiferromagnetic layer 2. A nonmagnetic conductive layer 4, a free magnetic layer 5, a back layer (extending layer) B1, an exchange bias layer 6, and a protective layer 7 are deposited on the pinned magnetic layer 3. The antiferromagnetic layer 2, the pinned magnetic layer 3, the nonmagnetic conductive layer 4, the free magnetic layer 5, the back layer B1, the exchange bias layer 6, and the protective layer 7 constitute a composite 9 having a substantially trapezoidal cross-section. An electrode layer 8 is provided at each of two sides of the composite 9.

More particularly, the spin-valve thin-film magnetic element of the first embodiment in accordance with the present invention has the antiferromagnetic layer 2 having a thickness of approximately 80 to 300 angstroms at the center region of the composite 9. The antiferromagnetic layer 2 is composed of an alloy containing Mn and at least one element selected from the group consisting Pt, Pd, Ir, Rh, Ru, Os, Au, Ag, Cr, Ni, Ne, Ar, Xe, and Kr. The antiferromagnetic layer 2 composed of such an alloy exhibits superior heat resistance and high corrosion resistance.

Preferably, the antiferromagnetic layer 2 is composed of an alloy represented by the following formula:

$$X_mMn_{100-m}$$

wherein X is at least one element selected from the group consisting of Pt, Pd, Rh, Ru, Ir, and Os, and the subscript m is in the range of 48 atomic percent $\leq m \leq 60$ atomic percent, and more preferably, 48 atomic percent $\leq m \leq 58$ atomic percent.

Alternatively, the antiferromagnetic layer 2 may be composed of an alloy represented by the following formula:

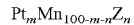

$$Pt_mMn_{100-m-n}Z_n$$

wherein Z is at least one element selected from the group consisting of Pd, Rh, Ru, Ir, and Os, and the subscripts m and n are in the ranges of 48 atomic percent $\leq m+n \leq 60$ atomic percent and 0.2 atomic percent $\leq n \leq 40$ atomic percent.

Preferably, the subscripts m and n are in the ranges of 48 atomic percent $\leq m+n \leq 58$ atomic percent and 0.2 atomic percent $\leq n \leq 40$ atomic percent.

Alternatively, the antiferromagnetic layer 2 may be composed of an alloy represented by the following formula:

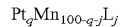

$$Pt_qMn_{100-q-j}L_j$$

wherein L is at least one element selected from the group consisting of Au, Ag, Cr, Ni, Ne, Ar, Xe, and Kr, and the subscripts q and j are in the ranges of 48 atomic percent $\leq q+j \leq 60$ atomic percent and 0.2 atomic percent $\leq j \leq 10$ atomic percent.

Preferably, the subscripts q and j are in the ranges of 48 atomic percent $\leq q+j \leq 58$ atomic percent and 0.2 atomic percent $\leq j \leq 10$ atomic percent.

The PtMn alloy may be replaced with an X—Mn or X'—Pt—Mn alloy wherein X is one element selected from the group consisting of Pd, Ir, Rh, Ru, and Os, and X' is at least one element selected from the group consisting of Pd, Cr, Ru, Ni, Ir, Rh, Os, Au, Ag, Ne, Ar, Xe, and Kr. The Pt or X content in the PtMn alloy or the X—Mn alloy, respectively, is in the range of preferably 37 to 63 atomic percent and more preferably 47 to 57 atomic percent.

In the X'—Pt—Mn alloy, the total content of X' and Pt is in the range of preferably 37 to 63 atomic percent and more preferably 47 to 57 atomic percent, and the X' content is preferably in the range of 0.2 to 10 atomic percent.

When X' is at least one element selected from Pd, Ru, Ir, Rh, and Os, the X' content is preferably in the range of 0.2 to 40 atomic percent.

The antiferromagnetic layer 2 is formed of one of these alloys and is annealed so that the antiferromagnetic layer 2 generates a large exchange coupling magnetic field. When the PtMn alloy is used, the resulting antiferromagnetic layer 2 exhibits a high exchange coupling magnetic field exceeding 48 kA/m, particularly 64 kA/m, and a significantly high blocking temperature of 380° C., wherein the antiferromagnetic layer 2 loses the exchange coupling magnetic field above the blocking temperature.

Each of these alloys in an as-deposited state has a disordered face-centered cubic (fcc) structure having the same lattice constant for the a axis and the c axis, and is changed to a face-centered tetragonal (fct) structure (the ratio of the a axis to the c axis ≈0.9) of a CuAuI type by annealing.

The pinned magnetic layer 3, as shown in FIGS. 1 and 2, includes a first pinned magnetic sublayer 3A and a second pinned magnetic sublayer 3C separated by a nonmagnetic interlayer 3B. The magnetization vector of the first pinned magnetic sublayer 3A and that of the second pinned magnetic sublayer 3C are antiparallel to each other.

The first pinned magnetic sublayer 3A and second pinned magnetic sublayer 3C are composed of a ferromagnetic material, such as elemental cobalt, a NiFe alloy, a CoNiFe alloy, a CoFe alloy, a CoNi alloy, or the like. The first pinned magnetic sublayer 3A and the second pinned magnetic sublayer 3C are composed of the same material. Because the magnetic thickness $tP_2$ of the second pinned magnetic sublayer 3C is larger than the magnetic thickness $tP_1$ of the first pinned magnetic sublayer 3A, the magnetic moment of the second pinned magnetic sublayer 3C is larger than that of the first pinned magnetic sublayer 3A.

Preferably, the first pinned magnetic sublayer 3A and the second pinned magnetic sublayer 3C have different magnetic moments. Thus, the thickness $tP_1$ of the first pinned magnetic sublayer 3A may be larger than the thickness $tP_2$ of the second pinned magnetic sublayer 3C.

The first pinned magnetic sublayer 3A is formed to be in contact with the antiferromagnetic layer 2 and is then annealed in a magnetic field so as to generate an exchange coupling magnetic field (exchange anisotropic magnetic field) at the interface between the first pinned magnetic sublayer 3A and the antiferromagnetic layer 2. The magnetization vector of the first pinned magnetic sublayer 3A is pinned, for example, in the Y direction, that is, the direction away from the magnetic recording medium (the height direction), as shown in FIGS. 1 and 2. When the magnetization vector of the first pinned magnetic sublayer 3A is pinned in the Y direction in the drawings, the magnetization vector of the second pinned magnetic sublayer 3C opposing the first pinned magnetic sublayer 3A with the nonmagnetic interlayer 3B therebetween is pinned to be in a state antiparallel to the magnetization vector of the first pinned magnetic sublayer 3A (a ferri-pinned state), in other words, the magnetization vector is pinned in the direction opposite to the Y direction in the drawings.

An increased exchange coupling magnetic field allows the magnetization vector of the first pinned magnetic sublayer 3A and that of the second pinned magnetic sublayer 3C to be stably maintained in an antiparallel state. Especially when a PtMn alloy having a high blocking temperature and capable of generating an increased exchange coupling magnetic field (exchange anisotropic magnetic field) Hex* at the interface with the first pinned magnetic sublayer 3A is employed, the magnetization vectors of the first and second pinned magnetic sublayers 3A and 3C are thermally stabilized in an antiparallel state.

In this embodiment, as will be described later, the ratio of the thickness of the first pinned magnetic sublayer 3A to that of the nonmagnetic interlayer 3B is controlled within an appropriate range to increase the exchange coupling magnetic field (Hex*), so that the magnetization vectors of the first and second pinned magnetic sublayers 3A and 3C, respectively, are thermally stabilized in an antiparallel state (ferri-pinned state), while the rate of change in resistance (ΔR/R) is maintained at an ordinary level. The magnetization vectors of the first and second pinned magnetic sublayers 3A and 3C can be appropriately controlled by adjusting the direction and the magnitude of the magnetic field during annealing.

The nonmagnetic conductive layer 4 is composed of, for example, copper (Cu), and has a thickness in the range of 20 to 25 angstroms.

Preferably, the free magnetic layer 5 has a thickness in the range of 10 to 50 angstroms and is composed of the same material as the first and second pinned magnetic sublayers 3A and 3C.

The free magnetic layer 5 is magnetized by the exchange coupling magnetic field with the exchange bias layer 6, and the magnetization vector thereof is oriented in the X1 direction in the drawing, that is, the direction substantially orthogonal to the magnetic vector of the pinned magnetic layer 3.

Since the free magnetic layer 5 is put into a single-magnetic-domain state by the exchange bias layer 6, Barkhausen noise is prevented from occurring.

As the antiferromagnetic layer 2, the exchange bias layer 6 is composed of an alloy containing Mn and at least one element selected from the group consisting of Pt, Pd, Ir, Rh, Ru, Os, Au, Ag, Cr, Ni, Ne, Ar, Xe, and Kr. By annealing in a magnetic field, the exchange anisotropic magnetic field is generated at the interface with the free magnetic layer 5 thereby magnetizing the free magnetic field 5 in a predetermined direction.

The resulting exchange bias layer 6 exhibits superior thermal resistance and high corrosion resistance.

Preferably, the exchange bias layer 6 is composed of an alloy represented by the following formula:

$$X_m Mn_{100-m}$$

wherein X is at least one element selected from the group consisting of Pt, Pd, Rh, Ru, Ir, and Os, and the subscript m is in the range of 52 atomic percent≦m≦60 atomic percent.

Alternatively, the exchange bias layer 6 may be composed of an alloy represented by the following formula:

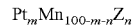

$$Pt_m Mn_{100-m-n} Z_n$$

wherein Z is at least one element selected from the group consisting of Pd, Ir, Rh, Ru, Os, Au, Ag, Cr, and Ni, and the subscripts m and n are in the ranges of 52 atomic percent≦m+n≦60 atomic percent and 0.2 atomic percent≦n≦40 atomic percent.

Alternatively, the exchange bias layer 6 may be composed of an alloy represented by the following formula:

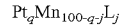

$$Pt_q Mn_{100-q-j} L_j$$

wherein L is at least one element selected from the group consisting of Au, Ag, Cr, Ni, Ne, Ar, Xe, and Kr, and the subscripts q and j are in the ranges of 52 atomic percent≦q+j≦60 atomic percent and 0.2 atomic percent≦j≦10 atomic percent.

The back layer B1 is composed of a nonmagnetic conductive material or a metallic material such as copper (Cu) and may be composed of a material selected from the group consisting of Au, Ag and Cu. In a preferred embodiment, the thickness thereof is set in the range of 5 to 30 angstroms.

By optimizing the thickness of the back layer B1, the magnitude of the exchange anisotropic magnetic field generated by the exchange coupling between the free magnetic layer 5 and the exchange bias layer 6 can be controlled within a suitable range. Meanwhile, because the exchange bias layer 6, which contributes to generating the exchange anisotropic magnetic field by exchange coupling so as to set the magnetization vector of the free magnetic layer 5, can be adjusted to have a predetermined thickness, the free magnetic layer 5 can be readily put into a single-magnetic-domain state, thus preventing side readings and meeting the need for higher magnetic recording density.

Furthermore, by providing the back layer B1, as will be described below, the mean-free-path of spin-up conduction electrons which contributes to the magnetoresistive effect is extended. By what is known as the "spin filter effect", the spin-valve thin-film magnetic element obtains a large rate of change in resistance ($\Delta R/R$) and thus meets the need for higher density recordings.

The thickness of the back layer B1 may be set in the range of 5 to 30 angstroms. When the back layer B1 has a thickness of less than 5 angstroms, the exchange anisotropic magnetic field generated by the exchange coupling between the free magnetic layer 5 and the exchange bias layer 6 becomes too strong, firmly pinning the magnetization vector of the free magnetic layer 5. Thus, the magnetization vector of the free magnetic layer 5 does not change even when there is an external magnetic field to be detected, the change in resistance does not occur, the detection sensitivity is degraded, and the read output characteristics of the spin-valve thin-film magnetic element are undesirably deteriorated. Furthermore, the rate of change in resistance cannot be improved by the spin filter effect which is described below.

When the thickness of the back layer B1 exceeds 30 angstroms, the ratio of a sensing current imparted to the back layer B1 composed of a nonmagnetic conductive material increases. Thus, the sensing current flowing in the interface between the free magnetic layer 5 and the exchange bias layer 6 and in the vicinity of the interface, that is, the current necessary for obtaining the GMR effect, decreases. In other words, the shunt loss of the sensing current is increased. In such a case, not only does it become difficult to obtain a large rate of change in resistance ($\Delta R/R$), but also the exchange anisotropic magnetic field generated by the exchange coupling between the free magnetic layer 5 and the exchange bias layer 6 becomes so weak that it is difficult to control the magnetization vector in the free magnetic layer 5. Consequently, Barkhausen noise causing instability in processing signals provided from the magnetic recording medium may undesirably occur.

The protective layer 7 is composed of tantalum (Ta) and has an oxide layer on the surface thereof.

The electrode layers 8 are preferably composed of, for example, Au, W, Cr, or Ta and are arranged on two sides in the planar direction of at least the free magnetic layer 5, the nonmagnetic conductive layer 4, and the pinned magnetic layer 3 of the composite 9, as shown in FIG. 1. In this configuration, the demagnetizing field in the track width direction in the free magnetic layer 5 may be intensified. Thus, the configurations below may be alternatively employed to prevent the intense demagnetizing field.

Figure 20:
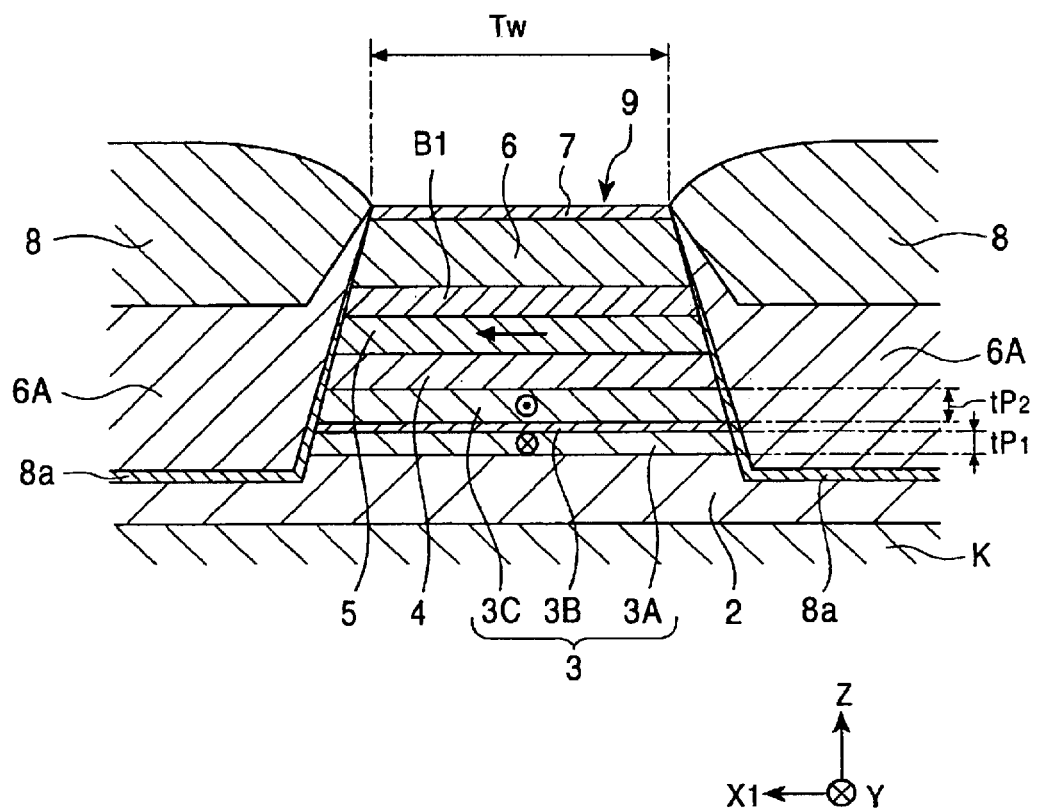
FIG. 20 is a cross-sectional view of a configuration in electrode layers of the spin-valve thin-film magnetic element shown in FIG. 1.
Figure 21:
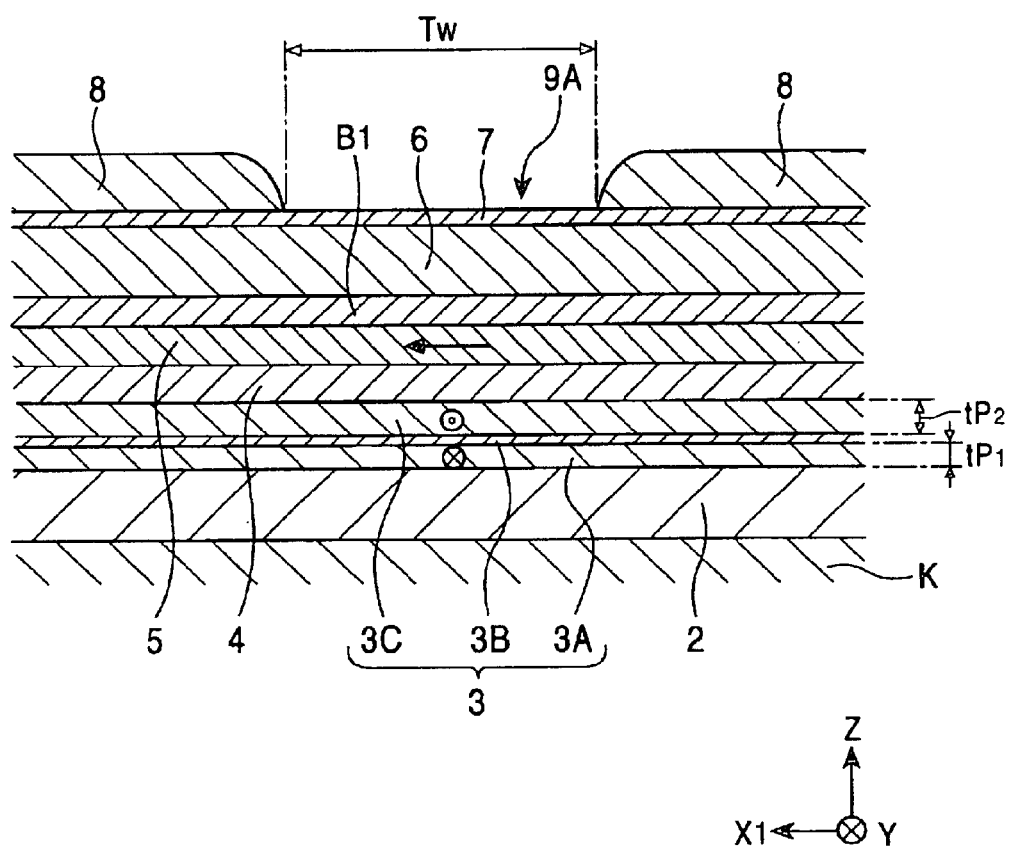
FIG. 21 is a cross-sectional view of another configuration in the electrode layers of the spin-valve thin-film magnetic element shown in FIG. 1.

The electrode layers 8 may be formed directly on the exchange bias layer 6 without removing the two side portions of the composite 9, as in the element shown in FIG. 21. Alternatively, as in the element shown in FIG. 20, the electrode layers 8 may be formed on the permanent magnetic field layer 6A after two sides in the planar direction of the composite are removed down to the antiferromagnetic layer 5 so as to magnetically and directly connect the ends of the permanent magnetic layer 6A and the free magnetic layer 5.

Figure 22:
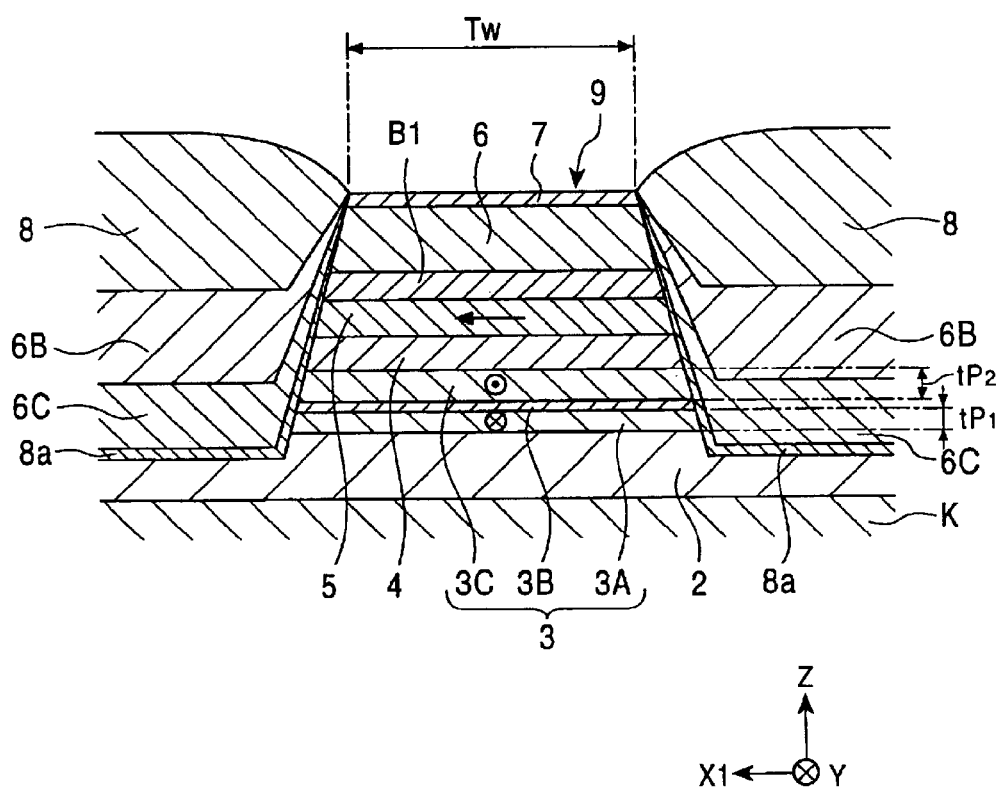
FIG. 22 is a cross-sectional view of another configuration in the electrode layers of the spin-valve thin-film magnetic element shown in FIG. 1.

Alternatively, as in the element shown in FIG. 22, the electrode layers 8 may be formed after the soft magnetic layer 6C and the second bias layer 6B composed of the same type of material as that of the exchange bias layer 6 at the center portion of the composite 9 are formed at the two sides in the planar direction of the composite 9, thereby magnetically and directly connecting the ends of the soft magnetic layer 6C and the free magnetic layer 5. In this case, a second annealing is performed after the soft magnetic layer 6C, the second bias layer 6B, and the electrode layers 8 are formed.

In the above described structures shown in FIGS. 20 and 22, the portions of the composites 9 and 19' under the electrode layers 8 and 18 are removed so that such portions do not constitute the basic structures of the GMR composites. Thus, such structures suffer less from the problems such as side reading, etc., compared to the structure shown in FIG. 21.

Furthermore, by employing the structure shown in FIG. 21, the free magnetic layers 5 and 15 magnetically maintain a shape elongated in the X1 direction in the drawing (track width direction) so as to reduce the demagnetizing field in the X1 direction and stabilize the magnetization vector in the X1 direction. Thus, a structure preventing the instability of the magnetic field and read waveform can be obtained.

In the structures other than that shown in FIG. 21, because the sensing current is directly provided from the electrode layers 8 to the free magnetic layer 5 without passing through the antiferromagnetic layer 2 and the exchange bias layer 6 having higher resistance compared to the free magnetic layer 5 and the nonmagnetic conductive layer 4, the shunt ratio of the sensing current can be improved. In this manner, the connecting resistance between the composite 9 and the electrode layers 8 can be reduced so as to improve the rate of change in magnetic resistance in the GMR effect, enhancing the read efficiency of the spin-valve thin-film magnetic element.

The electrode layers 8 are formed on electrode underlayers 8a. The electrode underlayers 8a are composed of, for example, tantalum (Ta) or the like and have a thickness of approximately 50 angstroms.

These electrode underlayers 8a function as diffusion barriers when the spin-valve thin-film magnetic element is exposed to an elevated temperature in a curing step, such as UV curing or hard baking, of an insulating resist in a subsequent production process of an inductive write head. The electrode underlayers 8a prevent the characteristics of the antiferromagnetic layer 2, the electrode layers 8, and the like, from degrading due to the thermal diffusion between the electrode layers 8, the antiferromagnetic layer 2, and the neighboring layers.

In the spin-valve thin-film magnetic element shown in FIGS. 1 and 2, the electrode layers 8 supply the sensing current J to the composite 9. When there is a magnetic field from the magnetic recording medium in the Y direction in FIGS. 1 and 2, the magnetization vector of the free magnetic layer 5 changes from the X1 direction to the Y direction in the drawings. At this stage, spin-dependent scattering of conduction electrons occurs due to the so-called GMR effect at the interface between the nonmagnetic conductive layer 13 and the free magnetic layer 14 to detect the leakage magnetic field from the magnetic recording medium as a change in electrical resistance.

Furthermore, the back layer B1 extends the mean-free-path of spin-up conduction electrons, contributing to the magnetoresistive effect. By what is known as the "spin filter effect", the spin-valve thin-film magnetic element obtains a large rate of change in resistance ($\Delta R/R$) thereby complying with the higher density recordings.

Now, the spin filter effect will be described below with reference to FIGS. 8A and 8B.

Figure 8A:
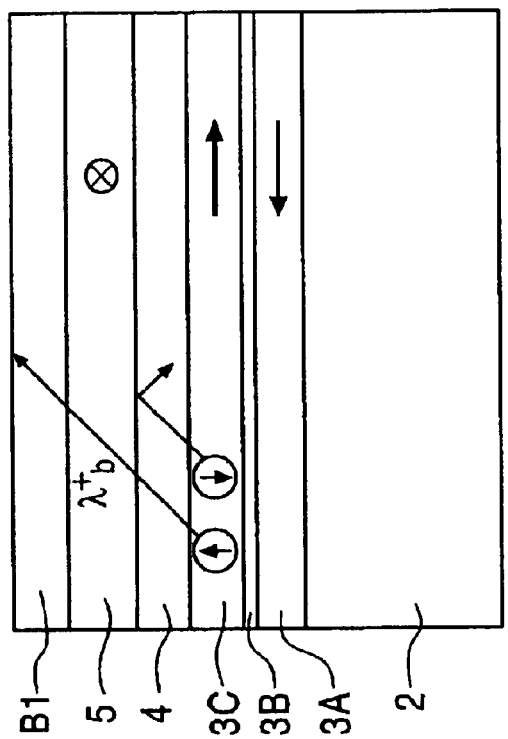
FIGS. 8A and 8B are schematic illustration for explaining the contribution of the back layer to the spin filter effect in a spin-valve thin-film magnetic element.
Figure 8B:
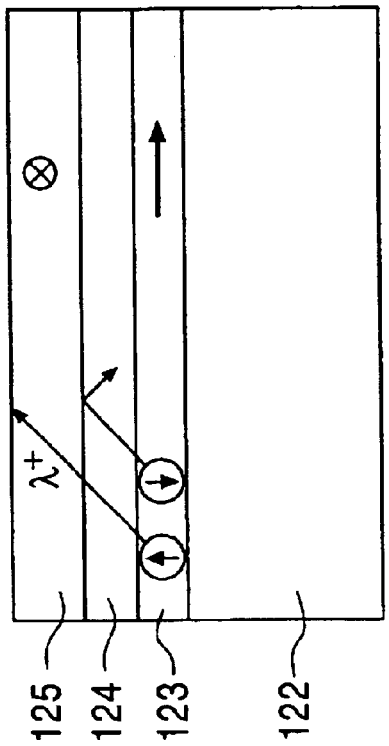
Figure 24:
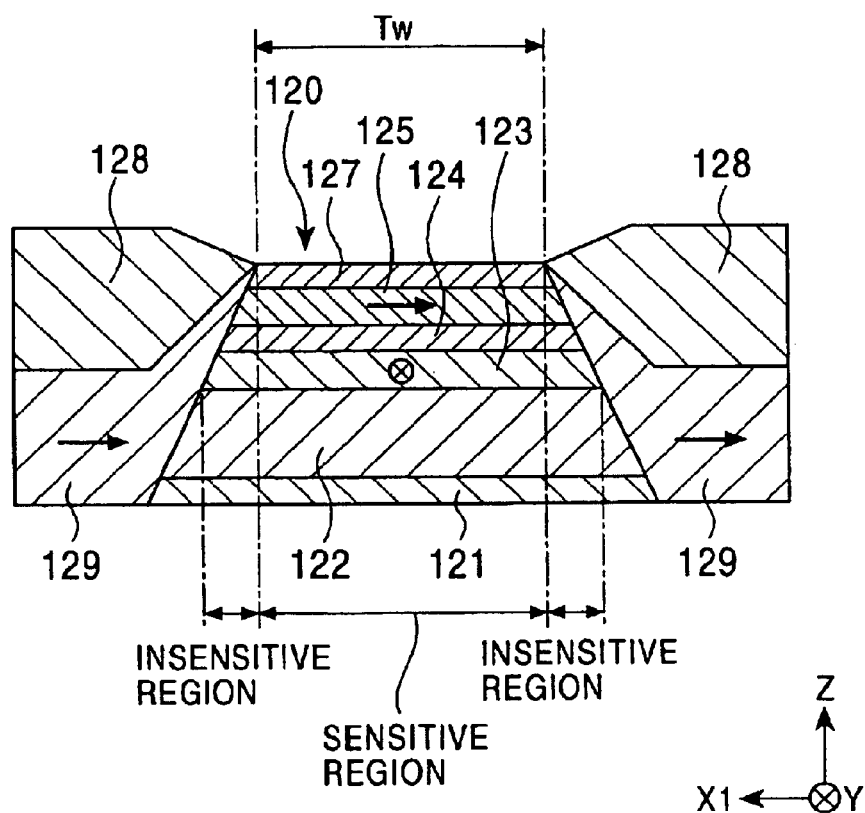
FIG. 24 is a cross-sectional view of a conventional spin-valve thin-film magnetic element when viewed from a face opposing a recording medium.

FIGS. 8A and 8B are schematic illustration for explaining the contribution of the back layer to the spin filter effect in the spin-valve thin-film magnetic element. FIG. 8A illustrates an exemplary structure without a back layer shown in FIG. 24, and FIG. 8B illustrates another exemplary structure provided with a back layer shown in FIG. 1.

The giant magnetoresistive (GMR) effect observed in a magnetic material occurs mainly by the spin-dependent scattering of electrons. In other words, the GMR effect is derived from the difference between a mean-free-path $\lambda^+$ of spin-up conduction electrons parallel to the magnetization vector of the magnetic material, the free magnetic layer 14 in this case, and a mean-free-path $\lambda^-$ of the spin-down conduction electrons. In the drawings, upward arrows indicate spin-up conduction electrons and downward arrows indicate spin-down conduction electrons.

When electrons pass through the free magnetic layer 5, spin-up electrons having the magnetization vector parallel to that of the free magnetic layer 5 can move freely whereas the spin-down electrons are immediately scattered in the free magnetic layer 5.

This is because the mean-free-path $\lambda^+$ of the spin-up conduction electrons is, for example, approximately 50 angstroms, whereas the mean-free-path $\lambda^-$ of the spin-down conduction electrons is approximately 6 angstroms, which is one-tenth the mean-free-path $\lambda^+$.

In this embodiment, the thickness of the free magnetic layer 5 is set larger than the mean-free-path $\lambda^-$ of the spin-down conduction electrons which is approximately 6 angstroms, and is set smaller than the mean-free-path $\lambda^+$ of the spin-up conduction electrons which is approximately 50 angstroms.

As a consequence, the free magnetic layer 5 effectively blocks the spin-down conduction electrons which are minority carriers, but transmits the spin-up conduction electrons which are majority carriers.

The majority carriers and the minority carriers, that is, spin-up electrons and spin-down electrons, respectively, generated in the second pinned magnetic sublayer 3C move toward the free magnetic layer 5.

These carriers are scattered in different manners when the magnetization vector of the free magnetic layer 5 rotates. That is, the spin-up electrons and the spin-down electrons have different traveling modes in the free magnetic layer 5 and contribute to the GMR effect.

Electrons moving from the free magnetic layer 5 toward the second pinned magnetic sublayer 3C also contribute to the GMR effect. Electrons moving from the second pinned magnetic sublayer 3C to the free magnetic layer 5 and electrons moving from the free magnetic layer 5 to the second pinned magnetic sublayer 3C also move in the same direction on average (thus, the description is omitted). Since the number of the spin-up electrons and the number of the spin-down electrons generated in the nonmagnetic conductive layer 35 and the nonmagnetic conductive layer 40 are the same, the sum of the mean-free-paths is constant (the description is omitted).

The number of the spin-down electrons as the minority carriers which are generated in the second pinned magnetic sublayer 3C and pass through the nonmagnetic conductive layer 4 is equal to the number of the spin-down electrons which are scattered at the interface between the second pinned magnetic sublayer 3C and the nonmagnetic conductive layer 4. The spin-down electrons are scattered at the interface between the nonmagnetic conductive layer 4 and the second pinned magnetic sublayer 3C long before these electrons reach the interface with the free magnetic layer 5.

Thus, the mean-free-path of the spin-down electrons does not change regardless of the change in the magnetization vector of the free magnetic layer 5 and does not contribute to the GMR effect.

Accordingly, only the spin-up electrons contribute to the GMR effect.

The majority carriers, that is, the spin-up electrons, generated in the second pinned magnetic sublayer 3C move in the nonmagnetic conductive layer 4 whose thickness is smaller than the mean-free-path $\lambda^+$ of the spin-up electrons and reach the free magnetic layer 5.

When an external magnetic field is not applied to the free magnetic layer 5 and when the magnetization vector of the free magnetic layer 5 does not rotate, these majority carriers can path through without restriction since the spin of the spin-up electrons is in the direction of the magnetization vector of the free magnetic layer 5.

As shown in FIG. 8B, the spin-up electrons, which have passed through the free magnetic layer 5, move in the back layer B1 by an additional mean-free-path $\lambda^+_b$ which is determined by the constituents of the back layer, and are then scattered. When the back layer B1 is not provided, as in FIG. 8A, spin-up electrons move in the free magnetic layer 125 and are scattered at the upper surface. Accordingly, the back layer B1 contributes to extending the mean-free-path by an additional mean-free-path $\lambda^+_b$.

By using a conductive material having relatively low resistance (i.e., longer mean-free-path), the resistance of the spin-valve thin-film magnetic element can be reduced.

When an external magnetic field is applied so as to rotate the magnetization vector of the free magnetic layer 5, spin-up electrons scatter in the free magnetic layer 5 because the direction of spin is not oriented with the magnetization vector of the magnetic material. This will lead to a drastic decrease in the effective mean-free-path and to an increased resistance.

Accordingly, the spin-valve thin-film magnetic element with the back layer B1 has improved read output characteristics due to the GMR effect having a large rate of change in resistance ($\Delta R/R$) compared to that without the back layer B1.

A method for making the spin-valve thin-film magnetic element of the first embodiment of the present invention will now be described with reference to FIG. 3.

This method is based on the fact that the magnitudes of the exchange anisotropic magnetic fields, which are generated by annealing, of the antiferromagnetic layer 2 and the exchange bias layer 6 differ from each other and depend on the positions thereof in the magnetic element. The magnetization vector of the pinned magnetic layer 3 is pinned during a first annealing step, and the magnetization vector of the free magnetic layer 5 is oriented during a second annealing step.

Figure 3:
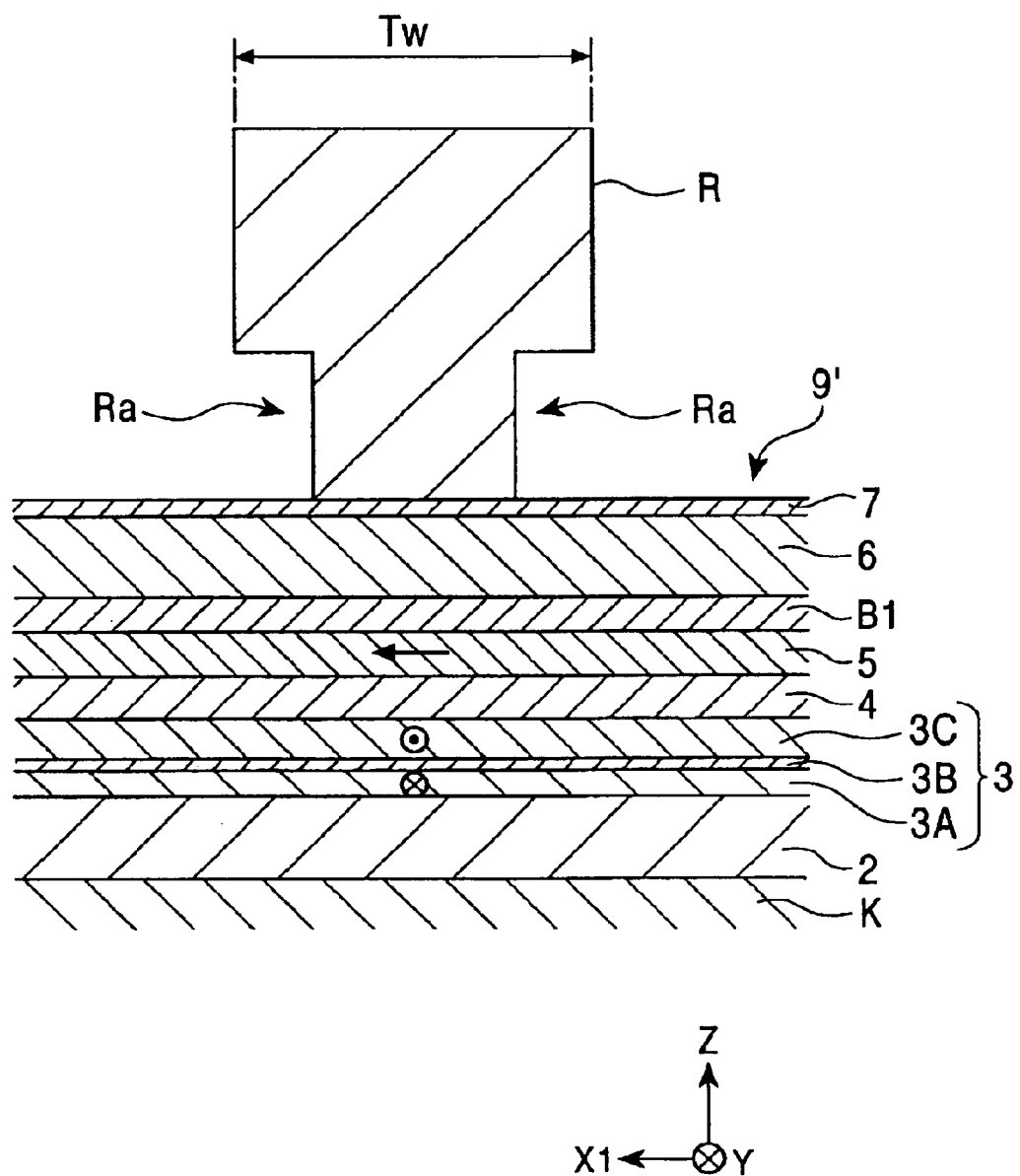
FIG. 3 is a cross-sectional view for illustrating forming a lift-off resist on a composite in a method for making the spin-valve thin-film magnetic element shown in FIG. 1.

In this method, the antiferromagnetic layer 2, the pinned magnetic layer 3, the nonmagnetic conductive layer 4, the free magnetic layer 5, the back layer B1, the exchange bias layer 6, and the protective layer 7 are deposited on the substrate K to form a composite 9' shown in FIG. 3. The composite 9' is annealed at a first annealing temperature while applying a first magnetic field perpendicular to the magnetic recording track width Tw to generate an exchange anisotropic magnetic field in the antiferromagnetic layer 2 and another exchange anisotropic magnetic field in the exchange bias layer 6 so that the magnetization vectors of the pinned magnetic layer 3 and the nonmagnetic conductive layer 4 are pinned in the same direction and the exchange anisotropic magnetic field of the antiferromagnetic layer 2 is larger than the exchange anisotropic magnetic field of the exchange bias layer 6.

Next, the composite 9' is annealed at a second annealing temperature higher than the first annealing temperature while a second magnetic field which is larger than the exchange anisotropic magnetic field of the exchange bias layer 6 and smaller than the exchange anisotropic magnetic field of the antiferromagnetic layer 2 is applied in the track width direction so that a bias magnetic field substantially orthogonal to the magnetization vector of the pinned magnetic layer 3 is applied to the free magnetic layer 5.

A lift-off resist R is formed on the composite 9' in response to the track width Tw. The lift-off resist R partly covers the composite 9' and has the track width Tw in the X1 direction in FIG. 3 at the top and indented sections Ra at two bottom sides.

Figure 4:
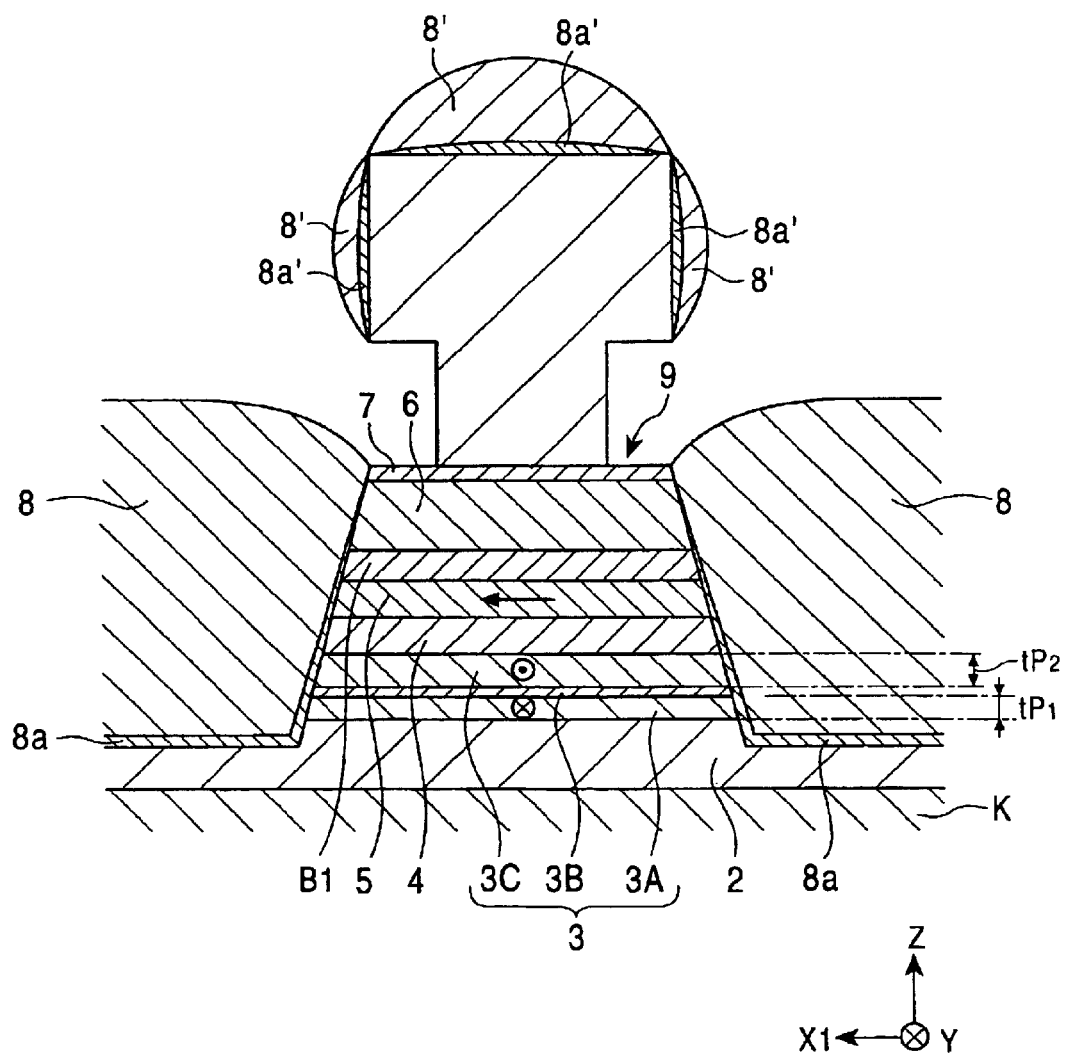
FIG. 4 is a cross-sectional view for illustrating forming electrode layers in the method for making the spin-valve thin-film magnetic element shown in FIG. 1.

In the next step, as shown in FIG. 4, the both sides of the composite 9' are milled by etching so that the bottom portions thereof remain. The composite 9 is thereby formed. The electrode underlayers 8a and the electrode layers 8 are deposited on the both etched portions of the composite 9.

In this embodiment, the electrode underlayers 8a are preferably formed by a sputtering process, such as an ion beam sputtering process, a long-throw sputtering process, a collimation sputtering process, or a combination thereof. As shown in FIG. 4, layers 8a' and 8', which have the same composition as those of the electrode underlayers 8a and the electrode layers 8, respectively, are formed on the lift-off resist R. The lift-off resist R is removed using a resist stripping solution to complete the spin-valve thin-film magnetic element shown in FIG. 1.

The relationship between the annealing temperature of the antiferromagnetic layer and the exchange anisotropic magnetic field will be described in detail with reference to FIGS. 16, 18, and 19.

Figure 16:
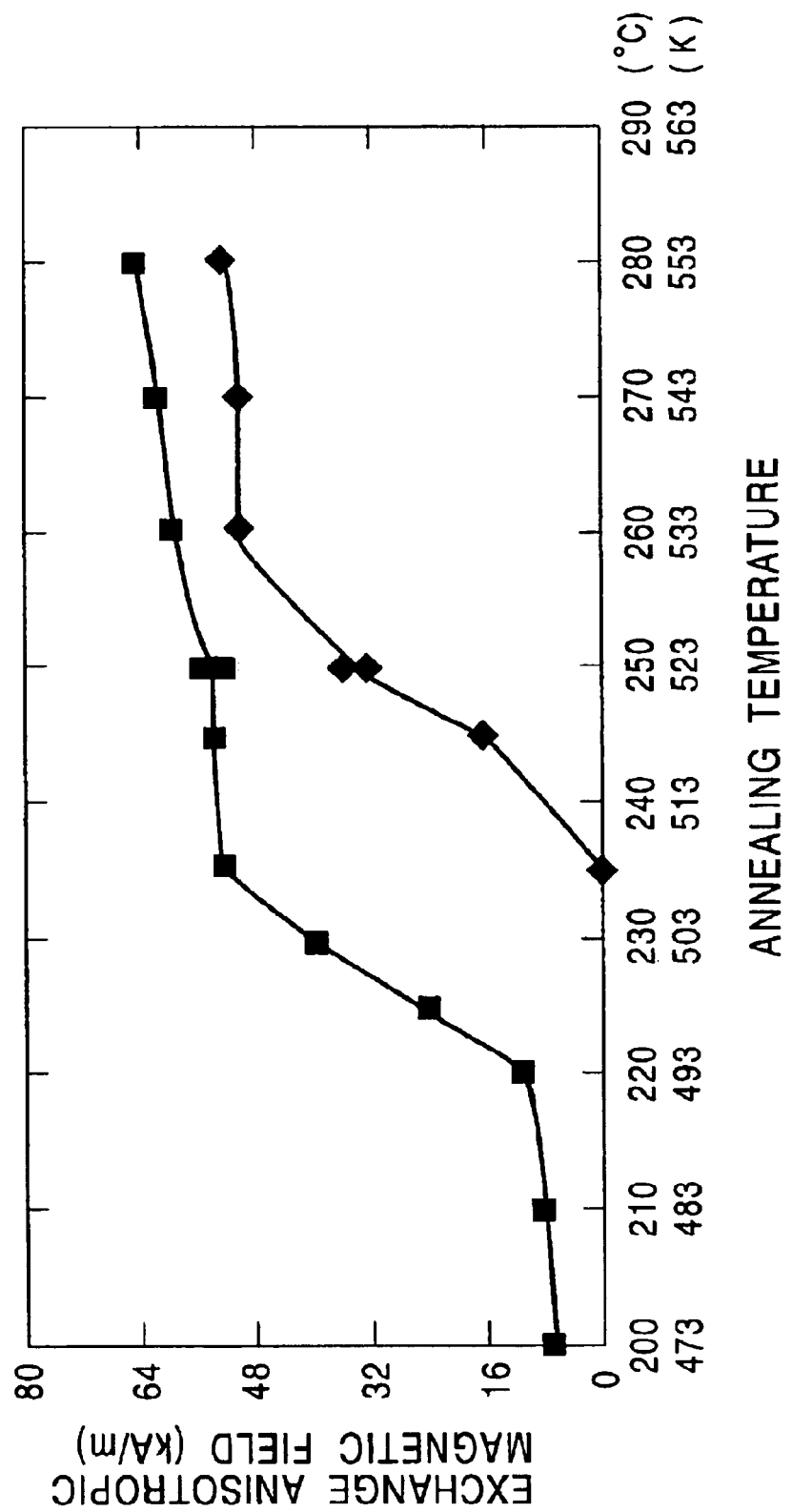
FIG. 16 is a graph illustrating the dependence of the exchange anisotropic magnetic field on the annealing temperature of a $Pt_{55.4}Mn_{44.6}$ alloy and a $Pt_{54.4}Mn_{45.6}$ alloy.

The plot (■) in FIG. 16 illustrates the dependence of the exchange anisotropic magnetic field on the annealing temperature of a bottom-type single spin-valve thin-film magnetic element having an antiferromagnetic layer between a substrate and a free magnetic layer, and the plot (♦) illustrates the dependence of the exchange anisotropic magnetic field on the annealing temperature of a top-type single spin-valve thin-film magnetic element having an antiferromagnetic layer which is distant from a substrate rather than a free magnetic layer. Thus, the antiferromagnetic layer of the top-type single spin-valve thin-film magnetic element is more distant from the substrate than that of the bottom-type single spin-valve thin-film magnetic element.

Figure 18:
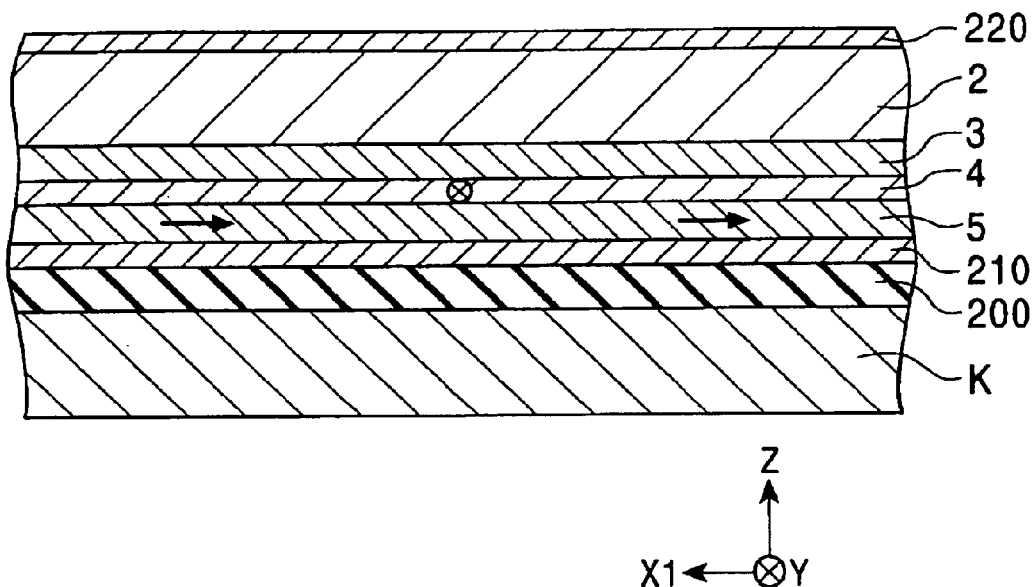
FIG. 18 is a cross-sectional view of a spin-valve thin-film magnetic element used for the measurements shown in FIGS. 16 and 17 when viewed from a face opposing a recording medium.

FIG. 18 shows an actual configuration of the top-type single spin-valve thin-film magnetic element shown by the plot (♦) in FIG. 16. An insulating underlayer 200 composed of $Al_2O_3$ (1,000 angstroms), an underlying layer 210 composed of tantalum (50 angstroms), a free magnetic layer 5 including a NiFe alloy sublayer (70 angstroms) and a cobalt sublayer (10 angstroms), a nonmagnetic conductive layer 4 composed of copper (30 angstroms), a pinned magnetic layer 3 composed of cobalt (25 angstroms), an antiferromagnetic layer 2 composed of $Pt_{54.4}Mn_{45.6}$ (300 angstroms), and a protective layer 220 composed of tantalum (50 angstroms) are deposited in that order on a Si substrate K.

Figure 19:
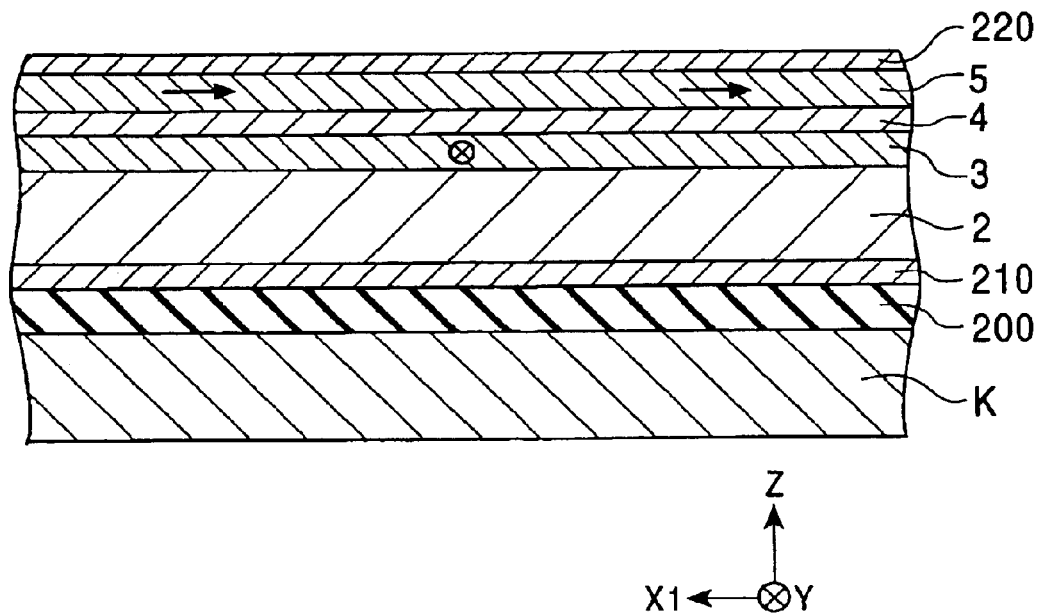
FIG. 19 is a cross-sectional view of a spin-valve thin-film magnetic element used for the measurements shown in FIGS. 16 and 17 when viewed from a face opposing a recording medium.

FIG. 19 shows an actual configuration of the bottom-type single spin-valve thin-film magnetic element shown by the plot (■) in FIG. 16. An insulating underlayer 200 composed of $Al_2O_3$ (1,000 angstroms), an underlying layer 210 composed of tantalum (30 angstroms), an antiferromagnetic layer 2 composed of $Pt_{55.4}Mn_{44.6}$ (300 angstroms), a pinned magnetic layer 3 composed of cobalt (25 angstroms), a nonmagnetic conductive layer 4 composed of copper (26 angstroms), a free magnetic layer 5 including a cobalt sublayer (10 angstroms) and a NiFe alloy sublayer (70 angstroms), and a protective layer 220 composed of tantalum (50 angstroms) are deposited in that order on a Si substrate K.

In the top-type single spin-valve thin-film magnetic element, the antiferromagnetic layer 2 is arranged above the pinned magnetic layer 3 as shown in FIG. 18. The free magnetic layer 5, the nonmagnetic conductive layer 4, and the pinned magnetic layer 3 are disposed between the substrate K and the antiferromagnetic layer 2.

On the other hand, in the bottom-type single spin-valve thin-film magnetic element, the antiferromagnetic layer 2 is arranged below the pinned magnetic layer 3, as shown in FIG. 19. The pinned magnetic layer 3, the nonmagnetic conductive layer 4, and the free magnetic layer 5 are not disposed between the substrate K and the antiferromagnetic layer 2.

As shown in FIG. 16, the exchange anisotropic magnetic field of the antiferromagnetic layer 2 ($Pt_{55.4}Mn_{44.6}$) of the bottom type (■) starts to increase at 220° C. (493 K) and is saturated to approximately 56 kA/m at 240° C. (513 K). The exchange anisotropic magnetic field of the antiferromagnetic layer 2 ($Pt_{55.4}Mn_{44.6}$) of the top type (♦) starts to increase at 240° C. (513 K) and is saturated to a level exceeding 48 kA/m at 260° C. (513 K). The antiferromagnetic layer 2 (♦) near the substrate K exhibits a higher exchange anisotropic magnetic field at a relatively low annealing temperature compared with the antiferromagnetic layer 2 (♦) distant from the substrate K.

The method of this invention is based on such properties of the antiferromagnetic material. Since the spin-valve thin-film magnetic element of the first embodiment is of a bottom type as shown in FIGS. 1 and 2, the antiferromagnetic layer 2 is disposed near the substrate K (or below the pinned magnetic layer 3), and the exchange bias layer 6, which is composed of the same alloy used for the antiferromagnetic layer 2, is distant from the substrate K compared with the antiferromagnetic layer 2.

When the composite 9' shown in FIG. 3 is annealed at the first annealing temperature (220° C. to 240° C. (493 K to 513 K)) in the first magnetic field which is applied to the composite 9', exchange anisotropic magnetic fields are generated in the antiferromagnetic layer 2 and the exchange bias layer 6 to orient the magnetization vectors of the pinned magnetic layer 3 and the free magnetic layer 5 in the same direction. The exchange anisotropic magnetic field of the antiferromagnetic layer 2 is 48 kA/m or more, whereas the exchange anisotropic magnetic field of the exchange bias layer 6 is 8 kA/m or less. Thus, the exchange anisotropic magnetic field of the antiferromagnetic layer 2 is larger than the exchange anisotropic magnetic field of the exchange bias layer 6.

Next, the composite 9' is annealed at the second annealing temperature (250° C. to 270° C. (523 K to 543 K)) in the second magnetic field which is perpendicular to the first magnetic field. The exchange anisotropic magnetic field of the exchange bias layer 6 increases to 48 kA/m or more. Thus, the magnetization vector of the free magnetic layer 5 is substantially orthogonal to the first magnetic field.

When the second magnetic field is set to be smaller than the exchange anisotropic magnetic field of the antiferromagnetic layer 2, which is generated by the first annealing step, the second magnetic field does not deteriorate the exchange anisotropic magnetic field of the antiferromagnetic layer 2 to maintain the pinned magnetization vector of the pinned magnetic layer 3. Accordingly, the magnetization vector of the pinned magnetic layer 3 is substantially orthogonal to the magnetization vector of the free magnetic layer 5.

Preferably, the first annealing temperature is in the range of 220° C. to 240° C. (493 K to 513 K). When the first annealing temperature is less than 220° C. (493 K), the antiferromagnetic layer 2 exhibits an exchange anisotropic magnetic field of 16 kA/m or less, which is insufficient for enhancing the magnetization of the pinned magnetic layer 3. Thus, the magnetization vector of the pinned magnetic layer 3 is undesirably magnetized in the same direction as the magnetization vector of the free magnetic layer 5. More preferably, the first annealing temperature is in the range of 230° C. to 240° C. (503 K to 513 K). The exchange anisotropic magnetic field of the antiferromagnetic layer 2 is thereby increased to 32 kA/m or more and the exchange anisotropic magnetic field of the pinned magnetic layer 3 is further increased.

Preferably, the second annealing temperature is in the range of 250° C. to 270° C. (523 K to 543 K). When the second annealing temperature is less than 250° C. (523 K), the exchange bias layer 6 exhibits an exchange anisotropic magnetic field of less than 32 kA/m, which is insufficient for increasing the longitudinal magnetic field of the free magnetic layer 5. Moreover, the magnetization vector of the free magnetic layer 5, which is fixed in the first annealing step, is not oriented in a direction substantially orthogonal to the magnetization vector of the pinned magnetic layer 3. A second annealing temperature exceeding 270° C. (543 K) does not contribute to a further increase in the exchange anisotropic magnetic field of the exchange bias layer 6 and results in an undesired decrease in magnetoresistive effect due to the thermal interlayer diffusion.

Figure 17:
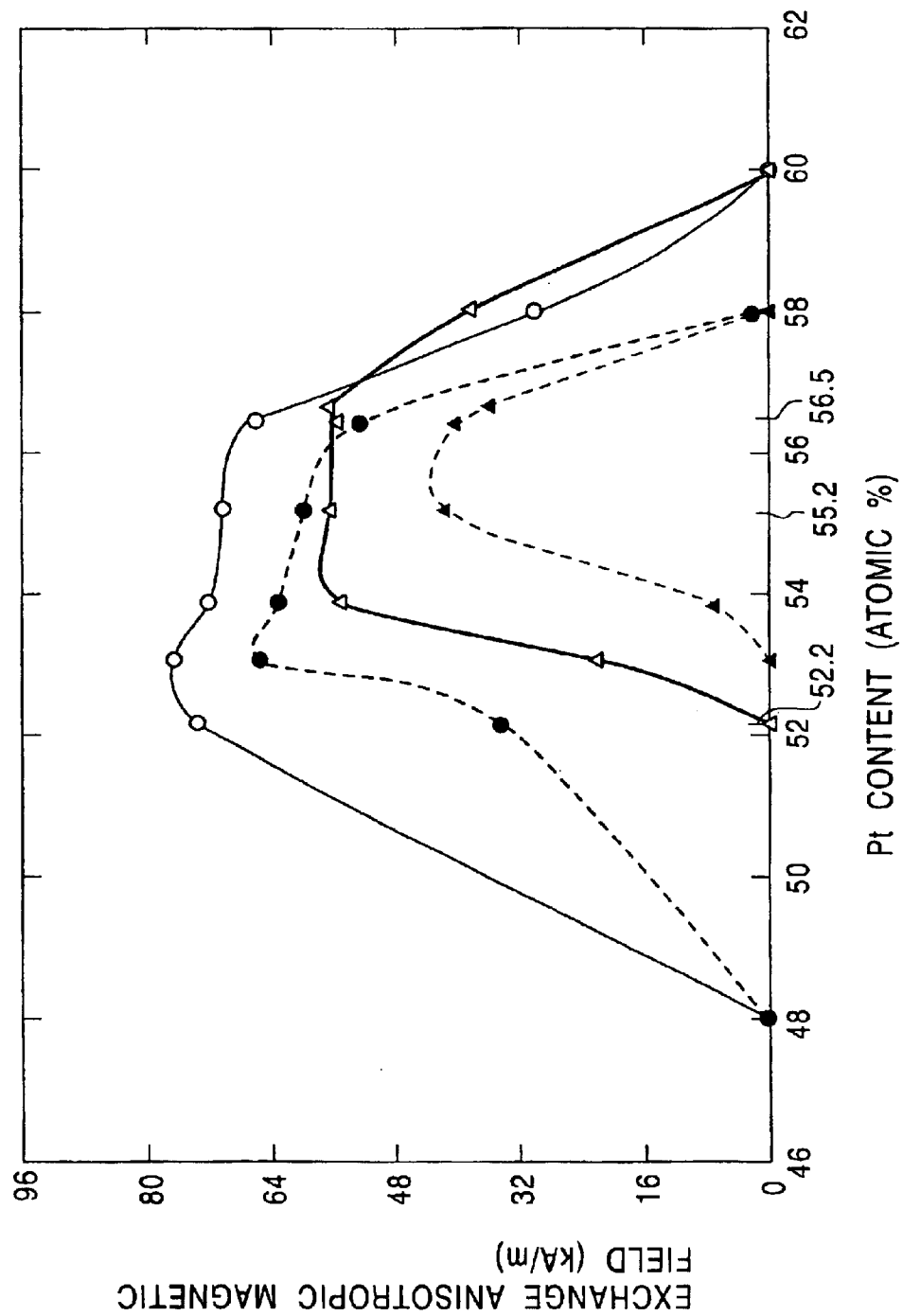
FIG. 17 is a graph of the dependence of the exchange anisotropic magnetic field on the Pt content (m) in $Pt_mMn_{100-m}$ alloys.

FIG. 17 is a graph of the dependence of the exchange anisotropic magnetic field on the Pt content (m) in $Pt_mMn_{100-m}$ alloys. FIG. 17 suggests that the optimization of the compositions of the antiferromagnetic layer 2 and the exchange bias layer 6 (these composition are different from each other) yields a larger exchange anisotropic magnetic field of the antiferromagnetic layer 2 and does not substantially yield an exchange anisotropic magnetic field of the exchange bias layer 6, after the first annealing step. This relationship is advantageous for the second annealing step.

The relationship between the composition of the antiferromagnetic layer and the exchange anisotropic magnetic field annealed at 245° C. (518 K) or 270° C. (543 K) will be described in more detailed with reference to FIG. 17.

The plots (Δ) and (▲) illustrate the relationships in a top-type single spin-valve thin-film magnetic element annealed at 270° C. and 245° C., respectively. That is, an antiferromagnetic layer is distant from a substrate rather than a free magnetic layer.

The plots (○) and (●) illustrate the relationships in a bottom-type single spin-valve thin-film magnetic element annealed at 270° C. and 245° C., respectively. That is, an antiferromagnetic layer is disposed between a substrate and a free magnetic layer.

FIG. 18 shows an actual configuration of the top-type single spin-valve thin-film magnetic element shown by the plots (Δ) and (▲) in FIG. 17. An insulating underlayer 200 composed of $Al_2O_3$ (1,000 angstroms), an underlying layer 210 composed of tantalum (50 angstroms), a free magnetic layer 5 including a NiFe alloy sublayer (70 angstroms) and a cobalt sublayer (10 angstroms), a nonmagnetic conductive layer 4 composed of copper (30 angstroms), a pinned magnetic layer 3 composed of cobalt (25 angstroms), an antiferromagnetic layer 2 composed of $Pt_mMn_t$ (300 angstroms), and a protective layer 220 composed of tantalum (50 angstroms) are deposited in that order on a Si substrate K.

FIG. 19 shows an actual configuration of the bottom-type single spin-valve thin-film magnetic element shown by the plots (○) and (●) in FIG. 17. An insulating underlayer 200 composed of $Al_2O_3$ (1,000 angstroms), an underlying layer 210 composed of tantalum (30 angstroms), an antiferromagnetic layer 2 composed of $Pt_mMn_t$ (300 angstroms), a pinned magnetic layer 3 composed of cobalt (25 angstroms), a nonmagnetic conductive layer 4 composed of copper (26 angstroms), a free magnetic layer 5 including a cobalt sublayer (10 angstroms) and a NiFe alloy sublayer (70 angstroms), and a protective layer 220 composed of tantalum (50 angstroms) are deposited in that order on a Si substrate K.

The method of the first embodiment is based on the difference in properties, shown in FIG. 17, of the antiferromagnetic layer between the bottom-type element and the top-type element. That is, in the bottom-type element in the first embodiment, preferably, the alloy composition of the antiferromagnetic layer 2 near the substrate K is similar to the alloy composition of the antiferromagnetic layer (○ and ●) for the bottom-type element shown in FIG. 17, whereas the alloy composition of the exchange bias layer 6 distant from the substrate K is similar to the alloy composition of the antiferromagnetic layer (Δ and ▲) for the top-type element shown in FIG. 17.

When the antiferromagnetic layer 2 of the bottom-type element is composed of an $X_mMn_{100-m}$ alloy wherein X is at least one element selected from the group consisting of Pt, Pd, Ir, Rh, Ru, and Os, as shown in FIG. 17, the subscript m representing the X content is preferably in the range of 48 atomic percent $\leq m \leq$ 60 atomic percent. At an X content less than 48 atomic percent or exceeding 60 atomic percent, the $X_mMn_{100-m}$ crystal is barely transformed into an $L1_0$-type ordered lattice (CuAuI-type face centered tetragonal ordered lattice) structure during the second annealing step at 270° C. (543 K) and the alloy does not exhibit antiferromagnetic characteristics. That is, the alloy does not exhibit a unidirectional exchange coupling magnetic field.

More preferably, the subscript m is in the range of 48 atomic percent $\leq m \leq$ 58 atomic percent. At an X content less than 48 atomic percent or exceeding 58 atomic percent, the $X_mMn_{100-m}$ crystal is barely transformed into an $L1_0$-type ordered lattice structure during the first annealing step at 245° C. (183 K) and the alloy does not exhibit antiferromagnetic characteristics. That is, the alloy does not exhibit a unidirectional exchange coupling magnetic field.

When the antiferromagnetic layer 2 of the bottom-type element is composed of an $Pt_mMn_{100-m-n}Z_n$ alloy wherein Z is at least one element selected from the group consisting of Pd, Ir, Rh, Ru, and Os, the subscripts m and n representing the Pt content and the Z content, respectively, are preferably in the ranges of 48 atomic percent $\leq m+n \leq$ 60 atomic percent and 0.2 atomic percent $\leq n \leq$ 40 atomic percent.

At a total content (m+n) of Pt and Z less than 48 atomic percent or exceeding 60 atomic percent, the $Pt_mMn_{100-m-n}Z_n$ crystal is barely transformed into an $L1_0$-type ordered lattice structure during the second annealing step at 270° C. (543 K) and the alloy does not exhibit antiferromagnetic characteristics. That is, the alloy does not exhibit a unidirectional exchange coupling magnetic field.

At a Z content of less than 0.2 atomic percent, ordering of the crystal lattice in the antiferromagnetic layer is insufficient for yielding a large exchange anisotropic magnetic field. At a Z content exceeding 40 atomic percent, the exchange anisotropic magnetic field undesirably decreases.

More preferably, the total content (m+n) is in the range of 48 atomic percent$\leq$m$\leq$58 atomic percent. At a total content (m+n) less than 48 atomic percent or exceeding 58 atomic percent, the $Pt_mMn_{100-m-n}Z_n$ crystal is barely transformed into an $L1_0$-type ordered lattice structure during the first annealing step at 245° C. (183 K) and the alloy does not exhibit antiferromagnetic characteristics. That is, the alloy does not exhibit a unidirectional exchange coupling magnetic field.

When the antiferromagnetic layer 2 of the bottom-type element is composed of an $Pt_qMn_{100-q-j}L_j$ alloy wherein L is at least one element selected from the group consisting of Au, Ag, Cr, Ni, Ne, Ar, Xe, and Kr, the subscripts q and j representing the Pt content and the L content, respectively, are preferably in the ranges of 48 atomic percent$\leq$q+j$\leq$60 atomic percent and 0.2 atomic percent$\leq$j$\leq$10 atomic percent.

At a total content (q+j) of Pt and L less than 48 atomic percent or exceeding 60 atomic percent, the $Pt_qMn_{100-q-j}L_j$ crystal is barely transformed into an $L1_0$-type ordered lattice structure during the second annealing step at 270° C. (543 K) and the alloy does not exhibit antiferromagnetic characteristics. That is, the alloy does not exhibit a unidirectional exchange coupling magnetic field.

At an L content of less than 0.2 atomic percent, ordering of the crystal lattice in the antiferromagnetic layer is insufficient for yielding a large exchange anisotropic magnetic field. At an L content exceeding 10 atomic percent, the exchange anisotropic magnetic field undesirably decreases.

More preferably, the total content (q+j) is in the range of 48 atomic percent$\leq$m$\leq$58 atomic percent. At a total content (q+j) less than 48 atomic percent or exceeding 58 atomic percent, the $Pt_qMn_{100-q-j}L_j$ crystal is barely transformed into an $L1_0$-type ordered lattice structure during the first annealing step at 245° C. (183 K) and the alloy does not exhibit antiferromagnetic characteristics. That is, the alloy does not exhibit a unidirectional exchange coupling magnetic field.

When the exchange bias layer 6 is composed of an $X_mMn_{100-m}$ alloy wherein X is at least one element selected from the group consisting of Pt, Pd, Ir, Rh, Ru, and Os, the subscript m representing the X content is preferably in the range of 52 atomic percent$\leq$m$\leq$60 atomic percent. At an X content less than 52 atomic percent or exceeding 60 atomic percent, the $X_mMn_{100-m}$ crystal is barely transformed into an $L1_0$-type ordered lattice structure during the second annealing step at 270° C. (543 K) and the alloy does not exhibit antiferromagnetic characteristics. That is, the alloy does not exhibit a unidirectional exchange coupling magnetic field.

When the exchange bias layer 6 is composed of an $Pt_mMn_{100-m-n}Z_n$ alloy wherein Z is at least one element selected from the group consisting of Pd, Ir, Rh, Ru, and Os, the subscripts m and n representing the Pt content and the Z content, respectively, are preferably in the ranges of 52 atomic percent$\leq$m+n$\leq$60 atomic percent and 0.2 atomic percent$\leq$n$\leq$40 atomic percent.

At a total content (m+n) of Pt and Z less than 52 atomic percent or exceeding 60 atomic percent, the $Pt_mMn_{100-m-n}Z_n$ crystal is barely transformed into an $L1_0$-type ordered lattice structure during the second annealing step at 270° C. (543 K) and the alloy does not exhibit antiferromagnetic characteristics. That is, the alloy does not exhibit a unidirectional exchange coupling magnetic field.

At a Z content of less than 0.2 atomic percent, ordering of the crystal lattice in the antiferromagnetic layer is insufficient for yielding a large exchange anisotropic magnetic field. At a Z content exceeding 40 atomic percent, the exchange anisotropic magnetic field undesirably decreases.

When the exchange bias layer 6 is composed of an $Pt_qMn_{100-q-j}L_j$ alloy wherein L is at least one element selected from the group consisting of Au, Ag, Cr, Ni, Ne, Ar, Xe, and Kr, the subscripts q and j representing the Pt content and the L content, respectively, are preferably in the ranges of 52 atomic percent$\leq$q+j$\leq$60 atomic percent and 0.2 atomic percent$\leq$j$\leq$10 atomic percent.

At a total content (q+j) of Pt and L less than 52 atomic percent or exceeding 60 atomic percent, the $Pt_qMn_{100-q-j}L_j$ crystal is barely transformed into an $L1_0$-type ordered lattice structure during the second annealing step at 270° C. (543 K) and the alloy does not exhibit antiferromagnetic characteristics. That is, the alloy does not exhibit a unidirectional exchange coupling magnetic field.

At an L content of less than 0.2 atomic percent, ordering of the crystal lattice in the antiferromagnetic layer is insufficient for yielding a large exchange anisotropic magnetic field. At an L content exceeding 10 atomic percent, the exchange anisotropic magnetic field undesirably decreases.

When both the antiferromagnetic layer 2 and the exchange bias layer 6 are composed of an $X_mMn_{100-m}$ alloy wherein X is at least one element selected from the group consisting of Pt, Pd, Ir, Rh, Ru, and Os, the subscript m representing the X content is preferably in the range of 52 atomic percent >m$\leq$58 atomic percent.

At an X content less than 52 atomic percent, the $X_mMn_{100-m}$ crystal in the exchange bias layer 6 is barely transformed into an $L1_0$-type ordered lattice structure during the second annealing step at 270° C. (543 K) and the alloy does not exhibit antiferromagnetic characteristics. That is, the alloy does not exhibit a unidirectional exchange coupling magnetic field.

On the other hand, at an X content exceeding 58 atomic percent, the $X_mMn_{100-m}$ crystal in the antiferromagnetic layer 2 is barely transformed into an $L1_0$-type ordered lattice structure during the first annealing step at 245° C. (518 K) and the alloy does not exhibit antiferromagnetic characteristics. That is, the alloy does not exhibit a unidirectional exchange coupling magnetic field.

When both the antiferromagnetic layer 2 and the exchange bias layer 6 are composed of the $X_mMn_{100-m}$ alloy, the subscript m representing the X content is more preferably in the range of 52 atomic percent$\leq$m$\leq$56.5 atomic percent.

At an X content less than 52 atomic percent, the $X_mMn_{100-m}$ crystal in the exchange bias layer 6 is barely transformed into an $L1_0$-type ordered lattice structure during the second annealing step at 270° C. (543 K) and the alloy does not exhibit antiferromagnetic characteristics. That is, the alloy does not exhibit a unidirectional exchange coupling magnetic field.

On the other hand, at an X content exceeding 56.5 atomic percent, the exchange anisotropic magnetic field of the antiferromagnetic layer 2 is slightly larger than the exchange anisotropic magnetic field of the exchange bias layer 6 after the first annealing step at 245° C. (518 K). Thus, the pinned magnetic layer 3 may be magnetized in a direction which is the same as the magnetization vector of the free magnetic layer 5, or it is difficult to magnetize the free magnetic layer 5 in a direction which is perpendicular to the magnetization vector of the pinned magnetic layer 3, during the second annealing step at 270° C. (543 K).

When both the antiferromagnetic layer 2 and the exchange bias layer 6 are composed of the $X_mMn_{100-m}$ alloy, the subscript m representing the X content is most preferably in the range of 52 atomic percent$\leq$m$\leq$55.2 atomic percent.

At an X content less than 52 atomic percent, the $X_mMn_{100-m}$ crystal in the exchange bias layer 6 is barely transformed into an $L1_0$-type ordered lattice structure during the second annealing step at 270° C. (543 K) and the alloy does not exhibit antiferromagnetic characteristics. That is, the alloy does not exhibit a unidirectional exchange coupling magnetic field.

On the other hand, at an X content exceeding 55.2 atomic percent, the exchange anisotropic magnetic field of the antiferromagnetic layer 2 is slightly larger than the exchange anisotropic magnetic field of the exchange bias layer 6 after the first annealing step at 245° C. (518 K). Thus, the pinned magnetic layer 3 may be magnetized in a direction which is the same as the magnetization vector of the free magnetic layer 5, or it is difficult to magnetize the free magnetic layer 5 in a direction which is perpendicular to the magnetization vector of the pinned magnetic layer 3, during the second annealing step at 270° C. (543 K).

When both the antiferromagnetic layer 2 and the exchange bias layer 6 have compositions in the ranges of 52 atomic percent$\leq$m$\leq$55.2 atomic percent, the exchange anisotropic magnetic field of the antiferromagnetic layer 2 is larger than that of the exchange bias layer 6 after the first annealing step, and a large difference in the exchange anisotropic magnetic field between the antiferromagnetic layer 2 and the exchange bias layer 6 is ensured after the second annealing step. Thus, the magnetization vector of the free magnetic layer 5 smoothly changes in response to signal magnetic fields from a magnetic recording medium without a change in the magnetization vector of the pinned magnetic layer 3.

When both antiferromagnetic layer 2 and the exchange bias layer 6 are composed of an $Pt_mMn_{100-m-n}Z_n$ alloy wherein Z is at least one element selected from the group consisting of Pd, Ir, Rh, Ru, and Os, the subscripts m and n representing the Pt content and the Z content, respectively, are preferably in the ranges of 52 atomic percent$\leq$m+n$\leq$58 atomic percent and 0.2 atomic percent$\leq$n$\leq$40 atomic percent.

At a total content (m+n) of Pt and Z less than 52 atomic percent, the $Pt_mMn_{100-m-n}Z_n$ crystal in the exchange bias layer 6 is barely transformed into an $L1_0$-type ordered lattice structure during the second annealing step at 270° C. (543 K) and the alloy does not exhibit antiferromagnetic characteristics. That is, the alloy does not exhibit a unidirectional exchange coupling magnetic field.

At a total content (m+n) exceeding 58 atomic percent, the $Pt_mMn_{100-m-n}Z_n$ crystal in the antiferromagnetic layer 2 is barely transformed into an $L1_0$-type ordered lattice structure during the first annealing step at 245° C. (518 K) and the alloy does not exhibit antiferromagnetic characteristics. That is, the alloy does not exhibit a unidirectional exchange coupling magnetic field.

At a Z content of less than 0.2 atomic percent, the unidirectional exchange coupling magnetic field is not sufficiently improved. At a Z content exceeding 40 atomic percent, the unidirectional exchange magnetic field undesirably decreases.

When both antiferromagnetic layer 2 and the exchange bias layer 6 are composed of the $Pt_mMn_{100-m-n}Z_n$ alloy, the subscripts m and n representing the Pt content and the Z content, respectively, are more preferably in the ranges of 52 atomic percent$\leq$m+n$\leq$56.5 atomic percent and 0.2 atomic percent$\leq$n$\leq$40 atomic percent.

At a total content (m+n) of Pt and Z less than 52 atomic percent, the $Pt_mMn_{100-m-n}Z_n$ crystal is barely transformed into an $L1_0$-type ordered lattice structure during the second annealing step at 270° C. (543 K) and the alloy does not exhibit antiferromagnetic characteristics. That is, the alloy does not exhibit a unidirectional exchange coupling magnetic field.

On the other hand, at a total content (m+n) exceeding 56.5 atomic percent, the exchange anisotropic magnetic field of the antiferromagnetic layer 2 is slightly larger than the exchange anisotropic magnetic field of the exchange bias layer 6 after the first annealing step at 245° C. (518 K). Thus, the pinned magnetic layer 3 may be magnetized in a direction which is the same as the magnetization vector of the free magnetic layer 5, or it is difficult to magnetize the free magnetic layer 5 in a direction which is perpendicular to the magnetization vector of the pinned magnetic layer 3, during the second annealing step at 270° C. (543 K).

At a Z content of less than 0.2 atomic percent, the unidirectional exchange coupling magnetic field is not sufficiently improved. At a Z content exceeding 40 atomic percent, the unidirectional exchange magnetic field undesirably decreases.

When both antiferromagnetic layer 2 and the exchange bias layer 6 are composed of the $Pt_mMn_{100-m-n}Z_n$ alloy, the subscripts m and n representing the Pt content and the Z content, respectively, are more preferably in the ranges of 52 atomic percent$\leq$m+n$\leq$55.2 atomic percent and 0.2 atomic percent$\leq$n$\leq$40 atomic percent.

At a total content (m+n) of Pt and Z less than 52 atomic percent, the $Pt_mMn_{100-m-n}Z_n$ crystal in the exchange bias layer 6 is barely transformed into an $L1_0$-type ordered lattice structure during the second annealing step at 270° C. (543 K) and the alloy does not exhibit antiferromagnetic characteristics. That is, the alloy does not exhibit a unidirectional exchange coupling magnetic field.

On the other hand, at a total content (m+n) exceeding 55.2 atomic percent, the exchange anisotropic magnetic field of the antiferromagnetic layer 2 is slightly larger than the exchange anisotropic magnetic field of the exchange bias layer 6 after the first annealing step at 245° C. (518 K). Thus, the pinned magnetic layer 3 may be magnetized in a direction which is the same as the magnetization vector of the free magnetic layer 5, or it is difficult to magnetize the free magnetic layer 5 in a direction which is perpendicular to the magnetization vector of the pinned magnetic layer 3, during the second annealing step at 270° C. (543 K).

At a Z content of less than 0.2 atomic percent, the unidirectional exchange coupling magnetic field is not sufficiently improved. At a Z content exceeding 40 atomic percent, the unidirectional exchange magnetic field undesirably decreases.

Accordingly, when both the antiferromagnetic layer 2 and the exchange bias layer 6 have compositions in the ranges of 52 atomic percent$\leq$m+n$\leq$55.2 atomic percent and 0.2 atomic percent$\leq$n$\leq$40 atomic percent, the exchange anisotropic magnetic field of the antiferromagnetic layer 2 is larger than that of the exchange bias layer 6 after the first annealing step, and a large difference in the exchange anisotropic magnetic fields between the antiferromagnetic layer 2 and the exchange bias layer 6 is ensured after the second annealing step. Thus, the magnetization vector of the free magnetic layer 5 smoothly changes in response to signal magnetic fields from a magnetic recording medium without a change in the magnetization vector of the pinned magnetic layer 3.

When both the antiferromagnetic layer 2 and the exchange bias layer 6 are composed of an $Pt_qMn_{100-q-j}L_j$ alloy wherein L is at least one element selected from the group consisting of Au, Ag, Cr, Ni, Ne, Ar, Xe, and Kr, the subscripts q and j representing the Pt content and the L content, respectively, are preferably in the ranges of 52 atomic percent$\leq$q+j$\leq$58 atomic percent and 0.2 atomic percent$\leq$j$\leq$10 atomic percent.

At a total content (q+j) of Pt and L less than 52 atomic percent, the $Pt_qMn_{100-q-j}L_j$ crystal in the exchange bias layer 6 is barely transformed into an $Ll_0$-type ordered lattice structure during the second annealing step at 270° C. (543 K) and the alloy does not exhibit antiferromagnetic characteristics. That is, the alloy does not exhibit a unidirectional exchange coupling magnetic field.

At a total content (q+j) exceeding 58 atomic percent, the $Pt_qMn_{100-q-j}L_j$ crystal in the antiferromagnetic layer 2 is barely transformed into an $Ll_0$-type ordered lattice structure during the first annealing step at 245° C. (518 K) and the alloy does not exhibit antiferromagnetic characteristics. That is, the alloy does not exhibit a unidirectional exchange coupling magnetic field.

At an L content of less than 0.2 atomic percent, the unidirectional exchange coupling magnetic field is not sufficiently improved. At an L content exceeding 10 atomic percent, the unidirectional exchange magnetic field undesirably decreases.

When both antiferromagnetic layer 2 and the exchange bias layer 6 are composed of the $Pt_qMn_{100-q-j}L_j$ alloy, the subscripts q and j representing the Pt content and the L content, respectively, are more preferably in the ranges of 52 atomic percent$\leq$q+j$\leq$56.5 atomic percent and 0.2 atomic percent$\leq$j$\leq$10 atomic percent.

At a total content (q+j) of Pt and L less than 52 atomic percent, the $Pt_qMn_{100-q-j}L_j$ crystal in the exchange bias layer 6 is barely transformed into an $Ll_0$-type ordered lattice structure during the second annealing step at 270° C. (543 K) and the alloy does not exhibit antiferromagnetic characteristics. That is, the alloy does not exhibit a unidirectional exchange coupling magnetic field.

On the other hand, at a total content (q+j) exceeding 56.5 atomic percent, the exchange anisotropic magnetic field of the antiferromagnetic layer 2 is slightly larger than the exchange anisotropic magnetic field of the exchange bias layer 6 after the first annealing step at 245° C. (518 K). Thus, the pinned magnetic layer 3 may be magnetized in a direction which is the same as the magnetization vector of the free magnetic layer 5, or it is difficult to magnetize the free magnetic layer 5 in a direction which is perpendicular to the magnetization vector of the pinned magnetic layer 3, during the second annealing step at 270° C. (543 K).

At an L content of less than 0.2 atomic percent, the unidirectional exchange coupling magnetic field is not sufficiently improved. At an L content exceeding 10 atomic percent, the unidirectional exchange magnetic field undesirably decreases.

When both antiferromagnetic layer 2 and the exchange bias layer 6 are composed of the $Pt_qMn_{100-q-j}L_j$ alloy, the subscripts q and j representing the Pt content and the L content, respectively, are more preferably in the ranges of 52 atomic percent$\leq$q+j$\leq$55.2 atomic percent and 0.2 atomic percent$\leq$j$\leq$10 atomic percent.

At a total content (q+j) of Pt and L less than 52 atomic percent, the $Pt_qMn_{100-q-j}L_j$ crystal in the exchange bias layer 6 is barely transformed into an $Ll_0$-type ordered lattice structure during the second annealing step at 270° C. (543 K) and the alloy does not exhibit antiferromagnetic characteristics. That is, the alloy does not exhibit a unidirectional exchange coupling magnetic field.

On the other hand, at a total content (q+j) exceeding 55.2 atomic percent, the exchange anisotropic magnetic field of the antiferromagnetic layer 2 is slightly larger than the exchange anisotropic magnetic field of the exchange bias layer 6 after the first annealing step at 245° C. (518 K). Thus, the pinned magnetic layer 3 may be magnetized in a direction which is the same as the magnetization vector of the free magnetic layer 5, or it is difficult to magnetize the free magnetic layer 5 in a direction which is perpendicular to the magnetization vector of the pinned magnetic layer 3, during the second annealing step at 270° C. (543 K).

At an L content of less than 0.2 atomic percent, the unidirectional exchange coupling magnetic field is not sufficiently improved. At an L content exceeding 10 atomic percent, the unidirectional exchange magnetic field undesirably decreases.

Accordingly, when both the antiferromagnetic layer 2 and the exchange bias layer 6 have compositions in the ranges of 52 atomic percent$\leq$q+j$\leq$55.2 atomic percent and 0.2 atomic percent$\leq$j$\leq$10 atomic percent, the exchange anisotropic magnetic field of the antiferromagnetic layer 2 is larger than that of the exchange bias layer 6 after the first annealing step, and a large difference in the exchange anisotropic magnetic fields between the antiferromagnetic layer 2 and the exchange bias layer 6 is ensured after the second annealing step. Thus, the magnetization vector of the free magnetic layer 5 smoothly changes in response to signal magnetic fields from a magnetic recording medium without a change in the magnetization vector of the pinned magnetic layer 3.

When the composition of the antiferromagnetic layer 2 is different from the composition of the exchange bias layer 6, for example, when the Mn content in the antiferromagnetic layer 2 is larger than that in the exchange bias layer 6, a larger difference in the exchange coupling magnetic fields between these layers is achieved after the first annealing step. Thus, the orthogonal relationship is further ensured between the magnetization vector of the free magnetic layer 5 and the magnetization vector of the pinned magnetic layer 3 after the second annealing step.

Moreover, the difference in the exchange anisotropic magnetic fields between the antiferromagnetic layer 2 and the exchange bias layer 6 is further increased. Thus, the magnetization vector of the free magnetic layer 5 more smoothly changes in response to signal magnetic fields from a magnetic recording medium without a change in the magnetization vector of the pinned magnetic layer 3.

Accordingly, it is preferable that the exchange bias layer 6 be composed of an $X_mMn_{100-m}$ alloy wherein X is at least one element selected from the group consisting of Pt, Pd, Ir, Rh, Ru, and Os and the subscript m is in the range of 52 atomic percent$\leq$m$\leq$60 atomic percent, and that the antiferromagnetic layer 2 be composed of another $X_mMn_{100-m}$ alloy wherein the subscript m is in the range of 48 atomic percent$\leq$m$\leq$58 atomic percent.

When the X content in the exchange bias layer 6 is less than 52 atomic percent or exceeds 60 atomic percent, the $X_mMn_{100-m}$ crystal in the exchange bias layer 6 is barely transformed into an $Ll_0$-type ordered lattice structure during the second annealing step at 270° C. (543 K) and the alloy does not exhibit antiferromagnetic characteristics. That is, the alloy does not exhibit a unidirectional exchange coupling magnetic field.

When the X content in the antiferromagnetic layer 2 is less than 48 atomic percent or exceeds 58 atomic percent, the $X_mMn_{100-m}$ crystal in the antiferromagnetic layer 2 is barely transformed into an $Ll_0$-type ordered lattice structure during the first annealing step at 245° C. (518 K) and the alloy does not exhibit antiferromagnetic characteristics. That is, the alloy does not exhibit a unidirectional exchange coupling magnetic field.

Accordingly, the composition of the antiferromagnetic layer 2 and the composition of the exchange bias layer 6 (these compositions are different from each other) are optimized within the above ranges so that the exchange anisotropic magnetic field of the antiferromagnetic layer 2 is larger than the exchange anisotropic magnetic field of the exchange bias layer 6 after the first annealing step at the first annealing temperature 245° C. (518 K) and after the second annealing step at the second annealing temperature 270° C. (543 K).

Such a combination of the antiferromagnetic layer 2 and the exchange bias layer 6 having different compositions enhances the difference in the exchange anisotropic magnetic fields between these layers after the first and second annealing steps, compared with a combination having the same composition. Thus, design versatility and flexibility are improved.

Furthermore, the exchange anisotropic magnetic field of the antiferromagnetic layer 2 is larger than the exchange anisotropic magnetic field of the exchange bias layer 6 after the first annealing step, and the orthogonal relationship between the magnetization vector of the free magnetic layer 5 and the magnetization vector of the pinned magnetic layer 3 can be ensured, while the magnetization vector of the pinned magnetic layer 3 is firmly pinned and both the magnitude and the vector of the exchange anisotropic magnetic field of the antiferromagnetic layer 2 are fixed after the second annealing step.

Moreover, the exchange anisotropic magnetic field of the antiferromagnetic layer 2 is larger than the exchange anisotropic magnetic field of the exchange bias layer 6 after the second annealing step. Thus, the magnetization vector of the free magnetic layer 5 smoothly changes in response to signal magnetic fields from a magnetic recording medium without a change in the magnetization vector of the pinned magnetic layer 3.

In another preferred combination of the antiferromagnetic layer 2 and the exchange bias layer 6, the exchange bias layer 6 is composed of an $Pt_mMn_{100-m-n}Z_n$ alloy wherein Z is at least one element selected from the group consisting of Pd, Ir, Rh, Ru, and Os and the subscripts m and n are in the ranges of 52 atomic percent$\leq$m+n$\leq$60 atomic percent and 0.2 atomic percent$\leq$n$\leq$40 atomic percent, and the antiferromagnetic layer 2 is composed of another $Pt_mMn_{100-m-n}Z_n$ alloy wherein Z is at least one element selected from the group consisting of Pd, Ir, Rh, Ru, and Os and the subscripts m and n are in the ranges of 48 atomic percent$\leq$m+n$\leq$58 atomic percent and 0.2 atomic percent$\leq$n$\leq$40 atomic percent.

When the total content (m+n) of Pt and Z in the exchange bias layer 6 is less than 52 atomic percent or exceeds 60 atomic percent, the $Pt_mMn_{100-m-n}Z_n$ crystal in the exchange bias layer 6 is barely transformed into an $Ll_0$-type ordered lattice structure during the second annealing step at 270° C. (543 K) and the alloy does not exhibit antiferromagnetic characteristics. That is, the alloy does not exhibit a unidirectional exchange coupling magnetic field.

When the Z content in the exchange bias layer 6 is less than 0.2 atomic percent, the unidirectional exchange coupling magnetic field is not sufficiently improved. When the Z content exceeds 40 atomic percent, the unidirectional exchange magnetic field undesirably decreases.

When the total content (m+n) of Pt and Z in the antiferromagnetic layer 2 is less than 48 atomic percent or exceeds 58 atomic percent, the $Pt_mMn_{100-m-n}Z_n$ crystal in the antiferromagnetic layer 2 is barely transformed into an $Ll_0$-type ordered lattice structure during the first annealing step at 245° C. (518 K) and the alloy does not exhibit antiferromagnetic characteristics. That is, the alloy does not exhibit a unidirectional exchange coupling magnetic field.

When the Z content in the antiferromagnetic layer 2 is less than 0.2 atomic percent, the unidirectional exchange coupling magnetic field is not sufficiently improved. When the Z content exceeds 40 atomic percent, the unidirectional exchange magnetic field undesirably decreases.

Accordingly, the composition of the antiferromagnetic layer 2 and the composition of the exchange bias layer 6 (these compositions are different from each other) are optimized within the above ranges so that the exchange anisotropic magnetic field of the antiferromagnetic layer 2 is larger than the exchange anisotropic magnetic field of the exchange bias layer 6 after the first annealing step at the first annealing temperature 245° C. (518 K) and after the second annealing step at the second annealing temperature 270° C. (543 K).

Such a combination of the antiferromagnetic layer 2 and the exchange bias layer 6 having different compositions enhances the difference in the exchange anisotropic magnetic fields between these layers after the first and second annealing steps, compared with a combination having the same composition. Thus, design versatility and flexibility are improved.

Furthermore, the exchange anisotropic magnetic field of the antiferromagnetic layer 2 is larger than the exchange anisotropic magnetic field of the exchange bias layer 6 after the first annealing step, and the orthogonal relationship between the magnetization vector of the free magnetic layer 5 and the magnetization vector of the pinned magnetic layer 3 can be ensured, while the magnetization vector of the pinned magnetic layer 3 is firmly pinned and both the magnitude and the vector of the exchange anisotropic magnetic field of the antiferromagnetic layer 2 are fixed after the second annealing step.

Moreover, the exchange anisotropic magnetic field of the antiferromagnetic layer 2 is larger than the exchange anisotropic magnetic field of the exchange bias layer 6 after the second annealing step. Thus, the magnetization vector of the free magnetic layer 5 smoothly changes in response to signal magnetic fields from a magnetic recording medium without a change in the magnetization vector of the pinned magnetic layer 3.

In another preferred combination of the antiferromagnetic layer 2 and the exchange bias layer 6, the exchange bias layer 6 is composed of an $Pt_qMn_{100-q-j}L_j$ alloy wherein L is at least one element selected from the group consisting of Au, Ag, Cr, Ni, Ne, Ar, Xe, and Kr, and the subscripts q and j are in the ranges of 52 atomic percent$\leq$q+j$\leq$60 atomic percent and 0.2 atomic percent$\leq$j$\leq$10 atomic percent, and the antiferromagnetic layer 2 is composed of another $Pt_qMn_{100-q-j}L_j$ alloy wherein L is at least one element selected from the group consisting of Au, Ag, Cr, Ni, Ne, Ar, Xe, and Kr, and the subscripts q and j are in the ranges of 48 atomic percent$\leq$q+j$\leq$58 atomic percent and 0.2 atomic percent$\leq$j$\leq$10 atomic percent.

When the total content (q+j) of Pt and L in the exchange bias layer 6 is less than 52 atomic percent or exceeds 60 atomic percent, the $Pt_qMn_{100-q-j}L_j$ crystal in the exchange bias layer 6 is barely transformed into an $Ll_0$-type ordered lattice structure during the second annealing step at 270° C. (543 K) and the alloy does not exhibit antiferromagnetic characteristics. That is, the alloy does not exhibit a unidirectional exchange coupling magnetic field.

When the L content in the exchange bias layer 6 is less than 0.2 atomic percent, the unidirectional exchange coupling magnetic field is not sufficiently improved. When the L content exceeds 10 atomic percent, the unidirectional exchange magnetic field undesirably decreases.

When the total content (q+j) of Pt and L in the antiferromagnetic layer 2 is less than 48 atomic percent or exceeds 58 atomic percent, the $Pt_qMn_{100-q-j}L_j$ crystal in the antiferromagnetic layer 2 is barely transformed into an $L1_0$-type ordered lattice structure during the first annealing step at 245° C. (518 K) and the alloy does not exhibit antiferromagnetic characteristics. That is, the alloy does not exhibit a unidirectional exchange coupling magnetic field.

When the L content in the antiferromagnetic layer 2 is less than 0.2 atomic percent, the unidirectional exchange coupling magnetic field is not sufficiently improved. When the L content exceeds 10 atomic percent, the unidirectional exchange magnetic field undesirably decreases.

Accordingly, the composition of the antiferromagnetic layer 2 and the composition of the exchange bias layer 6 (these compositions are different from each other) are optimized within the above ranges so that the exchange anisotropic magnetic field of the antiferromagnetic layer 2 is larger than the exchange anisotropic magnetic field of the exchange bias layer 6 after the first annealing step at the first annealing temperature 245° C. (518 K) and after the second annealing step at the second annealing temperature 270° C. (543 K).

Such a combination of the antiferromagnetic layer 2 and the exchange bias layer 6 having different compositions enhances the difference in the exchange anisotropic magnetic fields between these layers after the first and second annealing steps, compared with a combination having the same composition. Thus, design versatility and flexibility are improved.

Furthermore, the exchange anisotropic magnetic field of the antiferromagnetic layer 2 is larger than the exchange anisotropic magnetic field of the exchange bias layer 6 after the first annealing step, and the orthogonal relationship between the magnetization vector of the free magnetic layer 5 and the magnetization vector of the pinned magnetic layer 3 can be ensured, while the magnetization vector of the pinned magnetic layer 3 is firmly pinned and both the magnitude and the vector of the exchange anisotropic magnetic field of the antiferromagnetic layer 2 are fixed after the second annealing step.

Moreover, the exchange anisotropic magnetic field of the antiferromagnetic layer 2 is larger than the exchange anisotropic magnetic field of the exchange bias layer 6 after the second annealing step. Thus, the magnetization vector of the free magnetic layer 5 smoothly changes in response to signal magnetic fields from a magnetic recording medium without a change in the magnetization vector of the pinned magnetic layer 3.

In the synthetic-ferri-pinned spin-valve thin-film magnetic element of this embodiment having the first pinned magnetic sublayer 3A and the nonmagnetic interlayer 3B, the conditions in the first annealing step will be described in connection with the thicknesses of the first and second pinned magnetic sublayers 3A and 3B, respectively, and the antiferromagnetic layer 2.

Arrows shown in the first pinned magnetic sublayer 3A and the second pinned magnetic sublayer 3C in FIG. 2 indicate the magnitudes and the directions of the magnetic moments thereof. Each magnetic moment is defined by a product of the saturation magnetization (Ms) and the thickness (t) of the layer.

The first pinned magnetic sublayer 3A and the second pinned magnetic sublayer 3C in FIG. 2 are composed of the same material, for example, elemental cobalt, a NiFe alloy, a CoNiFe alloy, a CoFe alloy, or a CoNi alloy, as described above. Furthermore, the thickness $tP_2$ of the second pinned magnetic sublayer 3C is larger than the thickness $tP_1$ of the first pinned magnetic sublayer 3A. Thus, the magnetic moment of the second pinned magnetic sublayer 3C is larger than that of the first pinned magnetic sublayer 3A. This embodiment is characterized in that the first pinned magnetic sublayer 3A and the second pinned magnetic sublayer 3C have different magnetic moments. Thus, the thickness $tP_1$ of the first pinned magnetic sublayer 3A may be larger than the thickness $tP_2$ of the second pinned magnetic sublayer 3C.

As shown in FIG. 2, the first pinned magnetic sublayer 3A is magnetized in the Y direction (the height direction of the element) in the drawing, away from the recording medium, whereas the second pinned magnetic sublayer 3C is magnetized antiparallel to the magnetization vector of the first pinned magnetic sublayer 3A.

The first pinned magnetic sublayer 3A is in contact with the antiferromagnetic layer 2 and is annealed in a magnetic field so as to form an exchange coupling magnetic field (exchange anisotropic magnetic field) at the interface between the first pinned magnetic sublayer 3A and the antiferromagnetic layer 2 and to magnetize the first pinned magnetic sublayer 3A in the Y direction in the drawing. When the magnetization vector of the first pinned magnetic sublayer 3A is pinned in the Y direction in the drawing, the magnetization vector of the second pinned magnetic sublayer 3C is pinned so as to be antiparallel to the magnetization vector of the first pinned magnetic sublayer 3A.

In this embodiment, the thickness $tP_1$ of the first pinned magnetic sublayer 3A and the thickness $tP_2$ of the second pinned magnetic sublayer 3C are optimized. The ratio of the thickness $tP_1$ to the thickness $tP_2$ is preferably in the range of 0.33 to 0.95 or 1.05 to 0.4. A large exchange coupling magnetic field is generated within this range. When the thickness $tP_1$ and the thickness $tP_2$ themselves, however, are large within the above range, the exchange coupling magnetic field tends to decrease. Thus, in this embodiment, the thickness $tP_1$ and the thickness $tP_2$ are optimized. Preferably, the thickness $tP_1$ and the thickness $tP_2$ are in the range of 10 to 70 angstroms, and the absolute value of the difference between the thickness $tP_1$ and the thickness $tP_2$ is at least 2 angstroms.

By optimizing the thicknesses and the thickness ratio, at least 4 kA/m of exchange coupling magnetic field (Hex*) can be generated. Herein, the exchange coupling magnetic field represents the magnitude of the external magnetic field when the rate of change in resistance is a half the maximum rate of change in resistance ($\Delta R/R$). The exchange coupling magnetic field (Hex*) includes all types of magnetic fields, such as an exchange coupling magnetic field (exchange anisotropic magnetic field) generated at the interface between the antiferromagnetic layer 2 and the first pinned magnetic sublayer 3A and an exchange coupling magnetic field (RKKY interaction) generated between the first pinned magnetic sublayer 3A and the second pinned magnetic sublayer 3C.

More preferably, the ratio of the thickness $tP_1$ of the first pinned magnetic sublayer 3A to the thickness $tP_2$ of the second pinned magnetic sublayer 3C is in the range of 0.53 to 0.95 or 1.05 to 1.8. Within this range, it is preferable that both the thickness $tP_1$ and the thickness $tp_2$ be within the range of 10 to 50 angstroms and the absolute value of the difference between the thickness $tP_1$ and the thickness $tP_2$ be at least 2 angstroms. When the thickness $tP_1$, the thickness $tP_2$, and the ratio thereof are optimized within the above ranges, an exchange coupling magnetic field of at least 80 kA/m can be generated.

When the thicknesses and the ratio thereof are within the above range, a large exchange coupling magnetic field (Hex*) and a high rate of change in resistance (ΔR/R) are also achieved.

A larger exchange coupling magnetic field can stabilize the antiparallel arrangement between the magnetic vector of the first pinned magnetic sublayer 3A and the magnetic vector of the second pinned magnetic sublayer 3C. Since the antiferromagnetic layer 2 is composed of one of the above-described alloys, the antiparallel arrangement between the magnetization vector of the first pinned magnetic sublayer 3A and the magnetization vector of the second pinned magnetic sublayer 3C is thermally stable.

When the magnetic moment Ms·tP$_1$ of the first pinned magnetic sublayer 3A and the magnetic moment Ms·tP$_2$ of the second pinned magnetic sublayer 3C are the same, the magnetization vector of the first pinned magnetic sublayer 3A and the magnetization vector of the second pinned magnetic sublayer 3C are not antiparallel to each other, and dispersed components of the magnetization vectors (the magnitude of magnetic moments in random directions) increase. As a result, a proper relative angle is not defined to the free magnetic layer 5, resulting in significant decreases in the exchange coupling magnetic field (Hex) between the first pinned magnetic sublayer 3A and the nonmagnetic interlayer 3B and the rate of change in resistance (ΔR/R).

In order to solve such a problem, the Ms·tP$_1$ of the first pinned magnetic sublayer 3A and the Ms·tP$_2$ of the second pinned magnetic sublayer 3C must be set at different values. When the first pinned magnetic sublayer 3A and the second pinned magnetic sublayer 3C are composed of the same material, the thickness tP$_1$ and the thickness tP$_2$ must be different from each other. Accordingly, a ratio of the thickness tP$_1$ to the thickness tP$_2$ in the range of 0.95 to 1.05 is excluded from the suitable range since the thickness tP$_1$ and the thickness tP$_2$ are almost the same within this range.

When an antiferromagnetic material, which generates an exchange coupling magnetic field (exchange anisotropic magnetic field) at the interface between the antiferromagnetic layer 2 and the first pinned magnetic sublayer 3A by annealing in a magnetic field, is used as the antiferromagnetic layer 2 as in this embodiment, the direction and the magnitude of the magnetic field applied during the annealing must be adequately controlled even if the Ms·tP$_2$ of the first pinned magnetic sublayer 3A and the Ms·tP$_2$ of the second pinned magnetic sublayer 3C are set to be different from each other, otherwise the magnetization vector of the first pinned magnetic sublayer 3A and the magnetization vector of the second pinned magnetic sublayer 3C contains large amounts of dispersed components or are not oriented in desired directions.

TABLE 1

| Direction of Magnetic Field during Annealing | (1) 8 to 80 kA/m to the Left | (2) 8 to 80 kA/m to the Right |
|---|---|---|
| Magnetization Vector of First Pinned Magnetic Sublayer | → | ← |
| Magnetization Vector of Second Pinned Magnetic Sublayer | ← | → |

Table 1 shows the magnetization vector of the first pinned magnetic sublayer 3A and the magnetization vector of the second pinned magnetic sublayer 3C when the magnitude and the direction of the magnetic field during the annealing are changed in a case in which the Ms·tP$_1$ of the first pinned magnetic sublayer 3A is smaller than the Ms·tP$_2$ of the nonmagnetic interlayer 3B.

In case (1) in Table 1, a magnetic field of 8 to 80 kA/m is applied in the left direction in the drawing during the annealing. Since the Ms·tP$_2$ of the second pinned magnetic sublayer 3C is larger than the Ms·tP$_1$ of the first pinned magnetic sublayer 3A, the magnetization vector of the second pinned magnetic sublayer 3C is predominantly oriented in the left direction in the drawing whereas the magnetization vector of the first pinned magnetic sublayer 3A is antiparallel to the magnetization vector of the second pinned magnetic sublayer 3C by the exchange coupling magnetic field (RKKY interaction) between the first pinned magnetic sublayer 3A and the second pinned magnetic sublayer 3C.

In case (2) in Table 1, when a magnetic field of 8 to 80 kA/m is applied in the right direction during the annealing, the magnetization vector of the second pinned magnetic sublayer 3C is predominantly oriented in the right direction whereas the magnetization vector of the first pinned magnetic sublayer 3A is antiparallel to the magnetization vector of the second pinned magnetic sublayer 3C.

Case (1) in Table 1 shows the direction and the magnitude of the magnetic field applied during the annealing when the magnetization of the first pinned magnetic sublayer 3A is oriented in the right in the drawing. In this case, the first pinned magnetic sublayer 3A is magnetized in the right by the exchange coupling magnetic field (exchange anisotropic magnetic field) at the interface with the antiferromagnetic layer 2.

The magnitude of the magnetic field applied during the annealing is in the range of 8 to 80 kA/m as shown in FIG. 1 due to the following reasons other than the above reason regarding the exchange bias layer 6.

The magnetization vector of a pinned magnetic sublayer having a larger Ms·t tends to be oriented in the direction of the applied magnetic field. When the magnitude of the applied magnetic field is larger than 80 kA/m, the magnetization vector of another pinned magnetic sublayer having a smaller Ms·t also tends to be oriented in this direction. Thus, the magnetization vectors of these two pinned magnetic sublayers are not antiparallel but are dispersed in various directions. Accordingly, the magnitude exceeding 80 kA/m is not included in the suitable range.

The magnitude of the magnetic field applied during the annealing is at least 8 kA/m in this embodiment, since a smaller magnitude is not effective for orientation of the magnetization vector of the pinned magnetic sublayer having a larger Ms·t in the applied magnetic field.

The above-mentioned magnitude of the magnetization vector and the method for controlling the direction of the magnetization vector are applicable to any antiferromagnetic material which requires annealing. For example, these are applicable to a NiMn alloy, which has been used in conventional antiferromagnetic layers.

As described above, the ratio of the thickness of the first pinned magnetic sublayer 3A to the thickness of the second pinned magnetic sublayer 3C is limited to a suitable range to enhance the exchange coupling magnetic field (Hex*), to maintain the thermally stable antiparallel state (ferri-state) of the magnetization vector of the first pinned magnetic sublayer 3A and the magnetization vector of the second pinned magnetic sublayer 3C, and to ensure a rate of change in resistance (ΔR/R) which is comparable with conventional levels.

Optimization of the magnitude and the direction of the magnetic field during the annealing can control the magnetization vectors of the first and second pinned magnetic sublayers 3A and 3C, respectively, in desired directions.

As described above, the magnetic moment (magnetic thickness) is defined by the product of the saturation magnetization Ms and the thickness t. For example, the saturation magnetization Ms is approximately 10 T (Tesla) for bulk solid NiFe or approximately 1.7 T for bulk solid cobalt (Co). When the NiFe film has a thickness of 30 angstroms, the magnetic thickness of the NiFe film is 30 angstrom·Tesla. The magnetostatic energy of a ferromagnetic film is in proportion to the product of the magnetic thickness and an applied external magnetic field. When the ferromagnetic film having a larger magnetic thickness and the ferromagnetic film having a smaller magnetic thickness are in a ferri-magnetic state due to RKKY interaction via the nonmagnetic interlayer, the ferromagnetic film having a larger magnetic thickness is readily oriented in the external magnetic field.

When the antiferromagnetic layer is in direct contact with a nonmagnetic film composed of tantalum, ruthenium, or copper, or with an antiferromagnetic layer composed of a PtMn alloy, ferromagnetic atoms (Ni, Fe, and/or Co) are into direct contact with nonmagnetic atoms or antiferromagnetic atoms. Thus, it is known that the saturation magnetization Ms of the antiferromagnetic layer in the vicinity of the interface with the nonmagnetic film or the antiferromagnetic layer is smaller than the saturation magnetization Ms of the bulk solid. When the composite film of the ferromagnetic film with the nonmagnetic film or the antiferromagnetic layer are annealed, interdiffusion proceeds at the interface and the saturation magnetization Ms of the antiferromagnetic film has a distribution in the thickness direction. That is, the saturation magnetization Ms is small in the vicinity of the nonmagnetic film or the antiferromagnetic layer and reaches the saturation magnetization Ms of the bulk solid toward the direction away from the interface.

The reduction in the saturation magnetization Ms of the antiferromagnetic film in the vicinity of the nonmagnetic film or the antiferromagnetic layer depends on the material constituting the antiferromagnetic layer, the material constituting the antiferromagnetic film, and the annealing temperature. Thus, the exact saturation magnetization Ms must be determined under the specific conditions. The magnetic thickness in this embodiment is calculated also in consideration of a reduction in the saturation magnetization Ms caused by thermal diffusion from/to the nonmagnetic film or the antiferromagnetic layer.

In order to yield an exchange coupling magnetic field at the interface between the PtMn film and the antiferromagnetic film, a diffusion layer must be formed between the PtMn film and the antiferromagnetic film by annealing. The reduction in the saturation magnetization Ms of the antiferromagnetic film due to the formation of the diffusion layer depends on the order of the deposition of the PtMn film and the antiferromagnetic film.

In particular, as shown in FIG. 1, in the bottom type having the antiferromagnetic layer 2 provided below the free magnetic layer 5, a thermal diffusion layer is readily formed between the antiferromagnetic layer 2 and the first pinned magnetic sublayer 3A. As a result, the magnetic thickness of the first pinned magnetic sublayer 3A is lower than the original thickness $tP_1$. Such a decrease in the magnetic thickness of the first pinned magnetic sublayer 3A, however, causes an excess difference in the magnetic thickness (magnetic moment) between the first pinned magnetic sublayer 3A and the second pinned magnetic sublayer 3C. That is, a large proportion of thermal diffusion layer in the first pinned magnetic sublayer 3A results in a decreased exchange coupling magnetic field.

When the antiferromagnetic layer 2, which generates an exchange coupling magnetic field at the interface with the first pinned magnetic sublayer 3A during annealing, is used, both the thicknesses and the magnetic thicknesses of the first pinned magnetic sublayer 3A and the second pinned magnetic sublayer 3C must be optimized so that the first pinned magnetic sublayer 3A and the second pinned magnetic sublayer 3C are stabilized in a ferri-magnetic state.

A certain difference in the magnetic thickness between the first pinned magnetic sublayer 3A and the second pinned magnetic sublayer 3C is required for the formation of the ferr-magnetic state, as described above. On the other hand, an excess difference in the magnetic thickness between the first pinned magnetic sublayer 3A and the second pinned magnetic sublayer 3C results in an undesired decrease in the exchange coupling magnetic field. Accordingly, in the present invention, the ratio of the magnetic thickness of the first pinned magnetic sublayer 3A to the magnetic thickness of the second pinned magnetic sublayer 3C is preferably in the range of 0.33 to 0.95 or 1.05 to 4, which range is the same as the range in the ratio of the thickness of the first pinned magnetic sublayer 3A to the thickness of the second pinned magnetic sublayer 3C. Moreover, both the magnetic thickness of the first pinned magnetic sublayer 3A and the magnetic thickness of the second pinned magnetic sublayer 3C are preferably in the range of 10 to 70 angstrom·Tesla, and the absolute value of the difference between the magnetic thickness of the first pinned magnetic sublayer 3A and the thickness of the second pinned magnetic sublayer 3C is at least 2 angstrom·Tesla.

More preferably, the ratio of the magnetic thickness of the first pinned magnetic sublayer 3A to the magnetic thickness of the second pinned magnetic sublayer 3C is in the range of 0.53 to 0.95 or 1.05 to 1.8.

In a more preferred embodiment within the above ranges, both the magnetic thickness of the first pinned magnetic sublayer 3A and the magnetic thickness of the second pinned magnetic sublayer 3C are in the range of 10 to 50 angstrom·Tesla, and the absolute value of the difference between the magnetic thickness of the first pinned magnetic sublayer 3A and the thickness of the second pinned magnetic sublayer 3C is at least 2 angstrom·Tesla.

The nonmagnetic interlayer 3B interposed between the first pinned magnetic sublayer 3A and the second pinned magnetic sublayer 3C will now be described.

The nonmagnetic interlayer 3B in this embodiment is preferably composed of at least one element selected from Ru, Rh, Ir, Cr, Re, and Cu.

In the bottom type having the antiferromagnetic layer 2 provided below the free magnetic layer 5 shown in FIG. 1, the thickness of the nonmagnetic interlayer 3B is preferably in the range of 3.6 to 9.6 angstroms to yield an exchange coupling magnetic field (Hex) of at least 40 kA/m. More preferably, the thickness of the nonmagnetic interlayer 3B is in the range of 4 to 9.4 angstroms to yield an exchange coupling magnetic field (Hex) of at least 80 kA/m.

The exchange coupling magnetic field extremely decreases when the thickness of the nonmagnetic interlayer 3B is outside of the above range. In this case, the magnetization vector of the first pinned magnetic sublayer 3A and the magnetization vector of the second pinned magnetic sublayer 3C are not stabilized in the antiparallel arrangement (ferri-magnetic state), resulting in unstable magnetization states thereof.

Since the back layer B1 is provided between the free magnetic layer 5 and the exchange bias layer 6 in the spin-valve thin-film magnetic element in this embodiment, the exchange coupling magnetic field, which is generated from the exchange bias layer 6 to fix the magnetization vector of the free magnetic layer 5, can be set within a suitable range. Thus, the magnetization vector of the free magnetic layer 5 can sensitively rotate in response to a weak leakage magnetic field from a magnetic recording medium.

Moreover, the back layer B1 extends the mean free path of the conduction electrons by a so-called spin filter effect. Since the difference in the mean free path of spin-dependent conduction electrons increases, the spin-valve thin-film magnetic element exhibits a further improved rate of change in resistance ($\Delta R/R$).

Since the magnetization vector of the free magnetic layer 5 is oriented by the exchange bias layer 6 having a uniform thickness, the magnetic domains in the free magnetic layer 5 are readily aligned into a single-domain state, resulting in reduced Barkhausen noise. Furthermore, the free magnetic layer 5 in a single-domain state can supply a sensing current J from the electrode layers 8 directly to the free magnetic layer 5. Thus, this bottom-type configuration can reduce possible occurrence in side reading and is more suitable for a higher magnetic recording density.

Since the electrode layers 8 are connected to the composite 9 at the two sides in the planar direction of the free magnetic layer 5, this bottom type can directly supply a larger proportion of sensing current from the electrode layers 8 to the free magnetic layer 5 without via the antiferromagnetic layer 2 and the exchange bias layer 6, which have high resistivity compared to the free magnetic layer 5 and the nonmagnetic conductive layer 4. Moreover, this bottom type reduces contact resistance between the composite 9 and the electrode layers 8 affecting the rate of change in resistance ($\Delta R/R$). Thus, this spin-valve thin-film magnetic element exhibits further improved output efficiency.

Since both the antiferromagnetic layer 2 and the exchange bias layer 6 are composed of an alloy containing Mn and at least one element selected from the group consisting of Pt, Pd, Ir, Rh, Ru, Os, Au, Ag, Cr, Ni, Ne, Ar, Xe, and Kr, the exchange anisotropic magnetic field exhibits satisfactory dependence on temperature, and the spin-valve thin-film magnetic element exhibits high heat resistance.

Moreover, the spin-valve thin-film magnetic element is highly resistant to environmental temperature in a device, such as a hard disk drive, and the Joule heat generated by a sensing current supplied to the element. Thus, the exchange anisotropic magnetic field (exchange coupling magnetic field) does not exhibit a large change with temperature.

Moreover, the antiferromagnetic layer 2 composed of the above alloy exhibits a high blocking temperature and a large exchange anisotropic magnetic field. Thus, the magnetization vector of the pinned magnetic layer 3 can be firmly fixed.

In the method for making the spin-valve thin-film magnetic element, an alloy containing Mn and at least one element selected from the group consisting of Pt, Pd, Ir, Rh, Ru, Os, Au, Ag, Cr, Ni, Ne, Ar, Xe, and Kr is used for the antiferromagnetic layer 2 and the exchange bias layer 6. In addition, based on properties of this alloy, the magnetization vector of the pinned magnetic layer 3 is pinned during the first annealing step and the magnetization vector of the free magnetic layer 5 is oriented in a direction substantially orthogonal to the magnetization vector of the pinned magnetic layer 3 during the second annealing step, without affecting the magnetization vector of the pinned magnetic layer 3. The resulting spin-valve thin-film magnetic element exhibits high heat resistance.

Since, this spin-valve thin-film magnetic element is of a synthetic ferri-pinned type in which the magnetization vector of the first pinned magnetic sublayer 3A and the magnetization vector of the second pinned magnetic sublayer 3C are antiparallel to each other, the pinned magnetic layer 3 exhibits a large exchange coupling magnetic field (Hex) after the first annealing step and does not tilt during the second annealing step. Thus, the magnetization vector of the pinned magnetic layer 3 can be readily controlled.

Furthermore, a demagnetizing field (dipole magnetic field) due to the pinned magnetization of the pinned magnetic layer 3 compensates for a magnetostatic coupling magnetic field of the first pinned magnetic sublayer 3A and a magnetostatic coupling magnetic field of the second pinned magnetic sublayer 3B. Since the demagnetizing field (dipole magnetic field) is substantially zero, the effect of the dipole magnetic field (dipole magnetic field) of the pinned magnetic layer 3 on the variable magnetization of the free magnetic layer 5 is substantially negligible.

Furthermore, the variable magnetization vector of the free magnetic layer 5 can be readily aligned in a desired direction so that the spin-valve thin-film magnetic element exhibits small asymmetry. Thus, the variable magnetization of the free magnetic layer 5 can be readily controlled.

Second Embodiment

Figure 5:
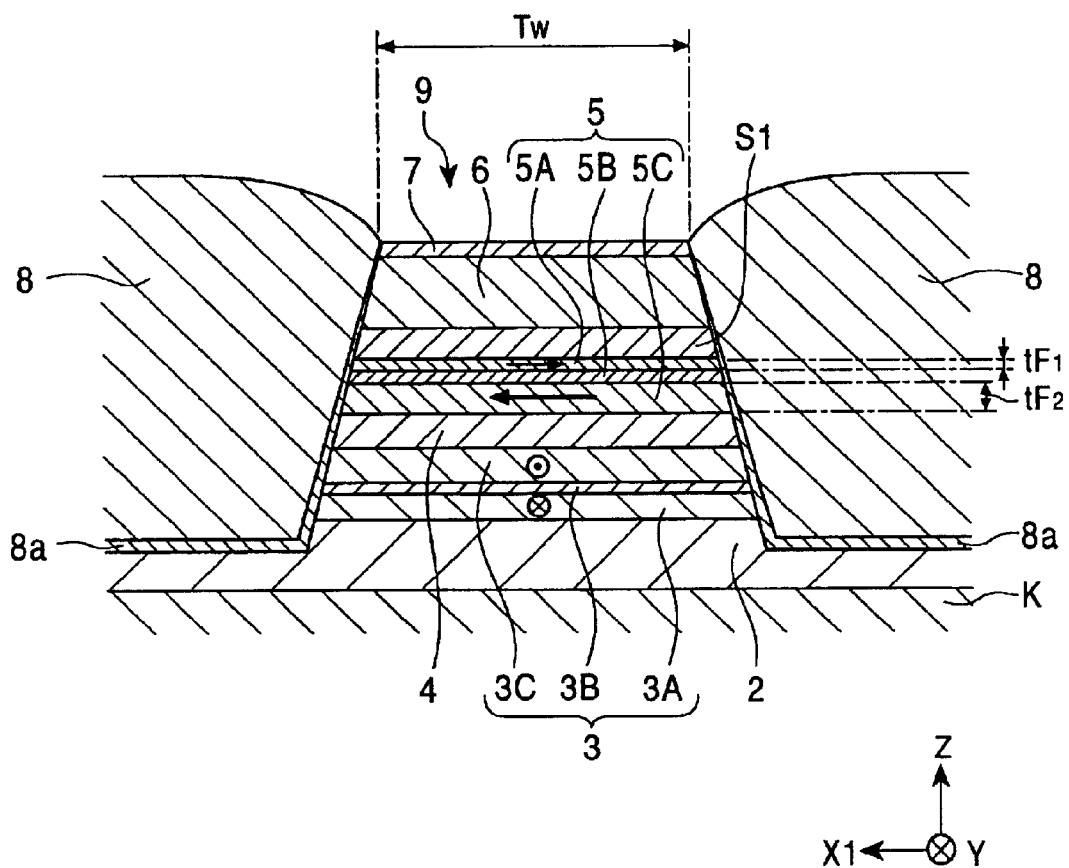
FIG. 5 is a cross-sectional view of a second embodiment of the spin-valve thin-film magnetic element in accordance with the present invention when viewed from a face opposing a recording medium.

A second embodiment of the spin-valve thin-film magnetic element, the method for making the same, and the thin-film magnetic head provided with the spin-valve thin-film magnetic element will now be described with reference to FIG. 5, which is a cross-sectional view of the spin-valve thin-film magnetic element, viewed from a recording medium.

This spin-valve thin-film magnetic element is also of a bottom type. That is, a composite 9 include an antiferromagnetic layer 2, a pinned magnetic layer 3, a nonmagnetic conductive layer 4, and a free magnetic layer 5 which are formed, in that order, on a substrate K, as in the first embodiment shown in FIGS. 1 to 4. The pinned magnetic layer 3 is composed of a first pinned magnetic sublayer 3A and a second pinned magnetic sublayer 3C, separated by a nonmagnetic interlayer 3B. The magnetization vectors of the first and second pinned magnetic sublayers 3A and 3C, respectively, are antiparallel to each other. Thus, this spin-valve thin-film magnetic element is also a so-called synthetic-ferri-pined-type single spin-valve thin-film magnetic element.

This spin-valve thin-film magnetic element differs from that of the first embodiment in the following points. That is, the free magnetic layer 5 is of a synthetic-ferri-free type having two sublayers in a synthetic-ferri-free-type magnetic state and a reflective mirror layer S1 is provided as a mean-free-path-extending layer, instead of the back layer in the first embodiment.

In this embodiment, parts having the same functions as in FIGS. 1 to 4 are referred to with the same reference numerals, and a detailed description thereof with reference to drawings is omitted.

In a composite 9 of this embodiment, the free magnetic layer 5 is composed of a first free magnetic sublayer 5A and a second free magnetic sublayer 5C separated by a nonmagnetic interlayer 5B. The first free magnetic sublayer 5A is in contact with the reflective mirror layer S1 which is in contact with an exchange bias layer 6. The second free magnetic sublayer 5C is in contact with the nonmagnetic conductive layer 4.

The first free magnetic sublayer 5A is formed of a ferromagnetic material which is preferably the same material as that for the first pinned magnetic sublayer 3A and the second pinned magnetic sublayer 3C. For example, the first free magnetic sublayer 5A is formed of a NiFe alloy, Co metal, a CoNiFe alloy, a CoFe alloy, or CoNi alloy. Among these are preferably the NiFe alloy.

The nonmagnetic interlayer 5B is preferably formed of at leas one nonmagnetic material selected from Ru, Rh, Ir, Cr, Re, and Cu. Among these are more preferably Ru.

The second free magnetic sublayer 5C is formed of a ferromagnetic material which is preferably the same material as that for the first free magnetic sublayer 5A, the first pinned magnetic sublayer 3A, and the second pinned magnetic sublayer 3C. For example, the second free magnetic sublayer 5C is formed of a NiFe alloy, Co metal, a CoNiFe alloy, a CoFe alloy, or CoNi alloy. Among these are preferably the NiFe alloy.

The second free magnetic sublayer 5C may have a multilayer configuration. For example, a second free magnetic sublayer 5C composed of a NiFe alloy may be provided with a Co thin-film at the face in contact with the nonmagnetic conductive layer 4.

The thickness $tF_2$ of second free magnetic sublayer 5C is larger than the thickness $tF_1$ of the first free magnetic sublayer 5A. The thickness $tF_2$ of the second free magnetic sublayer 5C is in the range of preferably 30 to 40 angstroms and more preferably 35 to 40 angstroms. At a thickness $tF_2$ outside of the above range, the spin-valve thin-film magnetic element does not exhibit a large rate of change in resistance ($\Delta R/R$).

The thickness $tF_1$ of the first free magnetic sublayer 5A is preferably in the range of 5 to 25 angstroms.

When the saturation magnetizations of the first free magnetic sublayer 5A and the second free magnetic sublayer 5C are $M_1$ and $M_2$, respectively, the magnetic thicknesses of the first free magnetic sublayer 5A and the second free magnetic sublayer 5C are $M_1 \cdot tF_1$ and $M_2 \cdot tF_2$, respectively. In the free magnetic layer 5, the magnetic thickness $M_2 \cdot tF_2$ of the second free magnetic sublayer 5C is larger than the magnetic thickness $M_1 \cdot tF_1$ of the first free magnetic sublayer 5A.

The first free magnetic sublayer 5A and the second free magnetic sublayer 5C are antiferromagnetically coupled with each other. For example, the second free magnetic sublayer 5C is magnetized in the X1 direction in the drawing by the exchange bias layer 6, whereas the first free magnetic sublayer 5A is magnetized in a direction opposite to the X1 direction.

Since the magnetic thickness $M_2 \cdot tF_2$ of the second free magnetic sublayer 5C is larger than the magnetic thickness $M_1 \cdot tF_1$ of the first free magnetic sublayer 5A, the magnetization of the second free magnetic sublayer 5C remains in the entire free magnetic layer 5. Thus, the magnetization vector of the entire free magnetic layer 5 is oriented in the X1 direction. In this case, the effective thickness of the free magnetic layer 5 becomes $M_2 \cdot tF_2 - M_1 \cdot tF_1$. Accordingly, the first free magnetic sublayer 5A and the second free magnetic sublayer 5C are in a synthetic ferri-magnetic state. The magnetization vector of the free magnetic layer 5 thereby is substantially orthogonal to the magnetization vector of the pinned magnetic layer 3.

In this embodiment, the reflective mirror layer S1 as the mean-free-path-extending layer is formed between the free magnetic layer 5 and the exchange bias layer 6.

The reflective mirror layer S1 may have a thickness in the range of 5 to 500 angstroms. At a thickness of the reflective mirror layer S1 less than 5 angstroms, the specular effect is insufficient.

At a thickness of the reflective mirror layer S1 exceeding 500 angstroms, the shield gap, that is, the reading gap becomes large, resulting in decreased head resolution. Moreover, such a large thickness decreases the exchange anisotropic magnetic field by exchange coupling between the free magnetic layer 5 and the exchange bias layer 6. Thus, it is difficult to control the magnetic domains in the free magnetic layer 5. As a result, the spin-valve thin-film magnetic element may generate Barkhausen noise, which causes instability in signal processing from a magnetic recording medium.

In the above configuration, the reflective mirror layer S1 forms a potential barrier at the interface between the free magnetic layer 5 and the reflective mirror layer S1. The potential barrier reflects spin-up conduction electrons moving in the free magnetic layer 5 without changing the spin state so as to extend the mean free path of the spin-up conduction electrons (a so-called specular effect).

In order to form the above—mentioned potential barrier, it is effective that the reflective mirror layer S1 is an electrical insulator whereas the free magnetic layer 5 is an electrical conductor. Examples of insulating materials suitable for the reflective mirror layer S1 include oxides, such as $\alpha\text{-Fe}_2\text{O}_3$, NiO, CoO, Co—Fe—O, Co—Fe—Ni—O, $Al_2O_3$, Al-Q-O (wherein Q is at least one element selected from the group consisting of B, Si, N, Ti, V, Cr, Mn, Fe, Co, and Ni), and R-O (wherein R is at least one element selected from the group consisting of Ti, V, Cr, Zr, Nb, Mo, Hf, Ta and W); and nitrides, such as Al—N, Al—Q—N (wherein Q is at least one element selected from the group consisting of B, Si, O, Ti, V, Cr, Mn, Fe, Co, and Ni), and R-N (wherein R is at least one element selected from the group consisting of Ti, V, Cr, Zr, Nb, Mo, Hf, Ta, and W).

The reflective mirror layer S1 composed of an antiferromagnetic material, such as $\alpha\text{-Fe}_2\text{O}_3$ or NiO also functions as the exchange bias layer 6.

When the magnetization vector of the free magnetic layer 5 changes from the X1 direction in FIG. 2 due to a leakage magnetic field from a recording magnetic medium such as a hard disk, the electrical resistance changes in connection with the magnetization vector, pinned in a direction opposite to the Y direction in the drawing, of second pinned magnetic sublayer 3C. Thus, the leakage magnetic field from the recording magnetic medium is detected as a change in voltage due to the change in the electrical resistance.

Since the magnetic thickness $M_2 \cdot tF_2$ of the second free magnetic sublayer 5C is larger than the magnetic thickness $M_1 \cdot tF_1$ of the first free magnetic sublayer 5A, the free magnetic layer 5 exhibits a large spin-flop magnetic field.

The spin-flop magnetic field represents the magnitude of an external magnetic field which is antiparallel to the magnetization vector of one of two magnetic fields of which the magnetization vectors are antiparallel to each other, when the antiparallel arrangement is not maintained by the rotation of the magnetization vector of the other. In the above case, the external magnetic field corresponds to a bias magnetic field from the exchange bias layer 6.

Figure 10:
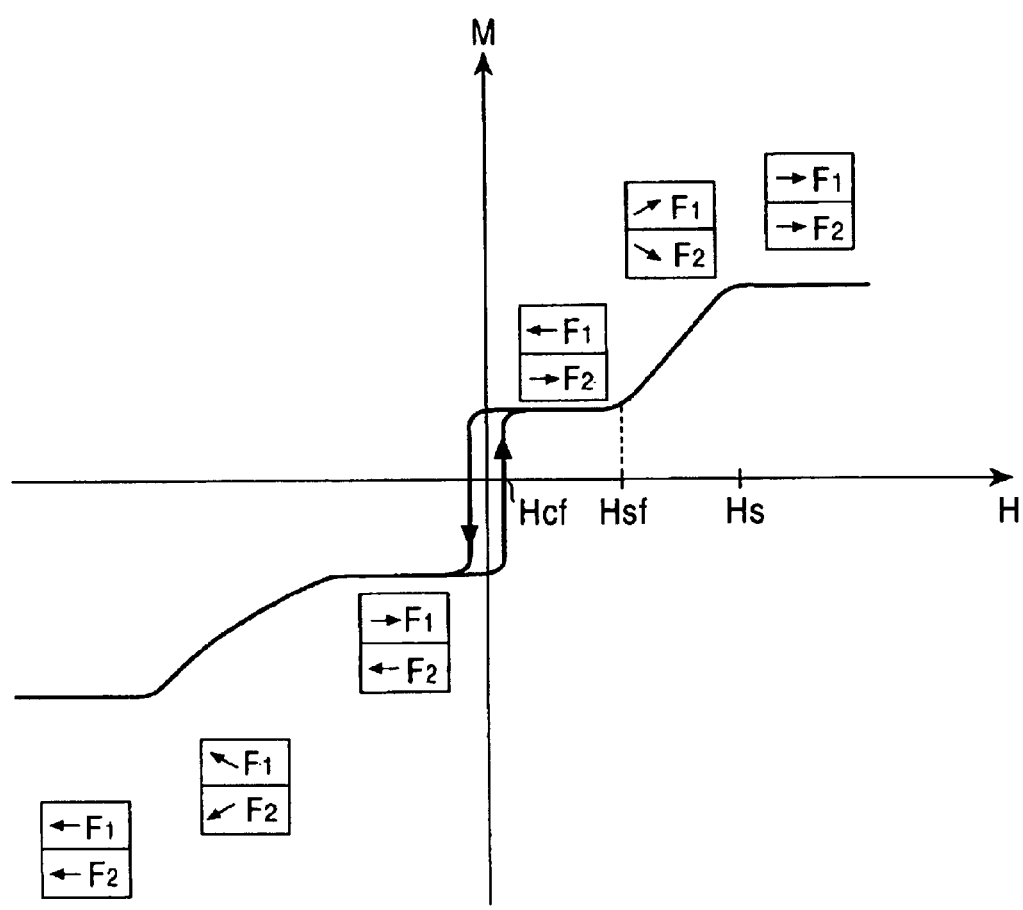
FIG. 10 is a graph of a schematic M-H curve of a free magnetic layer of the spin-valve thin-film magnetic element shown in FIG. 5.

FIG. 10 illustrates a schematic M-H curve of the free magnetic layer 5. The M-H curve shows a change in magnetization M of the free magnetic layer 5 when an external magnetic field is applied to the free magnetic layer 5 in the track width direction of magnetic recording.

The arrow F1 in the drawing represents the magnetization vector of the first free magnetic sublayer 5A while the arrow F2 represents the magnetization vector of the second free magnetic sublayer 5C.

As shown in FIG. 10, when the external magnetic field H is small, the first free magnetic sublayer 5A and the second free magnetic sublayer 5C are antiferromagnetically coupled with each other, that is, the arrow F1 and the arrow F2 are antiparallel to each other. When the magnitude of the external magnetic field H exceeds a certain level, the magnetization vector of the first free magnetic sublayer 5A rotates from the direction (F1) antiparallel to the magnetization vector (F2) of the second free magnetic sublayer 5C. Thus, the antiferromagnetic coupling between the first free magnetic sublayer 5A and the second free magnetic sublayer 5C, that is, a ferri-magnetic state is not maintained. This state is a spin-flop transition, and the magnitude of the external magnetic field when the spin-flop transition occurs corresponds to the above—mentioned spin-flop magnetic field, which is shown by $H_{sf}$ in FIG. 10.

When the magnetic thickness $M_2 \cdot tF_2$ of the second free magnetic sublayer 5C is larger than the magnetic thickness $M_1 \cdot tF_1$ of the first free magnetic sublayer 5A, the spin-flop magnetic field $H_{sf}$ of the free magnetic layer 5 increases. Thus, the free magnetic layer 5 can maintain the ferri-magnetic state over a wide range of magnitude of the external magnetic field. That is, the free magnetic layer 5 can maintain a stable ferri-magnetic state.

Since the effective thickness of the free magnetic layer 5 ($M_2 \cdot tF_2 - M_1 \cdot tF_1$) can be reduced by optimization of the magnetic thickness $M_1 \cdot tF_1$ of the first free magnetic sublayer 5A and the magnetic thickness $M_2 \cdot tF_2$ of the second free magnetic sublayer 5C, the magnetization vector of the free magnetic layer 5 can be readily changed in response to a slight magnitude of external magnetic field. Thus, the spin-valve thin-film magnetic element exhibits high detection sensitivity.

In this embodiment, the reflective mirror layer S1 extends the mean free path of the spin-up conduction electrons, which contribute to the magnetoresistive effect. Thus, the spin-valve thin-film magnetic element exhibits a large rate of change in resistance (ΔR/R) due to the specular effect, and is suitable for trends toward high-density recording.

The specular effect will now be described.

FIGS. 9A and 9B are schematic views for illustrating the contribution of the reflective mirror layer in the spin-valve thin-film magnetic element to the specular effect. As described above, the behavior of only the spin-up conduction electrons contributes to the GMR effect and is determined by the magnetization vector of the second pinned magnetic sublayer 3C.

In a state of application of no external magnetic field, as shown in FIGS. 9A and 9B, the conduction electrons reach the free magnetic layer 5 from the nonmagnetic conductive layer 4, pass through the interior of the free magnetic layer 5 (in this embodiment, pass through the second free magnetic sublayer 5C, the nonmagnetic interlayer 5B, and the first free magnetic sublayer 5A, in that order), and reach the interface between the free magnetic layer 5 and the reflective mirror layer S1.

When no reflective mirror layer is provided as shown in FIG. 9A, the spin-up conduction electrons move in the free magnetic layer 5 and are scattered at the upper face of the free magnetic layer 5. As a result, the mean free path becomes $\lambda^+$, as shown in FIG. 9A.

When the reflective mirror layer S1 is provided, the spin-up conduction electrons are mirror-reflected (mirror-diffused) by the potential barrier, which is formed at the interface between the free magnetic layer 5 and the reflective mirror layer S1, as shown in FIG. 9B.

In the case of general scattering of conduction electrons, the spin states thereof including the energy state and the quantum state vary. In the case of mirror reflection, however, conduction electrons have a high probability of reflection which maintains the spin states including the energy state and the quantum state. In the mirror reflection, the conduction electrons move in the free magnetic layer 5 while maintaining the spin states as if they are not diffused.

As shown in FIG. 9B, the mean free path of the conduction electrons is extended by the reflected mean free path $\lambda +_s$, which is generated by the mirror reflection.

Accordingly, the reflective mirror layer S1 significantly extends the mean free path of the spin-up conduction electrons. That is, the reflective mirror layer S1 reduces the resistance of the spin-valve thin-film magnetic element.

When an applied external magnetic field rotates the magnetization vector of the free magnetic layer 5, the magnetization vector of the free magnetic layer 5 deviates from the direction of the spin of the spin-up conduction electrons. Thus, the spin-up conduction electrons are scattered in the free magnetic layer 5. That is, the effective mean free path of the spin-up conduction electrons steeply decreases depending on the magnetization vector of the free magnetic layer 5. As a result, the resistance of the spin-valve thin-film magnetic element steeply increases with the applied external magnetic field and is observed as the GMR effect.

As described above, the reflective mirror layer S1 of the spin-valve thin-film magnetic element in this embodiment significantly extends the mean free path of the spin-up conduction electrons due to the specular effect, and thus significantly improves the rate of change in resistance (ΔR/R) of this element due to a large difference in the mean free path between the spin-up electrons and the spin-down electrons.

The spin-up conduction electrons are partially scattered in the nonmagnetic interlayer 5B and the first free magnetic sublayer 5A in this embodiment. However, the introduction of the single free magnetic layer configuration as in the first embodiment into the second embodiment prevents such scattering and enhances the specular effect.

This spin-valve thin-film magnetic element can be produced as in the first embodiment, but the order of deposition of each layer in the composite 9 differs.

The spin-valve thin-film magnetic element of the second embodiment exhibits the following effects, in addition to substantially the same effects as those of the first embodiment.

Since this spin-valve thin-film magnetic element has the synthetic-ferri-free magnetic layer, which is composed of the first free magnetic sublayer 5A and the second free magnetic sublayer 5C separated by the nonmagnetic interlayer 5B, the magnetization vector of the entire free magnetic layer 5 can rotate in response to a slight magnitude of external magnetic field. Furthermore, the free magnetic layer 5 itself has an adequate thickness in this embodiment. Thus, the spin-valve thin-film magnetic element exhibits high sensitivity.

The optimization of the thickness of the reflective mirror layer S1, like the back layer B1 in the first embodiment, is capable of controlling the magnitude of the exchange coupling magnetic field between the free magnetic layer 5 and the exchange bias layer 6. Moreover, the reflective mirror layer S1 extends the mean free path of the spin-up conduction electrons due to the specular effect at the interface between the free magnetic layer 5 and the reflective mirror layer S1, resulting in a large rate of change in resistance of the spin-valve thin-film magnetic element.

Accordingly, this spin-valve thin-film magnetic element exhibits simultaneously improvements in sensitivity to an external magnetic field due to the synthetic-ferri-free magnetic layer 5 and in rate of change in resistance due to the specular effect of the reflective mirror layer S1.

Third Embodiment

A third embodiment of the spin-valve thin-film magnetic element, the method for making the same, and the thin-film magnetic head provided with the spin-valve thin-film magnetic element will now be described with reference to FIG. 6, which is a cross-sectional view of the spin-valve thin-film magnetic element, viewed from a recording medium.

This spin-valve thin-film magnetic element is of a top type. That is, a composite 19 having substantially a trapezoidal cross section include an underlying layer 11 composed of tantalum or the like, an exchange bias layer 16, a back layer B2 as a mean-free-path-extending layer, a free magnetic layer 15, a nonmagnetic conductive layer 14, a pinned magnetic layer 13, an antiferromagnetic layer 12, and a protective layer 17, which are formed, in that order, on a substrate K. Electrode layers 18 are provided on two sides of the composite 19.

The pinned magnetic layer 13 is divided into a first pinned magnetic sublayer 13A and a second pinned magnetic sublayer 13C separated by a nonmagnetic interlayer 13B. This spin-valve thin-film magnetic element is of a synthetic ferri-pinned type in which the pinned magnetic layer 13 is in a synthetic ferri-pinned state.

Furthermore, in this spin-valve thin-film magnetic element, the magnetic field of the free magnetic layer is oriented in a direction substantially orthogonal to the magnetic field of the pinned magnetic layer by an exchange bias mode. The exchange bias method is more suitable for a high-density spin-valve thin-film magnetic element having a narrower track width compared to the hard bias mode in which effective track width is difficult to control due to the presence of insensitive regions.

The exchange bias layer 16 in this embodiment comprises an alloy containing Mn and at least one element selected from the group consisting of Pt, Pd, Ir, Rh, Ru, Os, Au, Ag, Cr, Ni, Ne, Ar, Xe, and Kr.

Preferably, the exchange bias layer 16 comprises an alloy represented by the following formula:

$$X_m Mn_{100-m}$$

wherein X is at least one element selected from the group consisting of Pt, Pd, Ir, Rh, Ru, and Os, and the subscript m representing the X content is in the range of 48 atomic percent$\leq m \leq$60 atomic percent and more preferably 48 atomic percent$\leq m \leq$58 atomic percent.

Alternatively, the exchange bias layer 16 may comprise an alloy represented by the following formula:

$$Pt_m Mn_{100-m-n} Z_n$$

wherein Z is at least one element selected from the group consisting of Pd, Ir, Rh, Ru, and Os, and the subscripts m and n representing the Pt and Z contents, respectively, are in the ranges of 48 atomic percent$\leq$+n$\leq$58 atomic percent and 0.2 atomic percent$\leq n \leq$40 atomic percent.

Alternatively, the exchange bias layer 16 may comprise an alloy represented by the following formula:

$$Pt_q Mn_{100-q-j} L_j$$

wherein L is at least one element selected from the group consisting of Au, Ag, Cr, Ni, Ne, Ar, Xe, and Kr, and the subscripts q and j representing the Pt and L contents, respectively, are in the ranges of 48 atomic percent$\leq$q+j$\leq$60 atomic percent and 0.2 atomic percent$\leq j \leq$10 atomic percent. More preferably, the subscripts q and j are in the ranges of 48 atomic percent$\leq$q+j$\leq$58 atomic percent and 0.2 atomic percent$\leq j \leq$10 atomic percent.

The PtMn alloy may be replaced with an X—Mn or X'—Pt—Mn alloy wherein X is one element selected from the group consisting of Pd, Ru, Ir, Rh, and Os, and X' is at least one element selected from the group consisting of Pd, Ru, Ir, Rh, Os, Au, Ag, Cr, Ni, Ar, Ne, Xe, and Kr. The Pt or X content in the PtMn alloy or the X—Mn alloy, respectively, is in the range of preferably 37 to 63 atomic percent and more preferably 47 to 57 atomic percent.

In the X'—Pt—Mn alloy, the total content of X' and Pt is in the range of preferably 37 to 63 atomic percent and more preferably 47 to 57 atomic percent, and the X' content is preferably in the range of 0.2 to 10 atomic percent. When X' is at least one element selected from Pd, Ru, Ir, Rh, and Os, the X' content is preferably in the range of 0.2 to 40 atomic percent.

The exchange bias layer 16 is formed of one of these alloys and is annealed so that the exchange bias layer 16 generates an intense exchange coupling magnetic field. When the PtMn alloy is used, the resulting exchange bias layer 16 exhibits a high exchange coupling magnetic field of at least 48 kA/m, particularly at least 64 kA/m, and a significantly high blocking temperature of 380° C., wherein the exchange bias layer 16 loses the exchange coupling magnetic field above the blocking temperature.

Each of these alloys in an as-deposited state has a disordered face-centered cubic (fcc) structure having the same lattice constant for the a axis and the c axis, and is changed to a face-centered tetragonal (fct) structure (the ratio of the a axis to the c axis $\approx$0.9) of a CuAuI type by annealing.

The back layer B2 deposited on the exchange bias layer 16 may be composed of a metallic material or nonmagnetic conductive material, such as Au, Ag, or Cu. The thickness thereof is, for example, 5 to 30 angstroms.

By adjusting the thickness of the back layer B2, the magnitude of the exchange anisotropic magnetic field generated by the exchange coupling between the free magnetic layer 15 and the exchange bias layer 16 can be controlled within a suitable range. Meanwhile, because the exchange bias layer 16 which contributes to generating the exchange anisotropic magnetic field by exchange coupling so as to set the magnetization vector of the free magnetic layer 15 can be adjusted to have a predetermined thickness in the planar direction, the free magnetic layer 15 can be readily put into a single-magnetic-domain state, thus preventing side readings and complying with a higher magnetic recording density.

Furthermore, the back layer B2, as described above, extends the mean free path of spin-up conduction electrons which contributes to the magnetoresistive effect. By the spin filter effect, the spin-valve thin-film magnetic element exhibits a large rate of change in resistance ($\Delta$R/R) and is thus suitable for the higher-density recordings.

The thickness of the back layer B2 may be set in the range of 5 to 30 angstroms. When the back layer B2 has a thickness of less than 5 angstroms, the exchange anisotropic magnetic field generated by the exchange coupling between the free magnetic layer 15 and the exchange bias layer 16 becomes too strong, thus firmly pinning the magnetization vector of the free magnetic layer 15. Thus, the magnetization vector of the free magnetic layer 15 does not change even when an external magnetic field to be detected is applied, the change in resistance does not occur, detection sensitivity is degraded, and the read output characteristics of the spin-valve thin-film magnetic element are undesirably deteriorated. Furthermore, the rate of change in resistance cannot be improved by the spin filter effect as will be described below.

When the thickness of the back layer B2 exceeds 30 angstroms, the ratio of a sensing current imparted to the back layer B2 composed of a nonmagnetic conductive material increases. Thus, the sensing current flowing in the interface between the free magnetic layer 15 and the exchange bias layer 16 and in the vicinity of the interface, the current necessary for obtaining the GMR effect, decreases. In other words, the shunt loss of the sensing current is increased. In such a case, not only it becomes difficult to obtain a large rate of change in resistance (ΔR/R), but also the exchange anisotropic magnetic field generated by the exchange coupling between the free magnetic layer 5 and the exchange bias layer 6 becomes too weak that it is difficult to control the magnetization vector in the free magnetic layer 5. Consequently, Barkhausen noise causing instability in processing signals provided from the magnetic recording medium may undesirably occur.

Preferably, the free magnetic layer 15 generally has a thickness in the range of 10 to 15 angstroms, and is formed of a ferromagnetic material or the like, as in the material for first and second pinned magnetic sublayers 13A and 13C, respectively, as described below.

The free magnetic layer 15 is aligned in a single-domain state in the X1 direction in the drawing by the exchange coupling magnetic field from the exchange bias layer 16 in order to prevent the generation of Barkhausen noise.

The nonmagnetic conductive layer 14 is composed of copper or the like, and has a thickness in the range of 20 to 25 angstroms.

As described above, the pinned magnetic layer 13 is composed of a second pinned magnetic sublayer 13C deposited on the nonmagnetic conductive layer 14, a nonmagnetic interlayer 13B deposited on the second pinned magnetic sublayer 13C, and a first pinned magnetic sublayer 13A deposited on the nonmagnetic interlayer 13B, the magnetization vector of the first pinned magnetic sublayer 13A being antiparallel to the magnetization vector of the second pinned magnetic sublayer 13C.

The first and second pinned magnetic sublayers 13A and 13C, respectively, are composed of a ferromagnetic material, such as elemental cobalt, a NiFe alloy, a CoNiFe alloy, a CoFe alloy, or CoNi alloy. These layers preferably have a thickness of approximately 40 angstroms. In a preferred combination, the first pinned magnetic sublayer 13A is composed of, for example, copper and has a thickness of 13 to 15 angstroms, whereas the second pinned magnetic sublayer 13C is composed of, for example, copper and has a thickness of 20 to 25 angstroms.

Preferably, the nonmagnetic interlayer 13B is composed of at least one element selected from Ru, Rh, Ir, Cr, Re, and Cu, and has a thickness of approximately 8 angstroms.

The first pinned magnetic sublayer 13A is in contact with the antiferromagnetic layer 12 and is annealed in a magnetic field so as to form an exchange coupling magnetic field (exchange anisotropic magnetic field) at the interface between the first pinned magnetic sublayer 13A and the antiferromagnetic layer 12 and to magnetize the first pinned magnetic sublayer 13A, for example, in the Y direction, as shown in FIG. 4. When the magnetization vector of the first pinned magnetic sublayer 13A is pinned in the Y direction in the drawing, the magnetization vector of the second pinned magnetic sublayer 13C is pinned so as to be antiparallel to the magnetization vector of the first pinned magnetic sublayer 13A.

The ratio of the thickness of the first pinned magnetic sublayer 13A to the thickness of the second pinned magnetic sublayer 13C is controlled to a suitable range to enhance the magnitude of the exchange coupling magnetic field (Hex*), to maintain the thermally stable antiparallel state (ferri-state) of the magnetization vector of the first pinned magnetic sublayer 13A and the magnetization vector of the second pinned magnetic sublayer 13C, and to ensure an adequate rate of change in resistance (ΔR/R) which is comparable with conventional levels.

The antiferromagnetic layer 12 generally has a thickness in the range of 80 to 300 angstroms. The antiferromagnetic layer 12 is composed of an alloy containing Mn and at least one element selected from the group consisting of Pt, Pd, Ir, Rh, Ru, Os, Au, Ag, Cr, Ni, Ne, Ar, Xe, and Kr, as in the exchange bias layer 16. The pinned magnetic layer 13 is magnetized in a predetermined direction by annealing in a magnetic field.

Preferably, the antiferromagnetic layer 12 comprises an alloy represented by the following formula:

$$X_m Mn_{100-m}$$

wherein X is at least one element selected from the group consisting of Pt, Pd, Ir, Rh, Ru, and Os, and the subscript m representing the X content is in the range of 52 atomic percent ≦ m ≦ 60 atomic percent.

Alternatively, the antiferromagnetic layer 12 may comprise an alloy represented by the following formula:

$$Pt_m Mn_{100-m-n} Z_n$$

wherein Z is at least one element selected from the group consisting of Pd, Ir, Rh, Ru, Os, Au, Ag, Cr, and Ni and the subscripts m and n representing the Pt and Z contents, respectively, are in the ranges of 52 atomic percent ≦ m+n ≦ 60 atomic percent and 0.2 atomic percent ≦ n ≦ 10 atomic percent.

Alternatively, the antiferromagnetic layer 12 may comprise an alloy represented by the following formula:

$$Pt_q Mn_{100-q-j} L_j$$

wherein L is at least one element selected from the group consisting of Au, Ag, Cr, Ni, Ne, Ar, Xe, and Kr, and the subscripts q and j representing the Pt and L contents, respectively, are in the ranges of 52 atomic percent ≦ q+60 atomic percent and 0.2 atomic percent ≦ j ≦ 10 atomic percent.

The protective layer 17 is composed of Ta, and has an oxide layer on the surface thereof.

Figure 23:
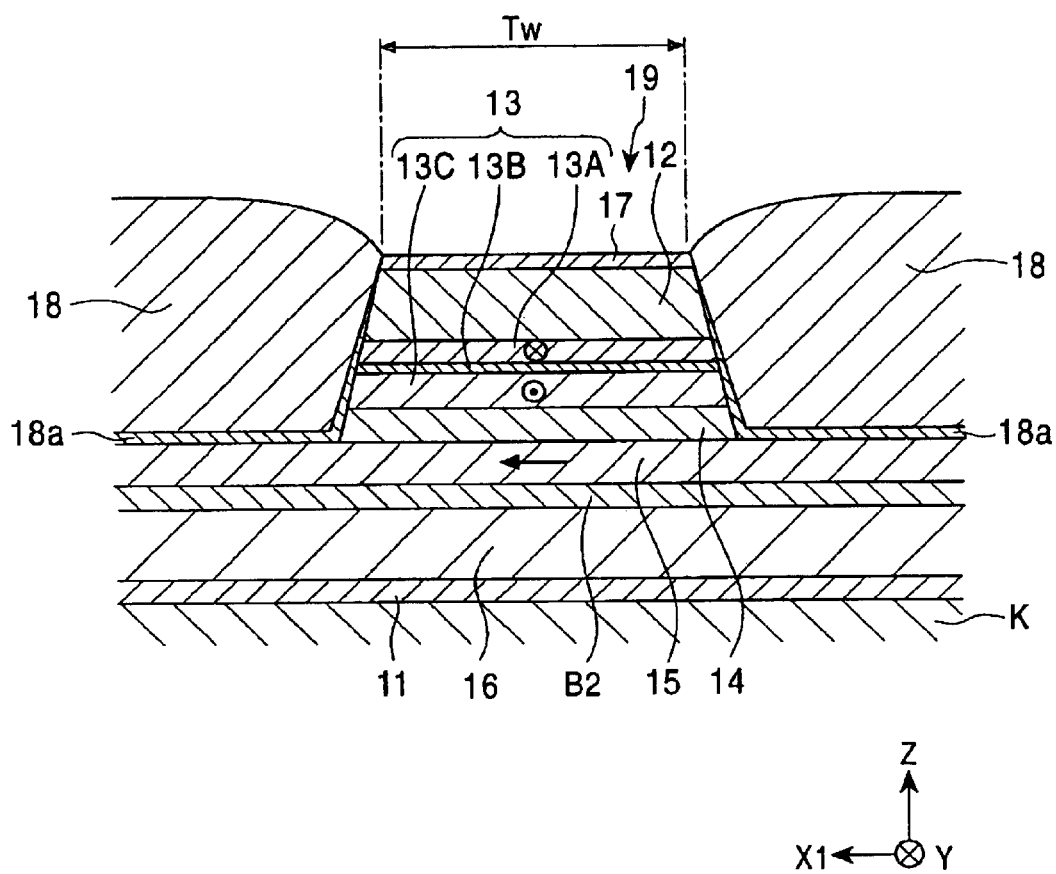
FIG. 23 is a cross-sectional view of another configuration in the electrode layers of the spin-valve thin-film magnetic element shown in FIG. 1.

Preferably, the electrode layers 18 are composed of Au, W, Cr, or Ta. The electrode layers 18 and the composite 19 may have configurations shown in FIGS. 21 and 23. That is, The electrode layers 18 may be formed on the protective layer 7 of the composite 19 on both sides of the composite 19 in the planar direction, without milling the composite 19, as in the element shown in FIG. 21. Alternatively, the composite 19 may be formed so as to extend at least from the nonmagnetic conductive layer 14 or at least from the free magnetic layer 15 to the top, as shown in FIG. 23. In the latter case, the composite 19 is milled on both sides in the planar direction from the top to part of the nonmagnetic conductive layer 14 or the free magnetic layer 15.

The electrode layers 18 are formed on electrode underlayers 18a in this embodiment. The electrode underlayers 18a are composed of, for example, Ta, and has a thickness of approximately 50 angstroms.

Figure 6:
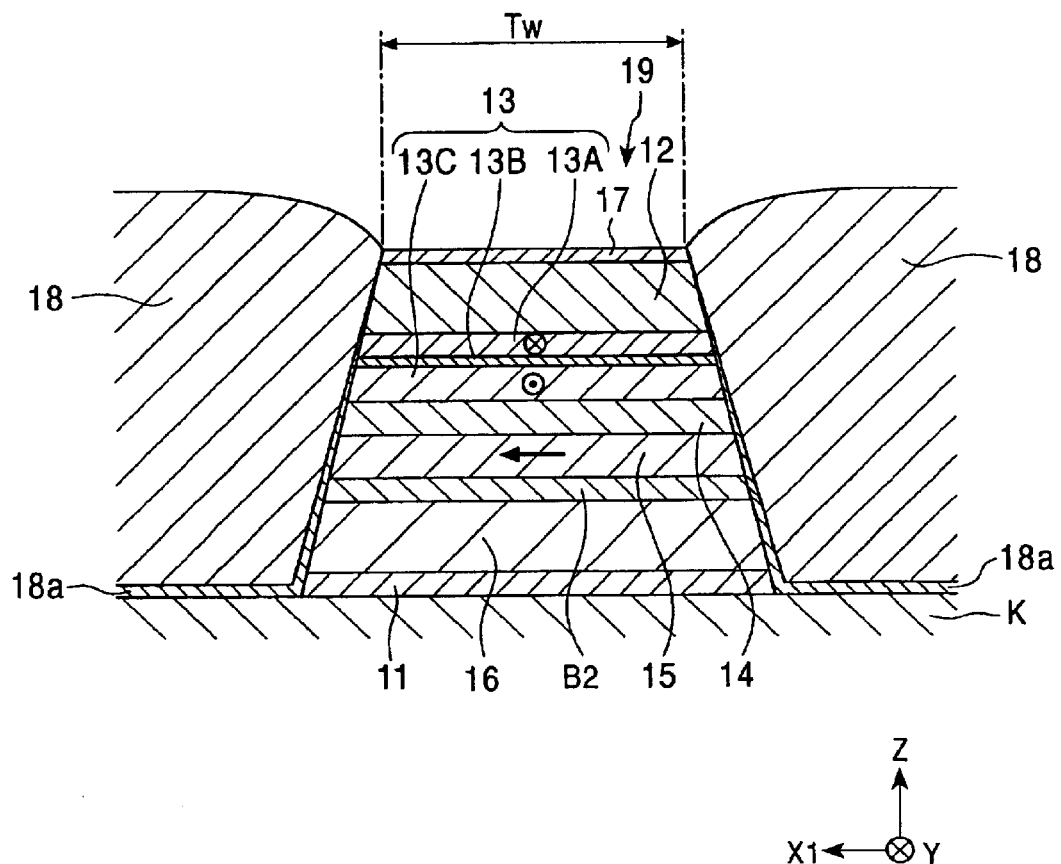
FIG. 6 is a cross-sectional view of a third embodiment of the spin-valve thin-film magnetic element in accordance with the present invention when viewed from a face opposing a recording medium.

In the spin-valve thin-film magnetic element shown in FIG. 6, the electrode layers 18 supply a sensing current to the composite 19. The magnetization vector of the free magnetic layer 15 varies from the in the X1 direction toward the Y direction in the drawing in response to a magnetic field applied in the Y direction. Scattering of spin-dependent conduction electrons thereby occurs at the interface between the nonmagnetic conductive layer 14 and the free magnetic layer 15 due to the GMR effect. As a result, a leakage magnetic field from a recording medium is detected as a change in electrical resistance of the spin-valve thin-film magnetic element.

The spin-valve thin-film magnetic element in this embodiment can be produced by the same method as that in the first embodiment shown in FIGS. 1 to 4.

In this top-type spin-valve thin-film magnetic element, the antiferromagnetic layer 12, which is distant from the substrate K, corresponds to the exchange bias layer 6 in the first embodiment of the bottom type, whereas the exchange bias layer 16 near the substrate K corresponds to the antiferromagnetic layer 2 in the first embodiment.

Thus, in this method, the underlying layer 11, the exchange bias layer 16, the back layer B2, the free magnetic layer 15, the nonmagnetic conductive layer 14, the pinned magnetic layer 13, the antiferromagnetic layer 12, and the protective layer 17 are deposited in that order on the substrate K. Next, the composite is annealed at a first annealing temperature in a first magnetic field applied in the track width direction to generate exchange anisotropic magnetic fields in the antiferromagnetic layer 12 and the exchange bias layer 16 so that the first pinned magnetic sublayer 13A and the exchange bias layer 16 are magnetized in the same direction and the exchange anisotropic magnetic field in the exchange bias layer 16 is larger than the exchange anisotropic magnetic field in the antiferromagnetic layer 12.

Next, the composite is annealed at a second annealing temperature higher than the first annealing temperature in a second magnetic field which is applied perpendicularly to the track width direction, is larger than the exchange anisotropic magnetic field of the antiferromagnetic layer 12, and is smaller than the exchange anisotropic magnetic field of the exchange bias layer 16 to generate a bias magnetic field in the first pinned magnetic sublayer 13A in which the bias magnetic field has a magnetization vector substantially orthogonal to that of the magnetic field in the exchange bias layer 16.

The annealed composite is partially removed by ion milling or the like to complete the composite 19 having a width which is nearly equal to the track width Tw. The electrode underlayers 18a and the electrode layers 18 are formed to complete the spin-valve thin-film magnetic element.

In this embodiment, the back layer B2 provided between the free magnetic layer 15 and the exchange bias layer 16 moderates the magnitude of the exchange coupling magnetic field, for pinning the magnetic field of the free magnetic layer 15, from the exchange bias layer 16 to a proper level. Thus, the magnetization vector of the free magnetic layer 15 more smoothly changes in response to a weak signal magnetic field from a magnetic recording medium, and the resulting spin-valve thin-film magnetic element is highly sensitive.

Moreover, the back layer B2 further extends the mean free path of the conduction electrons by a so-called spin filter effect. Since the difference in the mean free path of spin-dependent conduction electrons increases, the spin-valve thin-film magnetic element exhibits a further improved rate of change in resistance ($\Delta R/R$).

Since the free magnetic layer 15 is magnetized by the exchange bias layer 16 having a uniform thickness, the magnetic domains in the free magnetic layer 15 are readily aligned into a single-domain state, resulting in reduced Barkhausen noise. Furthermore, the free magnetic layer 15 in a single-domain state can supply a sensing current from the electrode layers 18 directly to the free magnetic layer 15. Thus, this bottom-type configuration can reduce possible occurrence in side reading and is more suitable for a higher magnetic recording density.

Since both the antiferromagnetic layer 12 and the exchange bias layer 16 are composed of an alloy containing Mn and at least one element selected from the group consisting of Pt, Pd, Ir, Rh, Ru, Os, Au, Ag, Cr, Ni, Ne, Ar, Xe, and Kr, the exchange anisotropic magnetic field exhibits satisfactory dependence on temperature, and the spin-valve thin-film magnetic element exhibits high heat resistance.

Moreover, the spin-valve thin-film magnetic element is highly resistant to environmental temperature in a device, such as a hard disk drive, and the Joule heat generated by a sensing current supplied to the element. Thus, the exchange anisotropic magnetic field (exchange coupling magnetic field) does not exhibit a large change with temperature.

Moreover, the antiferromagnetic layer 12 composed of the above alloy exhibits a high blocking temperature and a large exchange anisotropic magnetic field. Thus, the magnetization vector of the pinned magnetic layer 13 can be more firmly fixed.

This spin-valve thin-film magnetic element is of a synthetic ferri-pinned type in which the magnetization vector of the first pinned magnetic sublayer 13A and the magnetization vector of the second pinned magnetic sublayer 13C are antiparallel to each other. A large exchange coupling magnetic field (Hex) can maintain a stable antiparallel arrangement between the magnetization vector of the first pinned magnetic sublayer 13A and the second pinned magnetic sublayer 13C. Thus, the magnetization vector of the pinned magnetic layer 13 can be readily controlled.

Furthermore, a demagnetizing field (dipole magnetic field) due to the pinned magnetization of the pinned magnetic layer 13 compensates for a magnetostatic coupling magnetic field of the first pinned magnetic sublayer 13A and a magnetostatic coupling magnetic field of the second pinned magnetic sublayer 13B. Since the demagnetizing field (dipole magnetic field) is substantially zero, the effect of the dipole magnetic field (dipole magnetic field) of the pinned magnetic layer 13 on the variable magnetization of the free magnetic layer 15 is substantially negligible.

Furthermore, the variable magnetization vector of the free magnetic layer 15 can be readily aligned in a desired direction so that the spin-valve thin-film magnetic element exhibits small asymmetry. Thus, the variable magnetization of the free magnetic layer 15 can be readily controlled.

Fourth Embodiment

Now, a fourth embodiment of the spin-valve thin-film magnetic element, a method for making the same, and a thin-film magnetic head equipped with the spin-valve thin-film magnetic element in accordance with the present invention will be described with reference to the drawings below.

Figure 7:
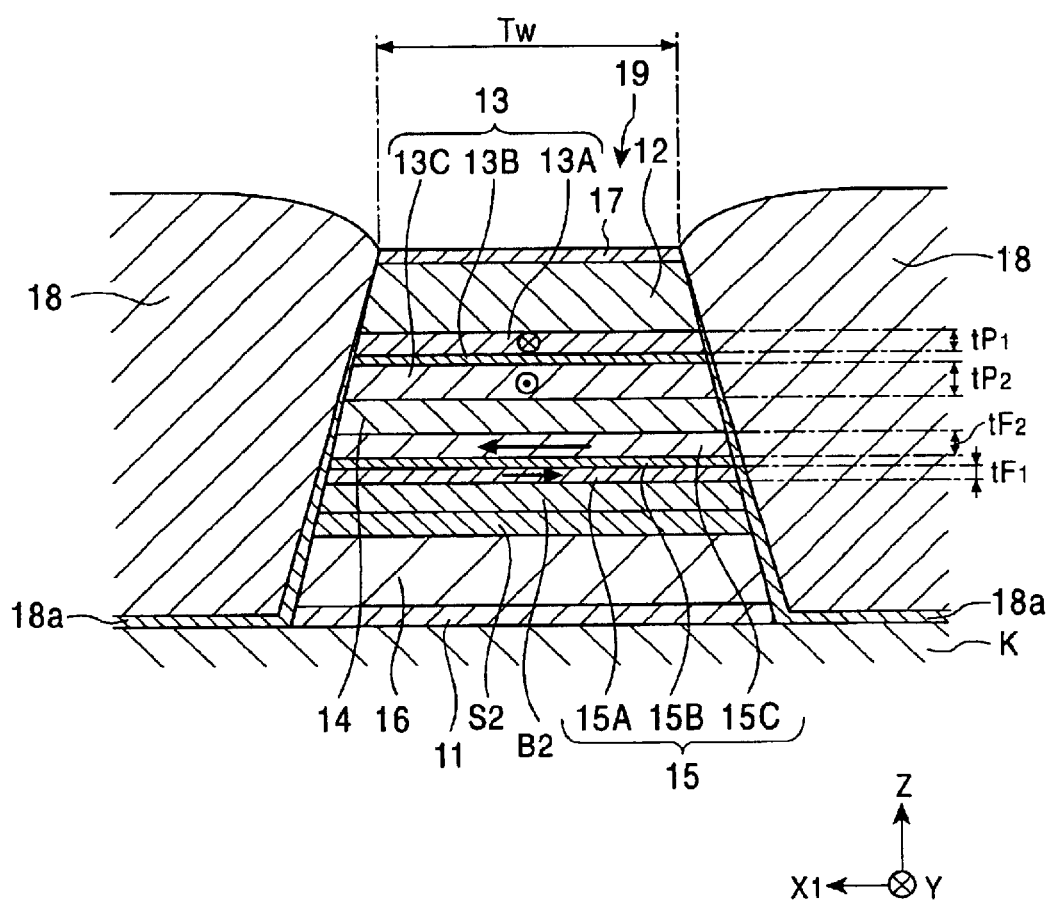
FIG. 7 is a cross-sectional view of a fourth embodiment of the spin-valve thin-film magnetic element in accordance with the present invention when viewed from a face opposing a recording medium.

FIG. 7 is a cross-sectional view of a spin-valve thin-film magnetic element viewed from a recording medium.

The spin-valve thin-film magnetic element of this embodiment is a top-type spin-valve thin-film magnetic element comprising, from the substrate side, a free magnetic layer, a nonmagnetic conductive layer, a pinned magnetic layer, and an antiferromagnetic layer. The pinned magnetic layer has a first pinned magnetic sublayer and a second pinned magnetic sublayer with a nonmagnetic interlayer therebetween. The magnetization vector of the second pinned magnetic sublayer is oriented to be antiparallel to the magnetization vector of the first pinned magnetic sublayer, and the pinned magnetic layer is put into a synthetic-ferrimagnetic state. The spin-valve thin-film magnetic element having the above configuration is known as a synthetic-ferri-free type single spin-valve thin-film element.

The spin-valve thin-film magnetic element of this embodiment differs from the third embodiment shown in FIG. 6 in that the free magnetic layer is composed of two sublayers in a synthetic-ferri-magnetic state and is of synthetic-ferri-free type and that a reflective mirror layer is provided as an extending layer in addition to the back layer.

In this embodiment, parts having the same functions as the third embodiment are referred to with the same reference numerals and a detailed description thereof is omitted.

In a composite 19 of this embodiment, a free magnetic layer 15 is composed of a first free magnetic sublayer 15A, a second free magnetic sublayer 15C, and a nonmagnetic interlayer 15B sandwiched by the first free magnetic sublayer 15A and the a second free magnetic sublayer 15C. The first free magnetic sublayer 15A is provided under the nonmagnetic interlayer 15B closer to the exchange bias layer 16 whereas the nonmagnetic interlayer 15B is provided on the nonmagnetic interlayer 15B closer to a nonmagnetic conductive layer 14.

The first free magnetic sublayer 15A is preferably composed of the same ferromagnetic material as the pinned magnetic layers 13A and 13C. For example, the first free magnetic sublayer 15A is preferably composed of a NiFe alloy, elemental Co, a CoNiFe alloy, a CoFe alloy, or a CoNi alloy, and more preferably composed of a NiFe alloy.

The nonmagnetic interlayer 15B is composed of a nonmagnetic material. Preferably, the nonmagnetic interlayer 15B is composed of at least one element selected from the group Ru, Rh, Ir, Cr, Re, and Cu. More preferably, the nonmagnetic interlayer 15B is composed of elemental Ru.

The second free magnetic sublayer 15C is composed of a ferromagnetic material and is preferably composed of the same material as the first free magnetic sublayer 15A and the pinned magnetic layer 14. For example, the second free magnetic sublayer 15C is preferably composed of a NiFe alloy, elemental Co, a CoNiFe alloy, a CoFe alloy, or a CoNi alloy. More preferably, the second free magnetic sublayer 15C is composed of a NiFe alloy.

Alternatively, the second free magnetic sublayer 15C may comprise a plurality of layers.

The thickness $tF_2$ of the second free magnetic sublayer 15C is greater than the thickness $tF_1$ of the first free magnetic sublayer 15A. The thickness $tF_2$ is preferably in the range of 30 to 40 angstroms and more preferably in the range of 35 to 40 angstroms. It is not desirable that the thickness $tF_2$ be out of the above range because the rate of change in resistance ($\Delta R/R$) of the spin-valve thin-film magnetic element cannot then be increased.

Preferably, the thickness $tF_1$ of the first free magnetic sublayer 15A is in the range of 5 to 25 angstroms.

When the saturation magnetizations of the first free magnetic sublayer 15A and the second free magnetic sublayer 15C are $M_1$ and $M_2$, respectively, the magnetic thicknesses of the first free magnetic sublayer 15A and the second free magnetic sublayer 15C are $M_1 \cdot tF_1$ and $M_2 \cdot tF_2$, respectively. In the free magnetic layer 15, the magnetic thickness $M_2 \cdot tF_2$ of the second free magnetic sublayer 15C is larger than the magnetic thickness $M_1 \cdot tF_1$ of the first free magnetic sublayer 15A.

The first free magnetic sublayer 15A and the second free magnetic sublayer 15C are antiferromagnetically coupled with each other. For example, the second free magnetic sublayer 15C is magnetized in the X1 direction in the drawing by the exchange bias layer 16, whereas the first free magnetic sublayer 15A is magnetized in a direction opposite to the X1 direction.

Since the magnetic thickness $M_2 \cdot tF_2$ of the second free magnetic sublayer 15C is larger than the magnetic thickness $M_1 \cdot tF_1$ of the first free magnetic sublayer 15A, the magnetization of the second free magnetic sublayer 15C remains in the entire free magnetic layer 15. Thus, the magnetization vector of the entire free magnetic layer 15 is oriented in the X1 direction. In this case, the effective thickness of the free magnetic layer 15 becomes $M_2 \cdot tF_2 - M_1 \cdot tF_1$.

As a consequence, the first free magnetic sublayer 15A and the second free magnetic sublayer 15C are in a synthetic-ferri magnetic state. The magnetization vector of the free magnetic layer 15 is oriented to be substantially orthogonal to the magnetization vector of the pinned magnetic layer 13.

In this embodiment, the reflective mirror layer S2 as the extending layer is formed between the exchange bias layer 16 and a back layer B2.

The reflective mirror layer S2 is composed of an insulating material. Examples of insulating materials suitable for the reflective mirror layer S2 include oxides, such as $\alpha$-$Fe_2O_3$, NiO, CoO, Co—Fe—O, Co—Fe—Ni—O, $Al_2O_3$, Al—Q—Q (wherein Q is at least one element selected from the group consisting of B, Si, N, Ti, V, Cr, Mn, Fe, Co, and Ni), and Z—O (wherein Z is at least one element selected from the group consisting of Ti, V, Cr, Zr, Nb, Mo, Hf, Ta and W); and nitrides, such as Al-N, Al-Q-N (wherein Q is at least one element selected from the group consisting of B, Si, O, Ti, V, Cr, Mn, Fe, Co, and Ni), and Z-N (wherein R is at least one element selected from the group consisting of Ti, V, Cr, Zr, Nb, Mo, Hf, Ta, and W).

The reflective mirror layer S2 composed of the above material in combination with the back layer B2 forms a potential barrier necessary for reflecting conductive electrons while maintaining their spin states at the interface between the back layer B2 and the reflective mirror layer S2. In order to form the above-mentioned potential barrier, it is effective that the reflective mirror layer S2 is an electrical insulator whereas the back layer B2 is an electrical conductor.

When the reflective mirror layer S2 is composed of an antiferromagnetic material such as $\alpha$-$Fe_2O_3$ and NiO, the reflective mirror layer S2 may also function as the exchange bias layer 16.

The thickness of the reflective mirror layer S2 is preferably defined as the total thickness of an extending layer including the back layer B2.

The thickness of the extending layer, i.e., the total thickness of the back layer B2 and the reflective mirror layer S2, is preferably in the range of 5 to 30 angstroms. When the thickness of the back layer B2 is less than 5 angstroms, the exchange anisotropic magnetic field generated by the exchange coupling between the free magnetic layer 15 and the exchange bias layer 16 becomes too strong, thus firmly pinning the magnetization vector of the free magnetic layer 15. As a consequence, the magnetization vector of the free magnetic layer 15 does not change even when there is an external magnetic field to be detected, the change in resistance does not occur, detection sensitivity is degraded, and the read output characteristics of the spin-valve thin-film magnetic element are undesirably deteriorated.

When the reflective mirror layer S2 is composed of an antiferromagnetic material such as $\alpha$-$Fe_2O_3$ and NiO so as to function as the exchange bias layer 16 as well and when the thickness of the reflective mirror layer S2 exceeds 30 angstroms, the exchange anisotropic magnetic field generated by the exchange coupling between the free magnetic layer 15 and the exchange bias layer 16 becomes so weak that it is difficult to control the magnetic field in the free magnetic layer 15. As a consequence, there is an increased danger that Barkhausen noise is generated causing instability and errors in processing the signals provided form the magnetic recording medium.

When the reflective mirror layer S2 also functions as the exchange bias layer 16, the thickness needs to be approximately 500 angstroms or less. Here, the maximum thickness is determined by the length of the reading gap.

In such a configuration, the reflective mirror layer S2 forms a potential barrier in the interface between the back layer B2 and the reflective mirror layer S2 so as to reflect spin-up conduction electrons moving in the back layer B2 while maintaining their spin states. As a consequence, the mean-free-path of the spin-up electrons can be further extended, generating a so-called specular effect.

It should be noted that in this embodiment, some of the spin-up conduction electrons are scattered in the nonmagnetic interlayer 15B and the first free magnetic sublayer 15A. In order to avoid this, the first free magnetic sublayer 15A may be configured as a single layer as in the third embodiment so as to effectively achieve the specular effect.

In this spin-valve thin-film magnetic element, when the magnetization vector of a free magnetic layer 5 oriented in the X1 direction shown in FIG. 7 is changed due to a leakage magnetic field from a recording medium such as a hard disk, electrical resistance changes in relation to the magnetization vector of a second pinned magnetic sublayer 13C pinned in the direction opposite to the Y direction in the drawing, thereby detecting the leakage magnetic field from the magnetic recording medium as a change in voltage based on the change in electrical resistance.

The spin-valve thin-film magnetic element of this embodiment can be manufactured through the same method as that of the aforementioned third embodiment shown in FIG. 6.

More particularly, an underlayer 11, the exchange bias layer 16, the back layer B2, the free magnetic layer 15, the nonmagnetic conductive layer 14, a pinned magnetic layer 13, an antiferromagnetic layer 12, and a protective layer 17 are deposited in that order on the substrate K to form a composite. Next, the composite is annealed at a first annealing temperature while applying a first magnetic field in the direction of the track width to generate exchange anisotropic magnetic fields in the antiferromagnetic layer 12 and the exchange bias layer 16 so that the first pinned magnetic sublayer 13A and the exchange bias layer 16 are magnetized in the same direction and the exchange anisotropic magnetic field in the exchange bias layer 16 is larger than the exchange anisotropic magnetic field in the antiferromagnetic layer 12.

Next, the composite is annealed at a second annealing temperature higher than the first annealing temperature in a second magnetic field which is applied perpendicularly to the track width direction, is larger than the exchange anisotropic magnetic field of the antiferromagnetic layer 12, and is smaller than the exchange anisotropic magnetic field of the exchange bias layer 16 to provide the first pinned magnetic sublayer 13A with a bias magnetic field substantially orthogonal to the magnetization vector of the exchange bias layer 16.

The annealed composite is partially removed by ion milling or the like to complete the composite 19 having a width nearly equal to the track width Tw. The electrode underlayers 18a and the electrode layers 18 are formed to complete the spin-valve thin-film magnetic element.

In this embodiment shown in FIG. 7, part of the composite 19 is removed to the level of the underlayer 11. Alternatively, as in the bottom-type element shown in FIG. 23 described above, the composite 29 may be removed down to the level of the nonmagnetic conductive layer 14, leaving part of the free magnetic layer 15, the back layer B2, the reflective mirror layer S2, and the exchange bias layer 16 so as to form the electrode layers 18 on the top thereof and to obtain the free magnetic layer 15 extending in the horizontal direction (away from track width). In this manner, the demagnetizing field in the free magnetic layer 15 in the track width direction is weakened, thereby enhancing the stability of the magnetization vector in the track width direction and the reading waveform.

Each of the electrode layers 18 is either a single layer composed of at least one element selected from the group consisting of Cr, Au, Ta, and W, or a multilayer composed of a plurality of such single layers so as to reduce the resistance. In this embodiment, Ta is epitaxially grown on the electrode underlayers 18a composed of Cr so as to form the electrode layers 18 and to reduce the electrical resistance.

The spin-valve thin-film magnetic element of this embodiment enjoys the same advantages as does the element of the third embodiment shown in FIG. 6. Moreover, because the free magnetic layer 15 has two layers, this spin-valve thin-film magnetic element is of synthetic-ferri-free type and is capable of changing the magnetization vector of the overall free magnetic layer 15 in response to a significantly weak external magnetic field. Furthermore, because the thickness of the free magnetic layer is not excessively thin, the sensitivity of the spin-valve thin-film magnetic element can be improved.

In this spin-valve thin-film magnetic element, the back layer B2 and the reflective mirror layer S2 is deposited between the exchange bias layer 16 and the free magnetic layer 15. By adjusting the thickness of the extending layer composed of the back layer B2 and the reflective mirror layer S2, the magnitude of the exchange coupling magnetic field between the free magnetic layer 15 and the exchange bias layer 16 can be controlled in a similar manner to adjusting the thickness of the back layer B2 of the third embodiment shown in FIG. 6. Moreover, since spin-up conduction electrons having an extended mean-free-path due to the spin filter effect by the back layer B2 are mirror-reflected at the interface between the back layer B2 and the reflective mirror layer S2, the mean-free-path of the spin-up conduction electrodes can be further extended, improving the rate of change in the magnetic resistance due to the specular effect.

Accordingly, both the sensitivity of the synthetic-ferri-free layer (the free magnetic layer 15) for detecting an external magnetic field and rate in change of magnetic resistance due to the spin filter effect in the back layer B2 and specular effect in the reflective mirror layer S2 can be improved simultaneously.

It should be noted that in each of the elements of the first to third embodiments shown in FIGS. 1 to 6, the arrangement may be such that the extending layer is composed of the back layer and the reflective mirror layer so as to improve the rate of change in the magnetic resistance due to the spin filter effect of the back layer and the specular effect of the reflective mirror layer.

Furthermore, in each of the elements of the first to fourth embodiments shown in FIGS. 1 to 7, the arrangement may be such that the reflective mirror layer is disposed at a position not contacting the nonmagnetic conductive layers of the pinned magnetic layer and the free magnetic layer. In this way, the apparent mean-free-path of the conduction electrode can be further increased due to the specular effect thereby achieving a GMR effect of increased rate of change in resistance (ΔR/R) and enhancing the read output characteristics of the spin-valve thin-film magnetic element.

A thin-film magnetic head of the present invention will now be described in detail.

Figure 13:
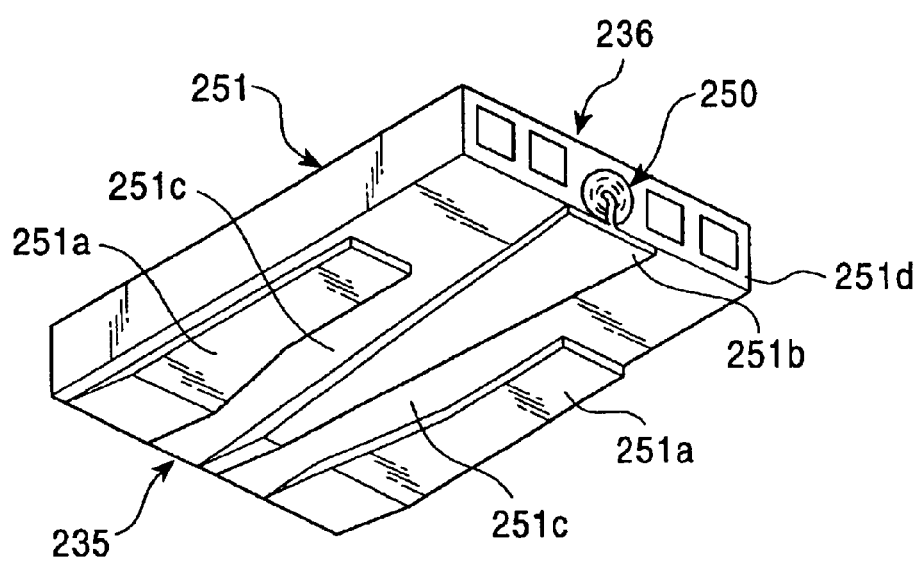
FIG. 13 is an isometric view of an exemplary thin-film magnetic head of the present invention.

FIG. 13 is an isometric view of an exemplary thin-film magnetic head of the present invention. This thin-film magnetic head is of a floating type and is mounted into a magnetic recording medium such as a hard disk. The thin-film magnetic head has a slider 251 including a leading end 235 lying at the leading portion in the moving direction of the disk surface and a trailing end 236. The slider 251 also has rail air bearing surfaces (ABSs) 251a and 251b and air grooves 251c on a side facing the disk. The slider 251 has a magnetic core section 250 on a trailing side 251d.

Figure 14:
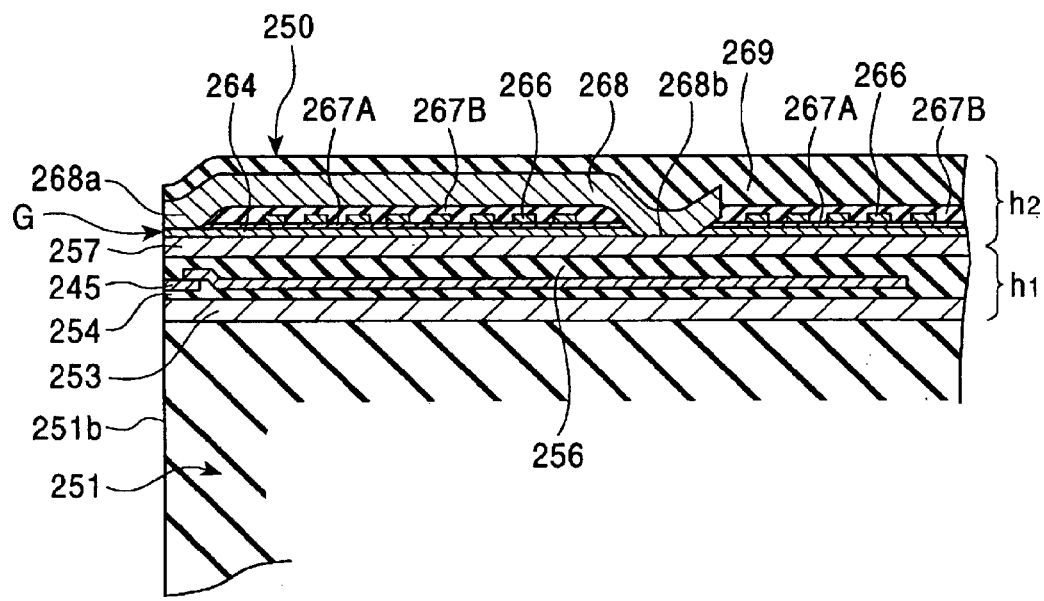
FIG. 14 is a cross-sectional view of a magnetic core portion of the thin-film magnetic head shown in FIG. 13.
Figure 15:
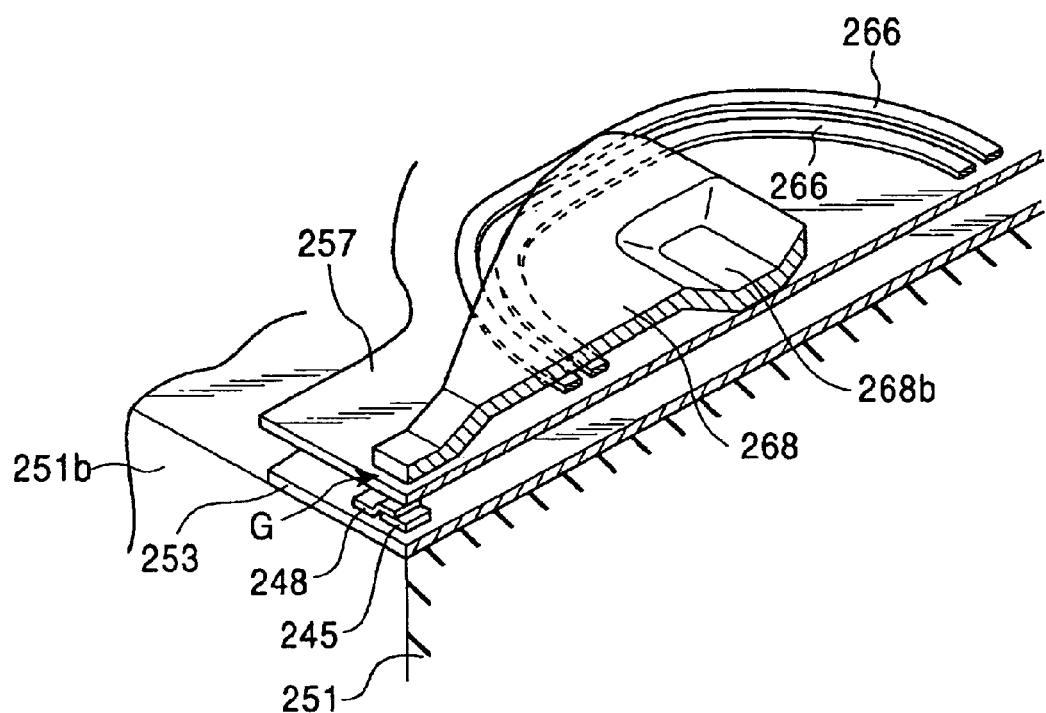
FIG. 15 is an isometric view of a portion of the thin-film magnetic head shown in FIG. 14.

The magnetic core section 250 is a combined magnetic head shown in FIGS. 14 and 15 and has a MR read head h1 and inductive write head h2 which are deposited in that order on the trailing side 251d of the slider 251.

The slider 251 also functions as a substrate of the MR read head h1. The slider 251 is provided with a lower shield layer 253 composed of a magnetic alloy and lies at the trailing end thereof. A lower gap layer 254 is provided on the lower shield layer 253. A magnetoresistive element 245 is deposited on the lower gap layer 254. An upper gap layer 256 is formed on the magnetoresistive element 245, and an upper shield layer 257 is formed thereon. The upper shield layer 257 is also used as a lower core layer of the inductive write head h2.

The MR read head h1 reads information recorded on a magnetic recording medium such as a hard disk by changes in resistance of the magnetoresistive element 245 in response to slight magnetic fields from the magnetic recording medium. The magnetoresistive element 245 includes the above—mentioned spin-valve thin-film magnetic element. This spin-valve thin-film magnetic element is the most important component of the thin-film magnetic head (read head).

The inductive write head h2 has a gap layer 264 provided on the lower core layer 257, and a coil layer 266 having a planar spiral pattern thereon. The coil layer 266 is surrounded by the first insulating layer 267A and a second insulating layer 267B. As shown in FIGS. 14 and 15, an upper core layer 268 is formed on the second insulating layer 267B, opposes the lower core layer 257 with a magnetic gap G therebetween at an air bearing surface (ABS) 251b, and is magnetically coupled with the lower core layer 257 at a base end 268b. A protective layer 269 composed of alumina or the like is provided on the upper core layer 268.

In this inductive write head h2, a recording current flows in the coil layer 266 so that a recording magnetic flux from the coil layer 266 is applied to the lower and upper core layers 257 and 268, respectively. A leakage magnetic field from the front edges of the lower core layer 257 and the upper core layer 268 is recorded on the magnetic recording medium as magnetic signals.

In the production of the thin-film magnetic head of the present invention, as shown in FIG. 14, the lower gap layer 254 is formed on the lower shield layer 253 composed of a magnetic material, and the magnetoresistive element 254 composed of the spin-valve thin-film magnetic element of the present invention is formed thereon. The upper gap layer 256 and the lower core layer 257 are formed on the magnetoresistive element 245 to complete the MR read head h1.

Next, the gap layer 264 is formed on the lower core layer or upper shield layer 257, and the spiral coil layer 266 is formed thereon so as to be surrounded with the first insulating layer 267A and the second insulating layer 267B. The upper core layer 268 is formed on the second insulating layer 267B and the protective layer 269 is formed on the upper core layer 268 to complete the thin-film magnetic head.

This thin-film magnetic head, including the spin-valve thin-film magnetic element of the present invention, exhibits high thermal resistance and reliability and small asymmetry.

In the thin-film magnetic head, the structure of the slider and the structure of the inductive head are not limited to that shown in FIGS. 13 to 15, and may have any other configurations.

EXAMPLE

The changes in the magnitude of the exchange coupling magnetic field between an exchange bias layer and a free magnetic layer and the rate of change in resistance (ΔR/R) as a function of the thickness of a back layer which was formed as a mean-free-path-extending layer between the exchange bias layer and the free magnetic layer in a single spin-valve thin-film magnetic element of exchange bias type were examined.

The spin-valve thin-film magnetic element used was of a bottom type as in the first embodiment shown in FIG. 1 having a single pinned magnetic layer.

The back layer was composed of copper, and the thickness thereof was changed from 0 angstroms to 40 angstroms. A substrate was provided with an alumina underlying layer thereon. A composite was formed on the substrate. The composite had the following configuration from the bottom: Si substrate/alumina underlying layer (1000 angstroms)/antiferromagnetic layer of PtMn (150 angstroms)/first pinned magnetic sublayer of Co (15 angstroms)/nonmagnetic conductive layer of Ru (8 angstroms)/second pinned magnetic sublayer of Co (25 angstroms)/nonmagnetic conductive layer of Cu (25 angstroms)/free magnetic sublayer of Co (5 angstroms)/free magnetic sublayer of NiFe (15 angstroms)/back layer of Cu (0 to 50 angstroms)/exchange bias layer of PtMn (200 angstroms)/protective layer of Ta (20 angstroms). That is, a free magnetic layer was composed of the Co sublayer and the NiFe sublayer and had a total thickness of 20 angstroms.

Figure 11:
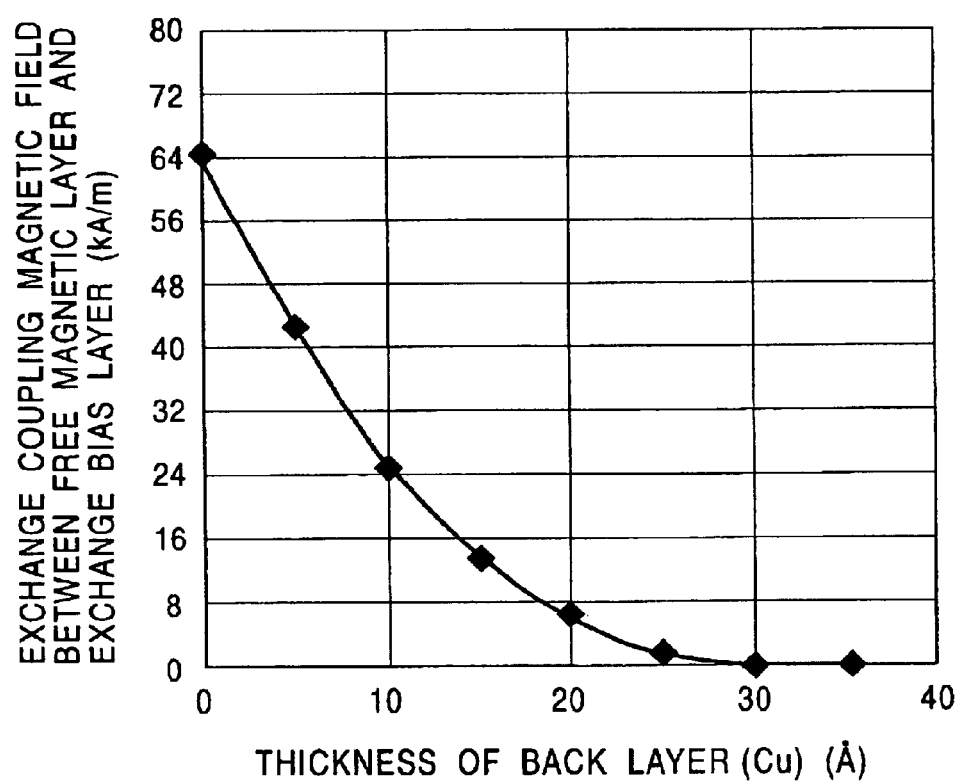
FIG. 11 is a graph illustrating the change in the magnitude of the exchange coupling magnetic field between an exchange bias layer and a free magnetic layer as a function of the thickness of a back layer in a spin-valve thin-film magnetic element.

FIG. 11 is a graph illustrating the change in the magnitude of the exchange coupling magnetic field between the exchange bias layer and the free magnetic layer as a function of the thickness of the back layer in this single spin-valve thin-film magnetic element. The thickness of the back layer means the size in the Z direction in FIG. 1.

Figure 12:
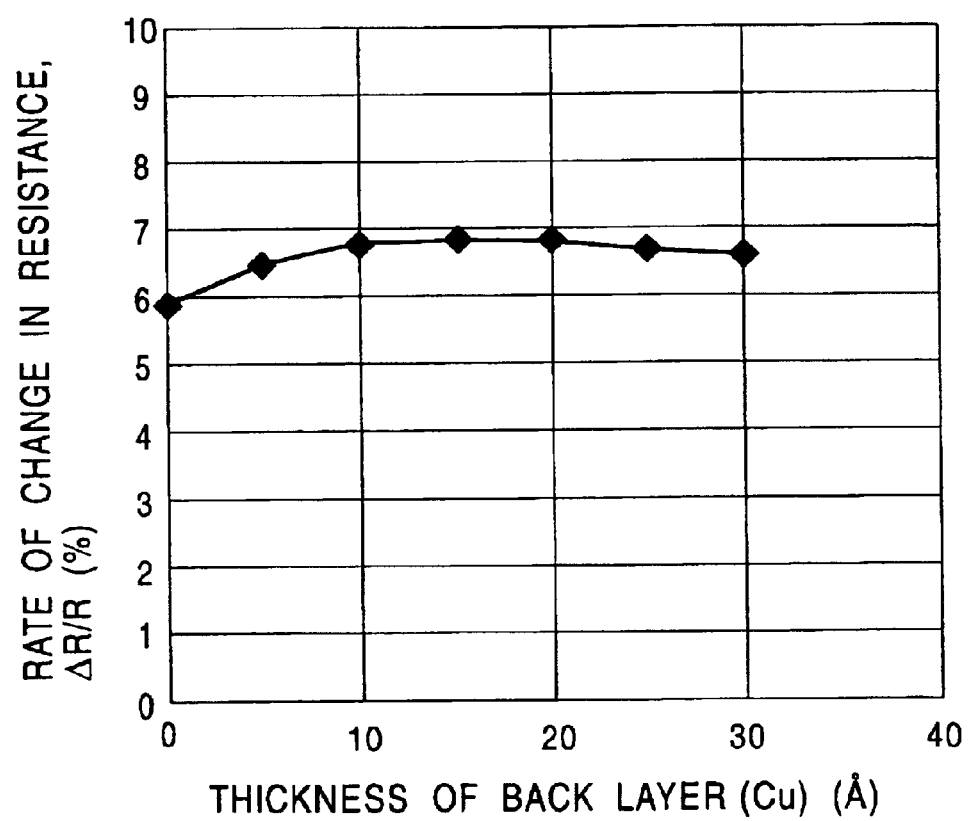
FIG. 12 is a graph illustrating the rate of change in resistance ($\Delta R/R$) as a function of the thickness of a back layer in a spin-valve thin-film magnetic element.

FIG. 12 is a graph illustrating the rate of change in resistance (ΔR/R) as a function of the thickness of the back layer in this single spin-valve thin-film magnetic element.

FIG. 11 shows that the magnitude of the exchange coupling magnetic field (exchange bias magnetic field) between the free magnetic layer and the exchange bias layer decreases as the thickness of the back layer provided therebetween increases. This graph, therefore, shows that the magnitude of the exchange coupling magnetic field between the free magnetic layer and the exchange bias layer is controllable by the thickness of the back layer.

A strong exchange coupling magnetic field between the free magnetic layer and the back layer contributes to stabilization of the magnetic domains in the free magnetic layer and prevents occurrence in factors which adversely affects read waveforms, such as Barkhausen noise. However, an excessively strong exchange coupling magnetic field inhibits the rotation of the magnetization vector of the free magnetic layer in response to an external magnetic field, resulting in decreased sensitivity. In this case, the exchange bias magnetic field is preferably in the range of 3 to 13 kA/m. Thus, FIG. 13 suggests that the thickness of the back layer is preferably in the range of 15 to 25 angstroms.

Since the free magnetic layer is relatively thin in this EXAMPLE, the exchange bias magnetic field affecting the free magnetic layer must be attenuated to a relatively low magnitude. Thus, the optimum thickness of the back layer is relatively large.

The optimum thickness of the back layer depends on the material for the nonmagnetic conductive layer and the material for and the thickness of the free magnetic layer, and is set to the range of 5 to 30 angstroms in the present invention.

FIG. 12 shows that the rate of change in resistance ($\Delta R/R$) of this spin-valve thin-film magnetic element increases within the above optimum range of thickness of the back layer.

Thus, the free magnetic layer has an optimized magnitude of anisotropic magnetic field ($H_k$) and the magnetization vector thereof can sensitively change in response to a leakage magnetic field from the exterior. Moreover, the spin filter effect of the back layer improve the rate of change in resistance ($\Delta R/R$) and thus the output characteristics of the spin-valve thin-film magnetic element.

What is claimed is:

1. A spin-valve thin-film magnetic element comprising:
   a substrate;
   an antiferromagnetic layer;
   a pinned magnetic layer in contact with the antiferromagnetic layer, the magnetization vector of the pinned magnetic layer being pinned by an exchange coupling magnetic field between the antiferromagnetic layer and the pinned magnetic layer;
   a nonmagnetic conductive layer in contact with the pinned magnetic layer;
   a free magnetic layer in contact with the nonmagnetic conductive layer;
   an exchange bias layer for magnetizing the free magnetic layer so that the magnetization vector of the free magnetic layer is substantially orthogonal to the magnetization vector of the pinned magnetic layer;
   a pair of electrode layers for supplying a sensing current to the pinned magnetic layer, the nonmagnetic conductive layer, and the free magnetic layer; and
   a mean-free-path-extending layer provided between the free magnetic layer and the exchange bias layer for controlling the magnitude of an exchange coupling magnetic field between the free magnetic layer and the exchange bias layer and for extending the mean free path of conduction electrons,
   wherein the mean-free-path-extending layer is positioned on a side of the free magnetic layer remote from the pinned magnetic layer.

2. A spin-valve thin-film magnetic element according to claim 1, wherein the mean-free-path-extending layer includes a back layer comprising a nonmagnetic conductive material.

3. A spin-valve thin-film magnetic element according to claim 2, wherein the back layer has a thickness in the range of 5 to 30 angstroms.

4. A spin-valve thin-film magnetic element according to claim 3, wherein the back layer comprises at least one element selected from the group consisting of Au, Ag, and Cu.

5. A spin-valve thin-film magnetic element according to claim 4, wherein the back layer comprises Cu and has a thickness in the range of 15 to 25 angstroms.

6. A spin-valve thin-film magnetic element according to claim 2, wherein the back layer comprises at least one element selected from the group consisting of Au, Ag, and Cu.

7. A spin-valve thin-film magnetic element according to claim 2, wherein the mean-free-path-extending layer includes a mirror reflective layer comprising an insulating material disposed between the exchange bias layer and the back layer.

8. A spin-valve thin-film magnetic element according to claim 7, wherein the total thickness of the mirror reflective layer and the back layer is in the range of 5 to 500 angstroms.

9. A spin-valve thin-film magnetic element according to claim 8, wherein the mirror reflective layer comprises a substance which can form a high energy gap having a high probability of mirror reflection maintaining the spin state of the conduction electrons.

10. A spin-valve thin-film magnetic element according to claim 7, wherein the mirror reflective layer comprises a substance which can form a high energy gap having a high probability of mirror reflection maintaining the spin state of the conduction electrons.

11. A spin-valve thin-film magnetic element according to claim 1, wherein the mean-free-path-extending layer includes a mirror reflective layer comprising an insulating material.

12. A spin-valve thin-film magnetic element according to claim 11, wherein the mirror reflective layer has a thickness in the range of 5 to 500 angstroms.

13. A spin-valve thin-film magnetic element according to claim 12, wherein the mirror reflective layer comprises a substance which can form a high energy gap having a high probability of mirror reflection maintaining the spin state of the conduction electrons.

14. A spin-valve thin-film magnetic element according to claim 11, wherein the mirror reflective layer comprises a substance which can form a high energy gap having a high probability of mirror reflection maintaining the spin state of the conduction electrons.

15. A spin-valve thin-film magnetic element according to claim 1, wherein the antiferromagnetic layer, the pinned magnetic layer, the nonmagnetic conductive layer, the free magnetic layer, and the exchange bias layer are deposited in that order on the substrate.

16. A spin-valve thin-film magnetic element according to claim 1, wherein the exchange bias layer, the free magnetic layer, the nonmagnetic conductive layer, the pinned magnetic layer, and the antiferromagnetic layer are deposited in that order on the substrate.

17. A spin-valve thin-film magnetic element according to claim 1, wherein the pair of electrode layers lie at least on two sides in the planar direction of the free magnetic layer.

18. A spin-valve thin-film magnetic element according to claim 17, wherein the pair of electrode layers lie at least on two sides in the planar direction of the free magnetic layer, the nonmagnetic conductive layer, and the pinned magnetic layer.

19. A spin-valve thin-film magnetic element according to claim 1, wherein at least one of the pinned magnetic layer and the free magnetic layer is divided into two sublayers by a nonmagnetic interlayer, said sublayers being in a ferrimagnetic state in which the magnetization vectors thereof are antiparallel to each other.

20. A spin-valve thin-film magnetic element according to claim 1, wherein each of the antiferromagnetic layer and the exchange bias layer comprises an alloy comprising Mn and at least one element selected from the group consisting of Pt, Pd, Ir, Rh, Ru, Os, Au, Ag, Cr, Ni, Ne, Ar, Xe, and Kr.

21. A spin-valve thin-film magnetic element according to claim 20, wherein the antiferromagnetic layer comprises an alloy represented by the following formula:

$$X_m Mn_{100-m}$$

wherein X is at least one element selected from the group consisting of Pt, Pd, Ir, Rh, Ru, and Os, and the subscript m is in the range of 48 atomic percent $\leq m \leq$ 60 atomic percent.

22. A spin-valve thin-film magnetic element according to claim 20, wherein the exchange bias layer comprises an alloy represented by the following formula:

$$X_m Mn_{100-m}$$

wherein X is at least one element selected from the group consisting of Pt, Pd, Ir, Rh, Ru, and Os, and the subscript m is in the range of 52 atomic percent $\leq m \leq$ 60 atomic percent.

23. A spin-valve thin-film magnetic element according to claim 20, wherein the antiferromagnetic layer comprises an alloy represented by the following formula:

$$Pt_m Mn_{100-m-n} Z_n$$

wherein Z is at least one element selected from the group consisting of Pd, Ir, Rh, Ru, and Os, and the subscripts m and n are in the ranges of 48 atomic percent $\leq m+n \leq$ 60 atomic percent and 0.2 atomic percent $\leq n \leq$ 40 atomic percent.

24. A spin-valve thin-film magnetic element according to claim 20, wherein the exchange bias layer comprises an alloy represented by the following formula:

$$Pt_m Mn_{100-m-n} Z_n$$

wherein Z is at least one element selected from the group consisting of Pd, Ir, Rh, Ru, and Os, and the subscripts m and n are in the ranges of 52 atomic percent $\leq m+n \leq$ 60 atomic percent and 0.2 atomic percent $\leq n \leq$ 40 atomic percent.

25. A spin-valve thin-film magnetic element according to claim 20, wherein the antiferromagnetic layer comprises an alloy represented by the following formula:

$$Pt_q Mn_{100-q-j} L_j$$

wherein L is at least one element selected from the group consisting of Au, Ag, Cr, Ni, Ne, Ar, Xe, and Kr, and the subscripts q and j are in the ranges of 48 atomic percent $\leq q+j \leq$ 60 atomic percent and 0.2 atomic percent $\leq j \leq$ 10 atomic percent.

26. A spin-valve thin-film magnetic element according to claim 20, wherein the exchange bias layer comprises an alloy represented by the following formula:

$$Pt_q Mn_{100-q-j} L_j$$

wherein L is at least one element selected from the group consisting of Au, Ag, Cr, Ni, Ne, Ar, Xe, and Kr, and the subscripts q and j are in the ranges of 52 atomic percent $\leq q+j \leq$ 60 atomic percent and 0.2 atomic percent $\leq j \leq$ 10 atomic percent.

* * * * *